United States Patent [19]

Haynes

[11] 3,831,150

[45] Aug. 20, 1974

[54] DATA ORDERING SYSTEMS

[75] Inventor: Benjamin O. Haynes, St. Louis Cty., Mo.

[73] Assignee: Mylee Digital Sciences, Inc., Maryland Heights, Mo.

[22] Filed: Mar. 2, 1973

[21] Appl. No.: 337,770

Related U.S. Application Data

[62] Division of Ser. No. 141,913, May 10, 1971, Pat. No. 3,747,071.

[52] U.S. Cl. .......... 340/172.5
[51] Int. Cl. .......... G06f 7/30, G06f 7/12
[58] Field of Search .......... 340/172.5

[56] References Cited

UNITED STATES PATENTS

| | | | |
|---|---|---|---|
| 3,357,327 | 12/1967 | Proud | 95/4.5 |
| 3,533,084 | 10/1970 | Cook et al. | 340/172.5 |
| 3,573,855 | 4/1971 | Cragon et al. | 340/172.5 |
| 3,587,057 | 6/1971 | Armstrong | 340/172.5 |
| 3,601,808 | 8/1971 | Vlack | 340/172.5 |
| 3,747,071 | 7/1973 | Haynes | 340/172.5 |

*Primary Examiner*—Gareth D. Shaw
*Assistant Examiner*—Jan E. Rhoads
*Attorney, Agent, or Firm*—Robert J. Schaap

[57] ABSTRACT

Data ordering systems for electronic data processing equipment, preferably of the non-programmable type which perform data storage and retrieval functions and selected arithmetic functions on sectors of data. The electronic data processing equipment may include one or more counsel units which may be remote or proximate to and connected to a central electronics unit, through a multiplexer circuit. The central electronics unit contains a memory section in the form of an addressable storage member for retaining the information introduced into the data processing equipment. A printer drive circuit is interposed between the printing mechanism and the multiplexer circuit and the central electronics unit.

The data ordering systems are used to present selected portions of the data, which may be stored or which may be introduced into the data processing system, to the printing mechanism in a desired format. The data ordering systems are preferably included with the printer drive circuit and enable an examining and subsequent ordering of the data according to certain selected criteria. Thus, these data ordering systems will perform certain functions including at least (1) examining sectors of data and selecting certain sectors of data having character fields therein, (2) determining whether the character fields are within preselected maximum or minimum limits, (3) determining the size values of character fields in the selected certain sectors, and (4) determining the presence of preselected codes in the sectors of data.

25 Claims, 27 Drawing Figures

PATENTED AUG 20 1974 3,831,150

SHEET 01 OF 20

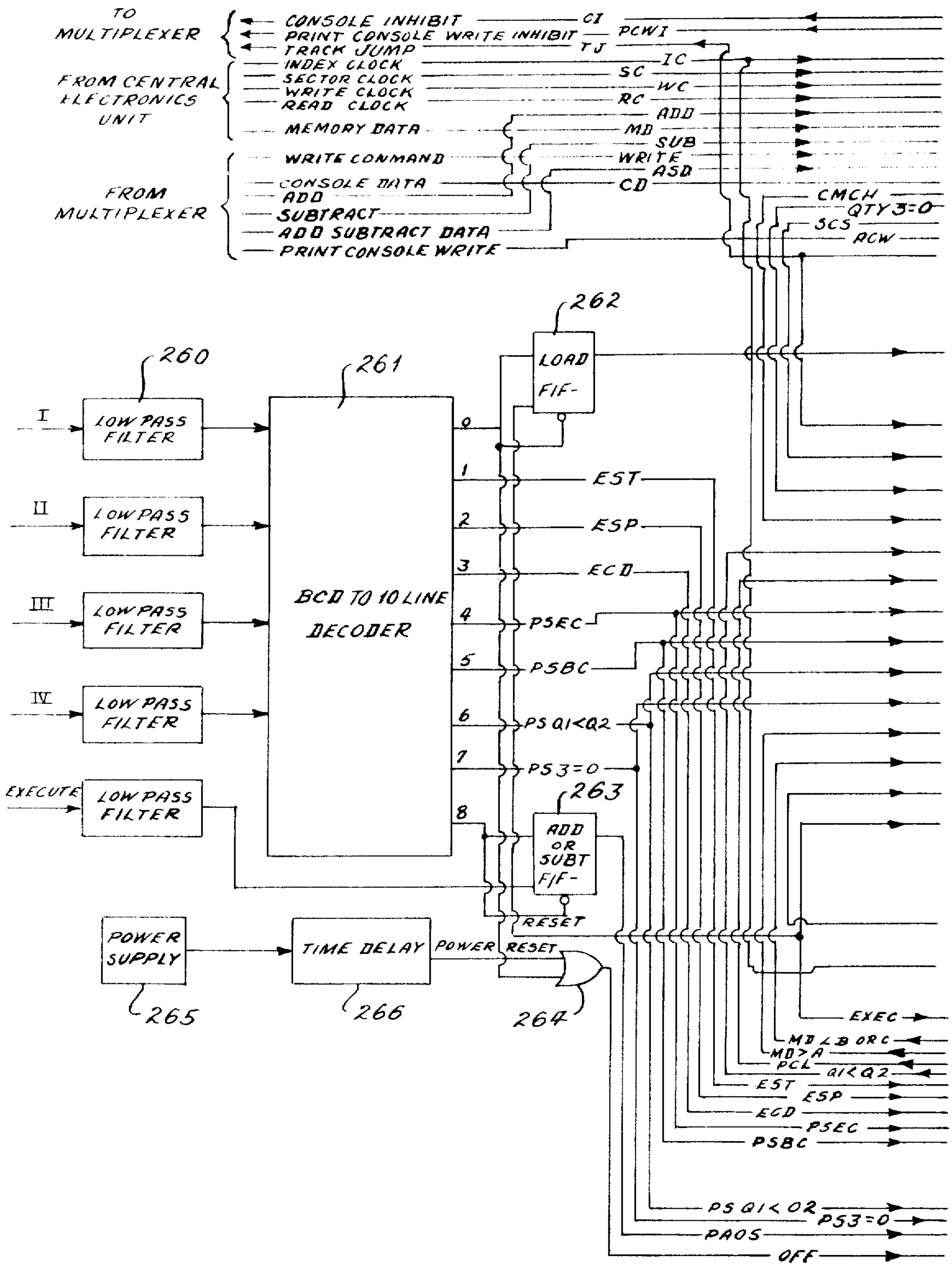
FIG16.A

DATA ORDERING SYSTEMS

This application is a division of my copending patent application, Ser. No. 141,913, filed May 10, 1971, now U.S. Pat. No. 3,747,071 entitled "Electronic Data Processing System."

TABLE OF CONTENTS

Abstract of the Disclosure
Background of the invention
Figures
Definitions
Table of Acronyms
General Description
Schematic Block Diagram
Detailed Description of the Console Unit
Detailed Description of the Central Electronics Unit
Addressing System
Operation of the Combination Console Unit — Central Electronics Unit
Zeroing of Accumulated Data
Multiple Data Sectors
Multiple Console Units with Multiplexer
Print Control Console
Printer and Printer Interface Circuit
Printer Drive Circuit
Operation of the Printer Drive Circuit
Claims

BACKGROUND OF THE INVENTION

This invention relates in general to certain new and useful improvements in electronic data processing systems, and more particularly, to a data storage and retrieval system which is capable of performing various arithmetic functions and rendering a print-out of the data in various desired formats.

In recent years, there has been a widespread advance in data processing technology and an attendant introduction of commercially available data processing equipment. Many of these apparatus which have been characterized as "desk model computers" are essentially reduced versions of the larger digital computing equipment. Interestingly, these so-called "desk model computers" are accurately characterized as computers since they are subject to a high purchase cost as well as a high operating cost which has notoriously accompanied the larger version digital computer.

Unfortunately, most of the research and development activities in the data processing area of technology have been concerned with increased speed of operation, reduction of component size, and increased versatility. While these research and development activities have resulted in the introduction of a large number of data processing equipment and has advanced the state of the art, the equipment can generally be acquired by only larger organizations having sufficient capital to afford the cost of digital computing equipment.

Digital computing equipment of this type is generally beyond the need of most small business organizations as well as many of the medium-sized business organizations. Smaller business organizations typically do not require the wide degree of versatility which is available in much of the commercially offered digital computing equipment. Furthermore, and even more critical, the smaller business organizations can ill afford the purchase price or lease cost to obtain digital computing equipment as well as the substantial cost of operating such equipment. Moreover, most of the commercially available digital computing equipment requires the employment of programming or so-called "software" for proper operation of the equipment. The need for this software imposes an additional financial burden on the small business organization which may be required to obtain the services of a programmer. Furthermore, each change in operating procedure of the business may well necessitate the change in the computer program to conform to the present business practices, and this, in turn necessitates the revision of the software.

Many small business organizations which could well use the facilities of digital computing equipment such as in inventory control or simple data storage and retrieval, have found that the commercially available digital computing equipment was not economically feasible for employment. Accordingly, many of the business organizations which could effectively employ electronic data systems have continued to use the well-known manual recordkeeping systems.

The system of the present invention is quite unique in that it serves as a means of storing and retrieving information on a real-time basis. In problems such as inventory control and the like, organizations have relied on commercially available digital computing equipment. The extant computing equipment is quite costly not only in terms of the actual purchase or lease cost, but in the attendant requirements for programming personnel, keypunch personnel and skilled operators as well. The system of the present invention resides in three self-contained units which require no external programming and is designed to be operated by personnel relatively unskilled in the computer arts. In addition, since the claimed system does not require external programming, the design and construction is relatively simplified when compared to extant digital computing equipment and hence the cost of such system is materially reduced.

The system of the present invention is capable of having information introduced for further processing by direct key actuation and hence is capable of handling this information on a real-time basis. The commercially available digital computing systems would require programmed inputs such as by punched cards or recorded magnetic tape, thereby effectively eliminating the feasibility of handling information on a real-time basis. Furthermore, with the extant systems, the information to be processed must be converted to a proper predetermined format for computer acceptance. Since the system of the present invention is designed for direct key actuation, no special information encoding problems are encountered.

It is, therefore, the primary object of the present invention to provide an electronic data processing system which is capable of performing data storage and retrieval functions as well as performing the various arithmetic functions on the stored data.

It is another object of the present invention to provide an electronic data processing system of the type stated which is constructed in such manner that it can be effectively operated without the need of programming.

It is a further object of the qresent invention to provide an electronic data processing system of the type stated which effectively serves as a small digital computer for purposes of inventory control, stored credit information, and the like, and which is capable of rendering a print-out of the stored information.

It is another salient object of the present invention to provide a system of the type stated which is capable of printing stored information in any of a plurality of desired formats.

It is also an object of the present invention to provide an electronic data processing system of the type stated which can be manufactured substantially on a massproduction basis at a relatively low unit cost, thereby enabling the purchase of such equipment by relatively small business organizations.

It is yet another object of the present invention to provide a system of the type stated which is operable with a variety of commercially available printing devices.

With the above and other objects in view, my invention resides in the novel features of form, construction, arrangement and combination of parts presently described and pointed out in the claims.

FIGURES

In the accompanying drawings (20 sheets)

FIG. 9 is a diagrammatic view consisting of FIGS. 9A–9H and showing the temporal relationship of clocking and data pulses used in high speed data transfer in the present invention, of which:

FIG. 9A illustrates a series of three clock pulses as they leave the central electronics unit;

FIG. 9B illustrates the series of the same three clock pulses as they are received in temporal relationship at the console unit;

FIG. 9C illustrates the series of the same three clock pulses as they clock data back to the central electronics unit in temporal relationship;

FIG. 9D illustrates a pair of "1" data pulses and the desired temporal relationship in which they should be received at the central electronics unit from the console unit;

FIG. 9E illustrates the same pair of "1" data pulses and the timing relationship with respect to the clock pulses in which the data pulses are actually received at the central electronics unit after long cable transfer;

FIG. 9F illustrates a pair of early clock pulses as they leave the central electronics unit and their temporal relationship with respect to the normal clock pulses of FIG. 9A;

FIG. 9G illustrates a "1" data pulse and the timing relationship with respect to the clock pulses in which the data pulse is received at the central electronics unit with employment of early clock pulses;

FIG. 9H illustrates an offset in the timing of the data pulse so that it is received at the central electronics unit in such fashion that the clock pulse starts one half the time length of a data pulse later;

FIG. 14 is a diagrammatic view consisting of FIGS. 14A–14I and showing the temporal relationship of various pulses used in a writing operation in such fashion that two sources cannot simultaneously write in the sector, of which:

FIGS. 14A represents a clock pulse from a sector counter in the console unit;

FIG. 14B represents a WRITE command signal from each console unit, employed in a normal writing operation;

FIG. 14C represents a console inhibit signal generated in the central electronics unit;

FIG. 14D represents a console override signal generated in a particular console unit attempting to record information in the central electronics unit;

FIG. 14E represents a WRITE signal for one particular console unit and which is similar to the WRITE signal of FIG. 14B;

FIG. 14F represents a WRITE signal for another console unit and which is also similar to the WRITE signal of FIG. 14B;

FIG. 14G represents a write fault signal from a multiplexer to the central electronics unit forming part of the system of the present invention;

FIG. 14H represents a console inhibit signal sent to all console units from the central electronics unit if two console units attempt to simultaneously write in the central electronics unit; and FIG. 14J represents a console inhibit override signal which is similar to the console inhibit override signal of FIG. 14D;

FIGS. 16A–16H are a composite schematic view of a printer drive circuit forming part of the system of the present invention;

DEFINITIONS

Figure 1:
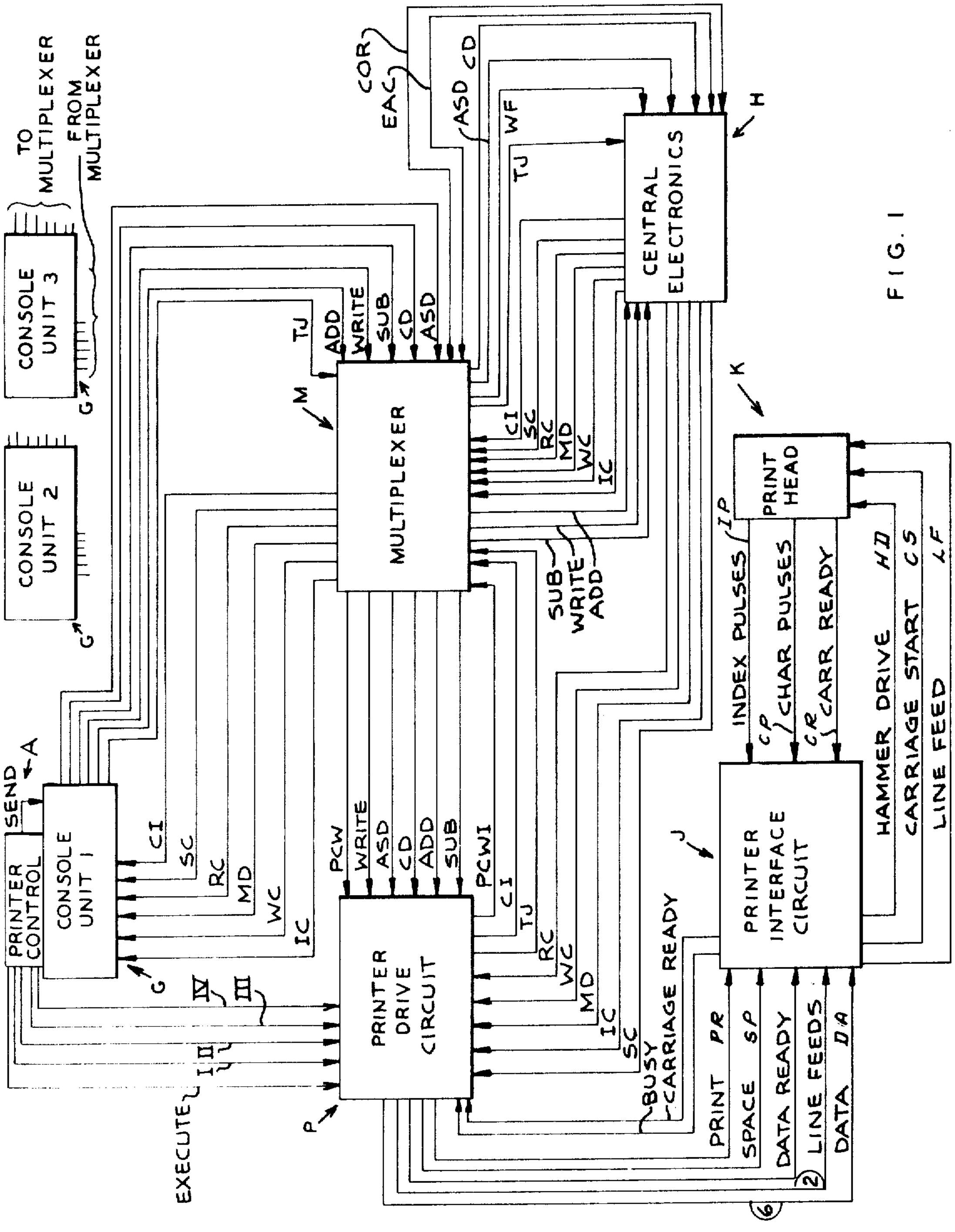
FIG. 1 is a schematic electrical view of an electronic data processing system of the present invention.

The recent advances in the field of cybernetics and more particularly in the field of data processing has created a condition of multiple uses of terms which has led to some confusion. In view of the fact that there is no accurate standardization of terms, the following definitions are set forth for purposes of clarity. It should be recognized that these definitions are only exemplary and, therefore, nonlimiting.

As used herein:

Character — a conventional or nonconventional mark, symbol, number or digit such as a decimal digit or letter of the alphabet or similar indicia.

Word — one or more characters such as a group of decimal digits to form a number, as for example, 10 decimal digits may represent one word.

Bit — a binary element of a digital code where a group of binary elements may represent a decimal digit or arabic or other character and which is generated through conversion of a character to another type of character system or language; as for example, four bits generated from a decimal digit.

Reading — the process of discerning and acquiring data from a member (the term "reading" is generally applied in digital arts and the term "reproducing" is generally applied in analog arts, but have synonomous meanings herein).

Recording — the process of registering data in some temporary, permanent or semipermanent form (the term "recording" is generally applied in analog arts and the term "writing" is generally applied in digital arts, but have synonomous meanings herein).

Sector — a space or location in a magnetic storage member, such as disc or drum, reserved for recording of a predetermined number of bits, as for example, a nine character alphanumeric six-bit code sector would contain 54 bit spaces.

Direct Addressing — A process for recording a word or a portion thereof in a magnetic memory, or retrieving such word or portion thereof from such memory through defining the location, or by defining the sectors of the memory which define such location, of such word or portion thereof by directly recording bit combinations representing such word or words or portions thereof in a particular address location, or extracting the information therefrom by defining the bit combinations representing the location of such word or words in that particular address location.

Associative Addressing — a process for recording a word or portion thereof in a magnetic memory, or retrieving such word or portion thereof from such memory through defining the location, or by defining the sectors of the memory which define such location, of such word or portion thereof by recording bit combinations unique for each sector of the memory in order to acquire a pre-recorded address and comparing such pre-recorded address during each word time with the desired address and selecting such desired address upon coincidence of comparison between the pre-recorded address and the desired address.

Combination Associative-Direct Addressing — a process for recording a word having a locator portion and a descriptor portion or a group of words with a locator portion and a descriptor portion in a magnetic memory, or retrieving such word or words from such memory by serially recording bit combinations for a locator portion in a particular location of one sector of the memory thereby defining a locator address, and recording bit combinations for a descriptor portion in a particular location of another sector of the memory and which location of the descriptor portion is related to the locator portion in addressable manner thereby defining a descriptor address; and retrieving such word or words by associatively selecting the locator address of the locator and directly selecting the descriptor address from the locator address.

The remaining terms used herein are deemed to have their commonly accepted art recognized meanings.

The term "data" as used in this specification refers to information in general and also refers to a sector of data which is associated with a part number address. However, in the included claims, the term "data" is used in the generic sense to represent information in any intelligible code and is not limited to sectors of data representing information about any part number or address.

TABLE OF ACRONYMS

For purposes for more fully illustrating and describing the present invention, many of the signals which are generated by the circuits of the present invention have been designated on the drawings by acronyms representing the signals. Accordingly, the name of the signal and the acronym therefor is set forth in the following table.

| NAME | |
|---|---|
| A-REGISTER TO C-REGISTER | A to C |
| ADD | ADD |
| ADD/SUBTRACT DATA | ASD |
| ADD/SUBTRACT DATA TO C-REGISTER | ASD to C |
| CARRIAGE READY | CR |
| CARRIAGE START | CS |
| CHARACTER PULSES | CP |
| CODE MATCH | CMCH |
| CODE REGISTER | CR |
| CONSOLE DATA | CD |
| CONSOLE DATA TO A REGISTER | CD to A |
| CONSOLE DATA TO C REGISTER | CD to C |
| CONSOLE DATA TO CODE REGISTER | CD to CR |
| CONSOLE DATA TO D REGISTER | CD to D |
| CONSOLE INHIBIT | CI |
| CORRECT | COR |
| DATA | DA |
| DATA READY | DR |
| END AROUND CARRY | EAC |
| ENTER CODE | ECD |
| ENTER START | EST |
| ENTER STOP | ESP |
| EXECUTE | EXEC |
| HAMMER DRIVE | HD |
| INDEX CLOCK | IC |
| LEAST SIGNIFICANT BIT | LSB |
| LINE FEED | LF |
| MEMORY DATA | MD |
| MEMORY DATA GREATER THAN A | MD>A |
| MEMORY DATA LESS THAN B OR C | MD<B OR C |
| MOST SIGNIFICANT SIX BITS OF A | MSBA |
| MOST SIGNIFICANT BIT | MSB |
| PART NUMBERS | P/N |
| PRINT | PR |
| PRINT ADD OR SUBTRACT | PAOS |
| PRINT COMMAND | PCOM |
| PRINT COMPLETE | PCL |
| PRINT CONSOLE WRITE | PCW |
| PRINT CONSOLE WRITE INHIBIT | PCWI |
| PRINT SEQUENTIAL | PSEC |
| PRINT SEQUENTIAL BY CODE | PSBC |
| PRINT SEQUENTIAL QUANTITY-1 LESS THAN QUANTITY-2 | PSQ1<Q2 |
| PRINT SEQUENTIAL QUANTITY-3 EQUALS ZERO | PS3=0 |
| QUANTITY-1 LESS THAN QUANTITY-2 | Q1<Q2 |
| QUANTITY'EQUALS ZERO | QTY3=0 |
| READ CLOCK | RC |

-Continued

| | |
|---|---|
| READ/WRITE CLOCK | R/WC |
| SECTOR CLOCK | SC |
| SPACE | SP |
| START PRINT | SPT |
| SUBTRACT | SUB |
| SWITCHED READ/WRITE CLOCK | SR/ W CL |
| SWITCHED SECTOR CLOCK | SCS |
| TRACK COUNTER CARRY | TCR |
| TRACK JUMP | TJ |
| WRITE CLOCK | WC |
| WRITE COMMAND | WRITE |
| WRITE FAULT | WF |

GENERAL DESCRIPTION

Generally speaking, the present invention provides a system including both an apparatus and a method for achieving data storage and retrieval, performing various arithmetic functions upon such data and providing a print-out of such data. The system operates on a modified form of combination associative-direct addressing principle and is capable of handling alpha-numeric data. Systems for interfacing a plurality of console units to one central electronics unit and printing unit is also provided.

When more than one console unit is employed, each of the plurality of console units are connected to a multiplexer which is, in turn, connected to the central electronics unit. In essence, each of the console units then interface to the central electronics unit through the multiplexer. A printer control is also connected to one console unit and to a printer drive circuit. In like manner, the multiplexer and the central electronics unit are connected to the printer drive circuit. A printer interface circuit is also connected to the printer drive circuit and enables the interfacing to a selected type of printing mechanism.

The console unit of the system of the present invention contains a keyboard which has a plurality of input switches located thereon for introducing information into the console unit. The console unit is capable of handling 40 distinct characters introduced by the keyboard. These characters include 26 arabic characters, the decimal digits 1–9 and 0, a space code and four other selected characters. In addition, the console unit is provided with a plurality of thumbwheel digit switches for introducing arithmetic type data to perform arithmetic functions such as addition and subtraction.

The operator's panel or so-called "control panel" of the console unit includes, in addition to the keyboard, a clear switch which is capable of introducing a blank or space code into a shift register in the console unit. In addition, the operato's panel includes a "read" push-button switch, a "write new part number" switch, a "change part number" switch, a "write data" switch, an "add" switch and a "subtract" switch. The write data switch and write part number switch are designed to introduce new part numbers and data associated with those part numbers onto a drum in the central electronics unit. The read switch is connected in such manner that it is capable of reading the part numbers and the data from this drum in the memory section of the central electronics unit. The add switch and subtract switch are operable in connection with the thumbwheel digit switches in order to perform the various arithmetic functions. Finally, the control panel includes an enable switch which is connected to and controls the other switches so that the write part number switch, the change part number switch, the write data switch and the add, subtract and read switches cannot be actuated without first actuating the enable switch.

The console unit also includes nine cold cathode display tubes which are operatively connected to a shift register in the console unit referred to as a "console register." A display circuit in the console unit selectively energizes the display tubes and operates in conjunction with the shift register and contains a cathode driving circuit and an anode driving circuit for selective energization of the display tubes. In this manner, when information is introduced into the shift register of the console unit, this information can be displayed on the display tubes at selected time intervals.

The console unit of the present invention is designed to generate a byte of six bits for each character which is introduced through the keyboard or the thumbwheel switches. The bytes are decoded on the output of the shift register into a 13-bit data format in order to energize the display tubes which internally contain 13 segments. These segments in the display tubes will form the various characters in alpha-numeric form for display purposes.

Also mounted on the control panel are character edit switches which are associated with each of the diaplay tubes. The character edit switches are designed to enable the change of a character which appears in any of the display tubes and also a change in the corresponding bytew in the shift register which gives rise to the displayed characters. In other words, if it is desired to change a character appearing in a display tube, the new character can be introduced through the keyboard and by actuation of the proper character edit switch, the new character will be introduced into the shift register, and will be also displayed on the display tubes.

Finally, the console unit is provided with a search light which indicates when a memory section contained in the central electronics unit is being accessed and unavailable for other console units.

The console unit also includes a space code generator which is capable of generating spaces in the shift register of the console unit upon actuation of a clear switch. Furthermore, the console unit is provided with a zeros locator which automatically searches the memory section of the central electronics unit for an empty address sector. The part numbers and the part data are recorded associatively in all zeros sectors of the central electronics unit. Hence, when it is desired to record a part number, an all zeros sector location is searched and when such sector is found, the part number is introduced into this all zeros sector. The data associated with this part number is also recorded in the central electronics unit in an all zeros sector location. The data sector is located with respect to the part number sector in an addressable manner which is hereinafter described in more detail. The console unit also includes a comparator circuit which is connected to the zeros locator for selecting the proper sector in the memory section in which a part number can be written. In addition, a sector counter and part number/part data flip-flop are provided.

In a preferred embodiment of the present invention, the part data is preferably located on a track in the memory section which differs from the track containing part numbers. For this purpose, the console unit is provided with a change track sequencer and the change track sequencer will command a track jump operation in the central electronics unit at a prescribed time. In essence, when the associative search reveals a part number, the change track sequencer will cause the central electronics unit to select a sector in the adjacent track in order to acquire the data associated with that part number. This data is located in both a predetermined time and distance relationship with respect to the part number. Thus, if the data is located in the next adjacent track to the track containing a part number, the data is generally located two sectors after the part number in such adjacent track.

The central electronics unit includes a number of sequencers and related items which enable both the reading and the writing of the data into the memory section of the central electronics unit. In addition, the central electronics unit contains other components which enable the handling of arithmetic data. As will be observed hereinafter, the central electronics unit sends data to the console unit at all times, except during portions of a write operation. The console register maintains its own addressing function. Furthermore when a plurality of console units are employed, each individual console unit is capable of reading simultaneously to search for its own address.

The central electronics unit includes several major components such as a serial BCD adder/subtractoer, and a nines complement generator for performing addition and subtraction to the data contained in the memory section. An arithmetic controller is provided which operates in conjunction with the nines complement generator and the serial BCD adder/subtracter in order to perform the various arithmetic functions. In addition, a preamble register is provided for adding a preamble and postamble to the part numbers and part data to be written onto the drum of the memory section. A valid data detector operates in conjunction with the preamble register to remove the postamble and preamble, to thereby enable a reading of only the part number and the part data.

When it is desired to read a part number included in the memory section or to read the part data associated with that part number in the memory section, the part number is introduced into the console register by means of the keyboard. Read information is continually received by the console unit. at all times. Accordingly, when the read switch is actuated, comparison with part numbers in the memory section can be made serially on a bit-by-bit basis. Information from the console register is transmitted into the comparator for this comparison function. A comparison will exist only at sector time and if comaparison did exist, then it is apparent that the next sector in sequence contains part data associated with the part number. A modulo $n557$ counter (where $n$ is the number of tracks on the drum) is provided to retain the drum location from which the part data was removed. The counter is initialized on each count of $n557$ in order to determine the address of this particular sector of part data. The part data information is then introduced into the console and is circulated in the console shift register six bits at a time.

To change a part number, the existing part number is introduced into the console register by means of the keyboard. The change part number switch is then actuated and this, in turn, will de-energize the display during the searching for the existing part number. After the part number is found from the memory section, the sector counter is set. At this time, the display tubes remain extinguished. A new part number is then introduced by means of the keyboard and the change part number button is again actuated. This latter operation automatically enters the new part number on the drum using the sector counter to determine the proper drum location. In order to write a new part number, the number is introduced and the write new part number switch is actuated. The zeros locator serves to select a part number location with all seros and the part number is subsequently recorded in this location. The part data/part number flip-flop essentially keeps track of the sectors which contain part numbers and the sectors which contain part data. The central electronics unit also includes a track jump sequencer which operates in conjunction with the change track sequencer of the console unit. These two sequencers in combination enable the unique combination associative-direct addressing system used in the present invention. An accumulated data sequencer and an accumulated data storage register is also included in the central electronics unit for the purposes of accumulating certain of the data included in the data sectors over periodic time intervals.

The present invention also provides a circuit for employing a plurality of alpha-numeric console units with one central electronics unit. This system includes a gating structure for introducing add/subtract data, console data, write and add/subtract functions into a central electronics unit. Outputs from the central electronics unit which include sector clock pulses, index clock pulses, read clock pulses, write clock pulses and memory data are all transmitted simultaneously to the various console units.

The printer control system includes a printer control console having a multiposition switch and an execute switch pushbutton. The multiposition switch includes an "off" position; an "enter start" position, designated as "EST;" an "enter stop" position, designated as "ESP;" an "enter code" position, designated as "ECD;" a "print sequential" position, designated as "PSEC;" "print sequential by code" position, designated as "PSBC;" a "print sequential quantity 1 less than quantity 2" position, designated as "PSQ1 <Q2;"a "print sequential zero quantity 3" position, designated as "PS3=O;"and a "print transactions" or "print add or subtract" position, designated as PAOS." The "enter start" position and the "enter stop" position set the two limits of the part numbers which are to be printed.

The print sequential code position may represent a number of various codes which can be employed by the user, such as a "print manufacture's code." In like manner, the print sequential position could represent a "print inventory" position, so that an inventory of part numbers can be printed. The print sequential by code position may represent a "print inventory by manufacture's" position so that an inventory of part numbers relating to a particular manufacturer can be printed. The print sequential quantity 1 less than quantity 2 position may represnt a "print orders by manufacturer" position so that an available quantity of a product and a minimum established quantity of this product for a particular manufacturer may be printed, for purposes of comparison. The print sequential zero quantity 3 position may represent a "print zero sales" position so that certain inventories of a manufacturer which contain no sales can be printed-out automatically. The "print add or subtract" position may represent a "print transactions" position so that only transactions which involve addition to or subtraction from stored data may be printed.

After the selector switch is directed to the "enter code " position the code of a particular manufacturer or product can be introduced and the switch can then be shifted to print sequential by code so that an inventory of part numbers can be printed. In this case, all of the part numbers between the start number and the stop number represented by a particular code will be printed. The same holds true with the other sequential modes of printing.

The printer drive circuit of the system of the present invention contains several main components such as four cooperating shift registers which contain various segments of information at points in time during the printing cycle. The printer drive circuit includes a size search sequencer and a size comparator which aid in the determination of which of the part numbers are larger with respect to the other part numbers contained in the memory section of the central electonics units. Furthermore, the printer drive circuit contains a code comparator, a quantity comparator, and a zeros comparison circuit for generating the comparisons needed in order to provide a printing in the various desired modes of operation. The printer drive circuit also includes a print add/subtract sequencer and a format sequencer. The format sequencer enables printing in the desired format and the add/subtract sequencer enables the printing of either additions or subtractions. Various comparators and decoders as well as other gating mechanisms and registers are provided in the printing drive circuit for accomplishing the printing in the various modes described above.

SCHEMATIC BLOCK DIAGRAM

FIG. 1 illustrates in schematic block diagram form the various major components which form part of the system of the present invention. It can be seen that the data storage and retrieval system of the present invention includes at least one or more console units designated as G and which console units are connected to a central electronics unit H through a multiplexer M.

It should be recognized that only one of the console units G has been illustrated as being connected to the multiplexer M, for purposes of clarity, though the other console units illustrated would also be connected to the multiplexer M in like manner. It can be seen that each of the console units G receive a number of signals from the central electronics unit H through the multiplexer M and these signals are an index clock signal, designated as "IC;" a write clock signal, designated as "WC;" a memory data, designated as "MD" read clock signals, designated as "RC;" sector clock signals designated as "SC" and a console inhibit signal, designated as "CI." It can also be observed by reference to FIG. 1, that the multiplexer receives a number of signals from the console unit and these signals are a track jump signal, designated as "TJ;" an add signal, designated as"ADD;" a write signal, designated as "WRITE;" a subtract signal, designated as "SUB;" console data, designated as "CD;" and add/subtract data, designated as "ASD."

By further reference to FIG. 1, it can be seen that the central electronics unit H receives the very same signals from the multiplexer M which were directed to the multiplexer M from the various console units G. In addition, the central electronics unit will receive a correct signal from the multiplexer M, designated as "COR," an end over carry signal from the multiplexer M, designated as "EAC," and a write fault signal, desigated as "WF."

By further reference to FIG. 1, it can be seen that a printer drive circuit P, or so-called "printer drive logic" receives the same signals from the central electronics H that the central electronics sends to the multiplexer M and the console units G, namely, the read clock signals, the write clock signals, memory data, index clock signals, and sector clock signals.

The sector clock signals which are transmitted from the central electronics unit H to the console units G are designed to apprise of the beginning and end of each 54 bit sector. The index clock signals are designed to apprise of the beginning and end of each track on the drum in the memory section N of the central electronics unit H. The write clock signals from the central electronics unit H to the console units G are designed to enable the console unit G to send writing information to the central electronics unit H on a clock time basis. In like manner, the read clock signals enable the information contained in the memory section N of the central electronics unit H to be read and displayed in the console unit G on a clock time bases. The memory data line carries that information which is contained on the drum in the memory section N of the central electronics unit H. Finally, the console inhibit line prevents each of the console units G from taking certain action such as writing at certain times which are hereinafter described in more detail. It can also be seen that the information which is generated in the console unit G is sent to the central electronics unit H.

The add/subtract signals generate add and subtract commands respectively to the central electronics unit H. In addition, the add/subtract data line contains the information generated through the use of the thumbwheel switches and which information is to be either added or subtracted from certain parts of the data sectors. The WRITE line contains the write command which is generated by actuation of the write switches in the console unit G. Finally, the track jump signal is designed to permit the use of the modified associative-direct addressing system, which is described in more detail hereinafter. The console data line carries that data which is entered to the shift register contained in the console unit and it is this information which is generally recorded in the memory section N of the central electronics unit H.

The printer drive circuit P receives four input lines from a printer control console which carries the commands from the printer console in binary format. The printer drive circuit P also receives an execute line from the printer control console which enables the printer drive circuit to operate on the basis of the information received from the four lines carrying the data from the printer console. Furthermore, the printer drive circuit P receives certain signals from the multiplexer M, namely, the WRITE signal, the add/subtract data signal, the console data, the add signals and the subtract signals. In addition, the printer drive circuit P receives a print console write signal over a print console write line, designated as "PCW." The printer drive circuit P directs a console inhibit input to the multiplexer M over a console inhibit line "CI," a print console write inhibit to the multiplexer M over a print console write inhibit line "PCWI," and a track jump signal over a track jump line also designated as "TJ." The console inhibit signal inhibits the various console units G from taking certain action during the printing of information. The print console write inhibit signal prevents the recording of certain information in the memory section N of the central electronics unit H.

The system of the present invention also includes a printer interface logic circuit "J" which receives the data input from the printer drive logic circuit P over six data lines designated as DA. The printer interface logic circuit J also receives a print command signal over a print line designated as "PC;" a space command over a space command line designated as "SP;" a data ready signal over a data ready line, designated as "DR;" and two line feed signals over lines designated as "LF." The printer interface logic circuit also has two outputs in the form of a busy signal and a carriage ready signal to the printer drive logic circuit P.

A printer K or so-called "print head" or "printing head" of generally conventional construction is connected to the printer interface logic circuit J in the manner as illustrated in FIG. 1. The printing command signal to the printer interface logic circuit J is essentially a reset signal, so that when the printer K causes a line of information to be printed, the printer K is ready to accept a new print sequence, and the print command line "PCOM" is deenergized. Accordingly, when all sectors have been scanned and printed, the print command line is deenergized. The data ready signal DR notifies the printer interface logic circuit J that data contained on the data lines is valid. The signal on the data ready line DR essentially prevents the data from being delivered to the printer K during the time that a carriage in the printer K is being shifted to its initial print position, or when data contained on data lines to the printer is determined to be invalid. The data line actually represents six lines containing six bits forming each character to be printed in the six-bit BCD alphanumeric code. The line feed signals over the LF line are designed to cause the print head K to shift to the next lower line or the second lower line for printing. The space line SP carries the space command so that spaces can be properly inserted between the various elements of information printed through the print head K. The busy line from the printer interface logic circuit J to the printer drive logic circuit P essentially notifies the printer drive logic circuit P that the printer K is in the process of printing a character, so that a delay should be created before any further characters are transmitted to the printer K for printing.

The printer interface logic circuit J has three inputs to the printer K which are a hammer drive input, designated as "HD;" a carriage start signal, designated as "CS;" and the line feed signal, designated as "LF." Furthermore, the printer K has three outputs directed to the printer interface logic circuit J which are an index pulse line, designated as "IP;" a character pulse line, designated as "CP"; and a carriage ready line, designated as "CR." The carriage ready line CR carries a signal which indicates to the printer interface interface logic circuit J that the printing carriage has returned to a position where it is ready to start a new line of printing. The index pulse line IP to the printer interface logic circuit J carries index pulses which are generated each time character zero passes under a print hammer in the print head K. In essence, this pulse occurs once for each revolution of a print wheel in the print head K. The character pulse line CP carries clock pulses which occurs as each character on the print wheel passes under the print hammer in the print head K.

The three inputs to the print head K are essentially solenoid inputs. The carriage start line CS carries a signal which initiates the line of print in the printing head K. The hammer drive line HD carries a signal which actuates the print hammer in the print head K to cause a character to be printed. The line feed signal causes the print head K to shift the print substrate after a line of characters have been printed.

DETAILED DESCRIPTION OF THE CONSOLE UNIT

Figure 3:
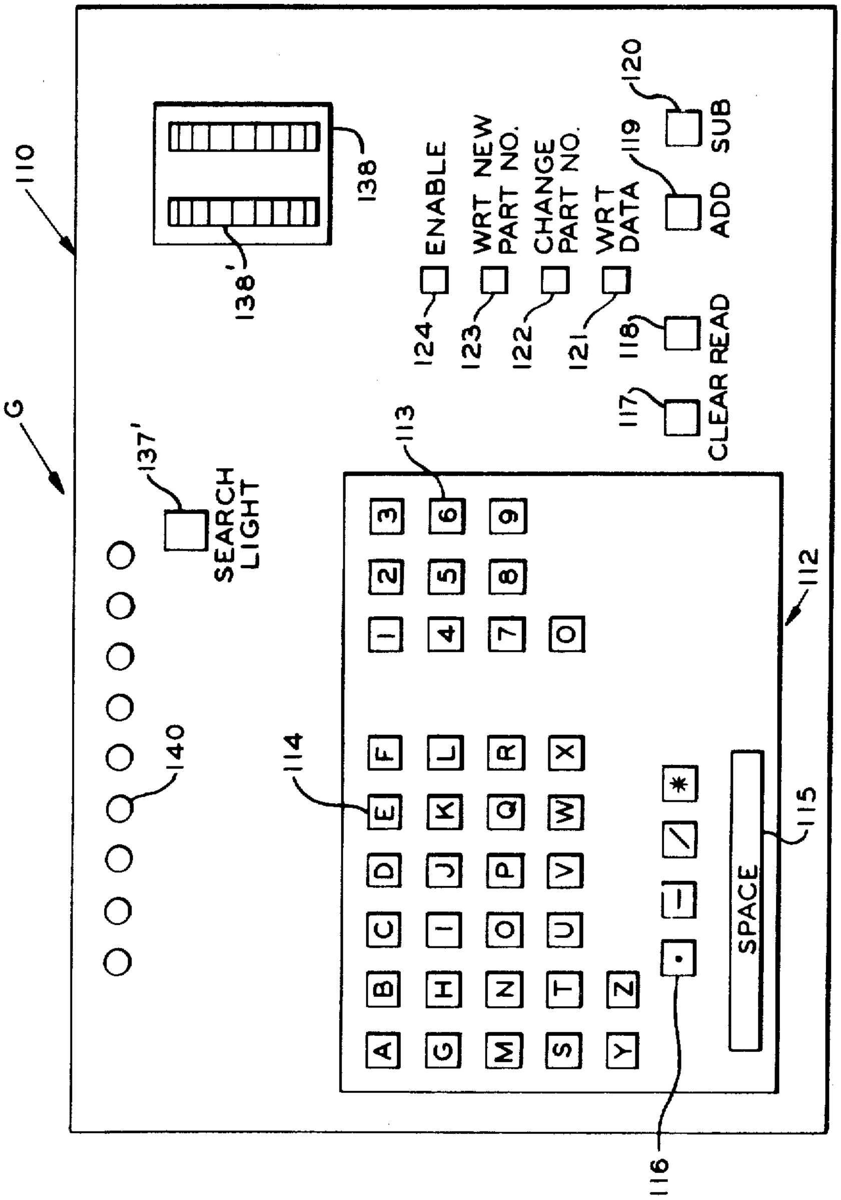
FIG. 3 is a top plan view of the keyboard of the console unit of FIG. 2.

The console unit C, which is functionally illustrated in FIGS. 4A–4C, generally comprises an outer housing 107, which is provided with an upwardly inclined control panel 108 and a somewhat vertically located display panel 109, in the manner as illustrated in FIG. 3. The housing 107 may be provided with removable closure plates (not shown) for providing access to the interior thereof, or the housing may be disposed upon and shiftable with respect to a base plate. Any suitable light weight metal or moldable plastic material may be used in formation of the housing 107. The display panel 109 is cut away in the provision of a display aperture 110 to accommodate nine or more cold cathode display tubes 111.

Figure 4:
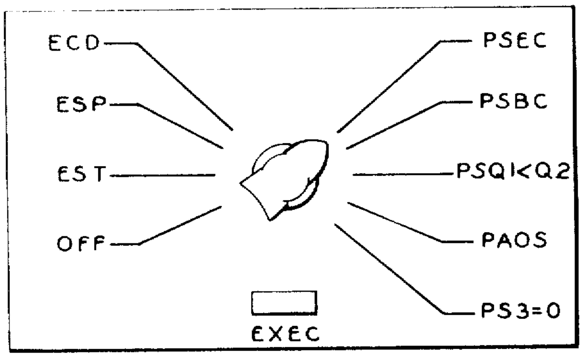
FIG. 4 is a top plan view of a control panel forming part of a printer control in the present invention.

The control panel 108 is provided with a keyboard entry block 112 or so-called "keyboard" having a plurality of numerically labeled keys 113, the latter being labeled zero and one through nine. The keyboard 112 also contains 26 additional keys 114 having the letters of the alphabet, namely A,B, . . . Z imprinted on the surface of each of the respective keys in the manner as illustrated in FIG. 4. In addition, the keyboard 112 is provided with a space bar or space key 115 for introducing spaces or blank areas between letters or decimal digits introduced into the apparatus G. The keyboard 112 is also provided with four additional keys 116 which have labeled thereon an asterisk (*), a period (.), a dash (-) and a diagonal line or so-called "slash mark" (/). Thus, it can be seen that the keyboard 112 is capable of introducing 40 distinct characters in the alpha-numeric format.

A "clear" swtich 117, a "read" switch 118 and an "add" switch 119, a "subtract" switch 120, a "write" data switch 121, a "change" part number switch 122, a "write new part number" switch 123 and an "enable" switch 124 are all mounted on the control panel in the manner as illustrated in FIG. 4. All of the aforementioned switches, with the exception of the enable switch 124, are pushbutton type switches which enable an energized state upon acutation and are biased to return to the deactuated position. The enable switch 124 is a latching-type switch. The enable switch 124 is an alternate action-type switch and is connected to the write data switch 121, the change part numbers switch 122, the write new part number switch 123, the add switch 119 and the subtract switch 120 in order to enable actuation of these latter five switches in a manner to be described in more detail. It should be recognized that the enable switch 124 could also be in the form of a key operated switch, if desired. Thus, in order to actuate any of the five aforesaid switches, it is first necessary to actuate the enable switch 124. The various switches 117–124 all internally contain lights, such as small conventional neon tubes so that the face of the switch will be light-displayed when the enable switch 124 is actuated. When the enable switch 124 is actuated, and thereby illuminated lit, the other switches 119–123 may also be actuated.

The keyboard 112 is connected through 40 bit lines 125 to a 40 line to six bit BCD encoder 126. The encoder 126 is capable of generating six bits in binary coded format for each character. In this connection, it should be noted that actuation of the space bar 115 on the keyboard 112 will also cause the generation of six bits representative of the space code in the same manner as any other character on the keyboard. Furthermore, the 40 line to six bit encoder 126 internally contains a diode matrix having a series of diodes connected in such fashion as to generate a binary code equivalent to any key actuated. Accordingly, actuation of any one of the keys 113–116 will cause the generation of the six bits in an alpha-numeric code to represent that character. It should be recognized that the keyboard 112 and the 40 line to six bit encoder 126 are conventional in their construction, and also within the design purview of the skilled artisan, and are therefore, neither illustrated, nor described in any further detail herein.

The term "part number" as used in this alpha-numeric apparatus represents a sector of a known number of bits, namely, 54 bits, and which sector of bits contains information identifying a particular good, item, service or other element capable of being identified and addressed. However, the presently described embodiment of the present invention refers to such identified and addressed element as a "part number."

The term "part data"as used in this alpha-numeric apparatus represents a sector of a known number of bits, namely, 54 bits, and which sector of bits contains information relating to a part number identified by the preceding sector of the same number of part number bits. The term "data" is also used in its generic sense to represent this sector of a known number of bits, e.g., 54 bits, and which bits contain useful information. Accordingly, a "data" sector of bits may represent a part number, part data or other allied information.

It should be recognized that while the present invention has been described in terms of apparatus for storing part characters (or other addressable information) and respective data about those part characters, that other types of information could be stored as well. For example, the first 54 bits could be used to represent an account number such as credit card account number. The additional sector of 54 bits would then provide information about that particular account number. However, for purposes of illustrating and describing the present invention, the apparatus will be described in terms of storing and operating upon part numbers or part characters and part data associated with such part numbers or part characters. Naturally, if other types of information is to be stored, the nomenclature on the various pushbutton switches located on the control panel 2 would be altered accordingly.

For example, it could be assumed that the second sector of 54 bits representing part data about a part number (nine alpha-numeric characters representing part data about a part number) will include three decimal digit or character positions for providing inventory quantity. The last three decimal digits of the decimal digit or character information, which is the least significant three digits, will represent such inventory data. The other six decimal digit or character positions can then be used in coded form to represent the name of the particular supplier, price, or location of the inventory, etc.

Any of a number of commercially recognized alpha-numeric digital type codes could be used for generating the six bit byte representative of each character employed. The last three character positions of the nine character code have been reserved for decimal digits. However, it should be recognized that four or more of the nine character positions could be used to represent a decimal digit format.

The encoder 126 is connected through six bit lines to character load gates 127. In like manner, the encoder 126 is also connected to a strobe dealy 128 which is, in turn, connected to the gates 127 through a strobe line 129. The keys on the keyboard 112 will bounce for a few microseconds when actuated due to the elasticity of the metal-metal contact in the switches. Furthermore, each of the keys on the keyboard 112 are capable of rendering a 5 volt output when actuated. The strobe delay 128 will create approximately a 12 millisecond delay before the output from the character load gates 127 is transmitted to a 54 bit console shift register 130. This delay will be sufficient to enable the elimination of any rebound vibration in the keys on the keyboard 112 before transfer of the bit information in the encoder 126 to the console register 130. An output strobe from the strobe delay 128 will thereupon permit entry of this bit data into the console register 130.

As indicated previously, each part number sector which also contains nine characters in alpha-numeric format, is capable of being represented by a sector of 54 bits. Thus, each of the nine characters is characterized by a byte of six bits. In like manner, a part data sector of 54 bits depicting information about that part number will follow each part number.

Figure 5A:
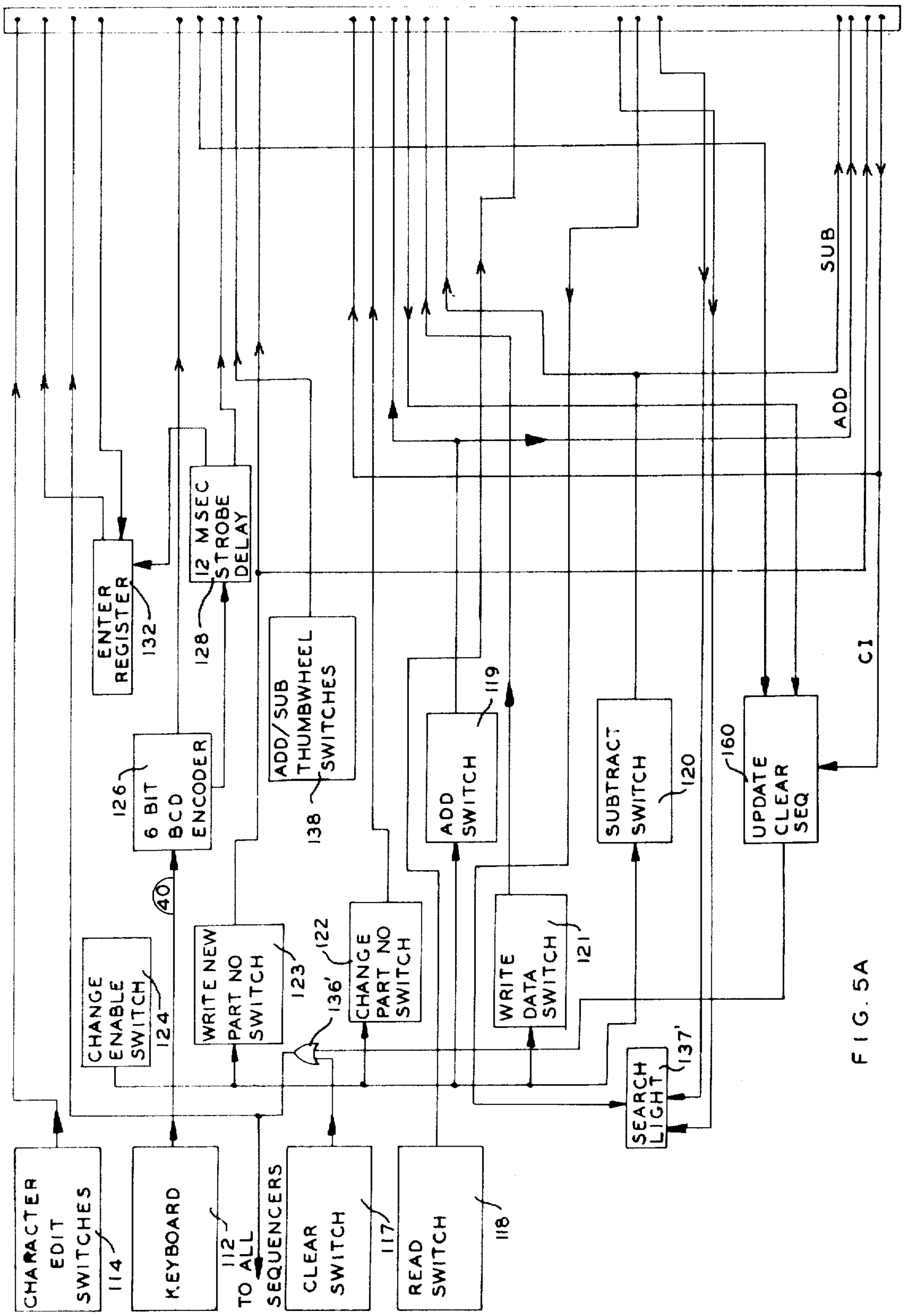
FIGS. 5A, 5B and 5C are a composite schematic view of the electrical circuitry of the console unit forming part of the system of FIG. 1.
Figure 5B:
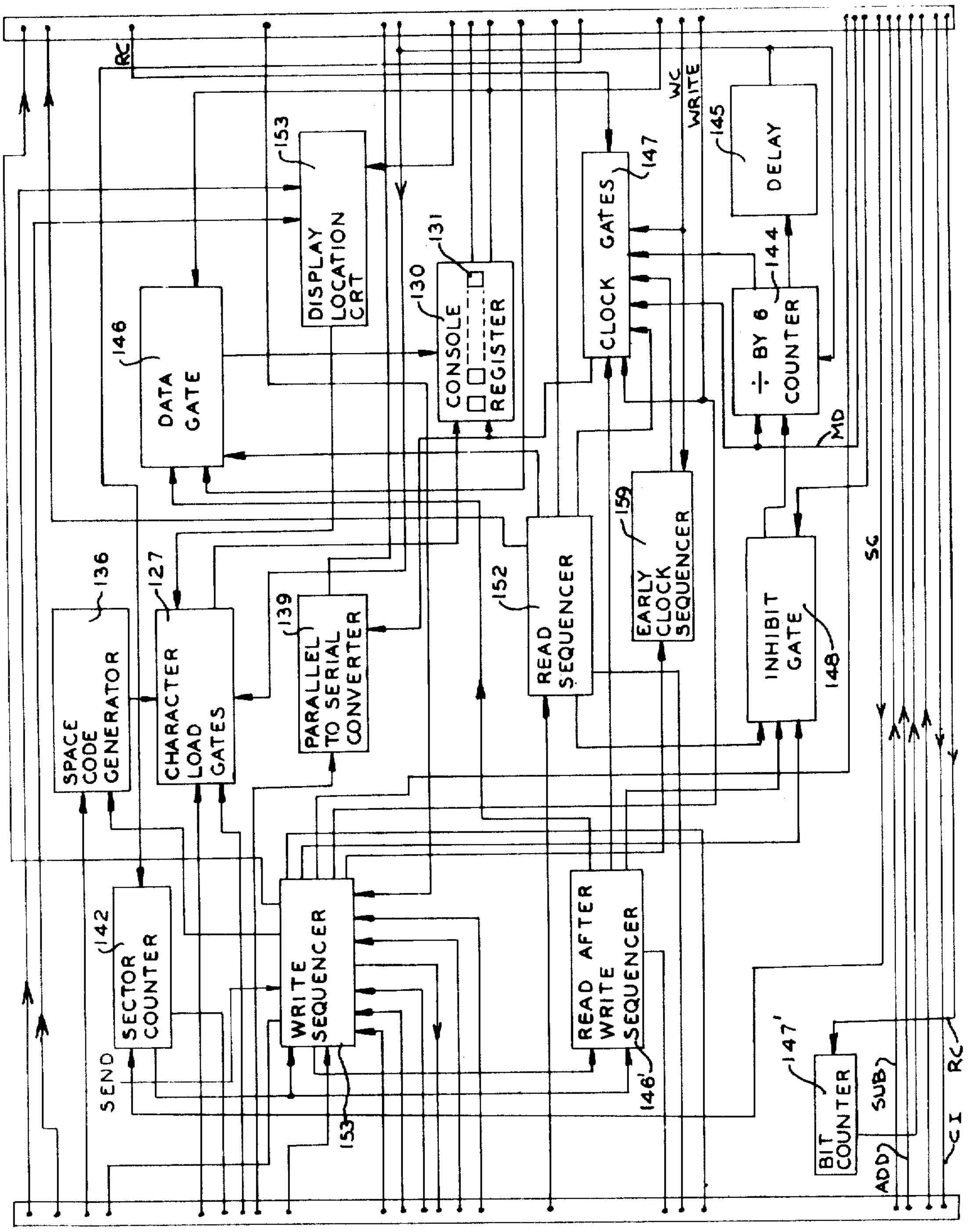

The character load gates 127 are connected to the console register 130 which contains fifty-four bistable multivibrators 131 in the manner as illustrated in FIG. 5B. The console register 130 is a recirculating shift register and serves a number of functions in the system of the present invention. It can also be seen that the console register 130 is capable of holding 54 bits of information at any point in time.

The output of the strobe delay 128 is also connected to a nine bit enter register 132 which generally contains nine bistable multivibrators. The output of the enter register 132 is connected to a display location decode circuit 133 which, in turn, has an output connected to the character load gates 127, in the manner as illustrated in FIG. 5B. The display location decode circuit 133 operates in conjunction with an anode shift register (hereinafter described) and the enter register 132 to enable the loading of keyboard characters into sequentially located character positions of the console register 130 and, hence, sequentially located display positions. Six output lines from the bistable multivibrator 131 of the console register 130 representing the six least significant bits are inputs to a 6 bit to 13 line decoder 134. The decoder 134 also has 13 output lines connected to 13 cathode drivers in a cathode driving circuit 134' and the cathode driving circuit 134' has 13 output lines connected to the display tubes 111.

A nine bit anode shift register 135 has nine output lines, where each output line is connected to an individual display tube 111 through anode drivers in an anode driving circuit 135'. Nine such anode drivers are provided in the anode driving circuit 135' for each display tube 111. The anode shift register 135 also has an output connected to one input terminal of the display location decode circuit 133. Thus, the decode circuit 133, the decoder 134, the enter register 132 and anode shift register 135, as well as the cathode drivers and anode drivers in their respective circuits 134', 135', all cooperate with the console register 130 to energize the various segments in the display tubes 111 to represent the nine characters on the display tubes 111; and these nine characters correspond to the 54 bits located in the console register 130 at any point in time. The output of the console register 130 contains six bits for each character and these six bits are decoded into a 13 segment code through the 6 bit to 13 line decoder 134. The display tubes 111 are segmented tubes where the segments in the tubes 111 form the various characters for display purposes.

The nine bit anode register 135 serves to monitor the energization of the various tubes 111. The anode register 135 actually provides an indication of a particular six bit location and its representation is displayed in a particular display tube 111; and the enter shift register 132 essentially depicts the desired location into which a keyboard character is to be introduced when outputs from the register 135 and the register 132 are coincident. Accordingly, coincidence of these two outputs enables the loading of the next keyboard character into the proper location for display purposes in the display tubes 111. It can be seen that each of the tubes 111 will be individually and consecutively energized in order to display the various characters represented by the 54 bits in the console register 130. Each display tube will internally form the 13 segments into a proper representation of the alpha-numeric character introduced by means of the keyboard 112.

Prior to the entry of any new part number address into the console register 130, the clear switch 117 is actuated and, hence, the shift register 130 will contain all spaces. The unique code adopted for spaces is loaded into the console register 130 by the space code generator 136 to be hereinafter described in more detail, upon actuation of the clear switch 117. When any one of the keys on the keyboard 112 is actuated, six bits are generated in a diode matrix in the six bit BCD encoder 126 and entered into the character load gates 127.

By reference to FIG. 5B, it can be seen that the character load gates 127 have 12 lines which are connected to the preset and reset inputs of the last six flip-flops 131 of the console register 130 for the purpose of loading a six bit character code into the console register 130 at the time that the first six bits are being loaded into the console register 130, the last six flip-flops (or stages) 131 represent the most significant character of the nine characters which are entered into the console register 130. Inasmuch as the bits which are entered into the console register 130 are continually circulating, the bits representing each of the nine characters will be, in turn, entered into the last six flip-flops 131 of the console register 130. The anode shift register 135 is also a recirculating shift register containing nine bits. However, only one stage of the anode shift register 135 can be true at any point in time. The first stage of the anode shift register 135, located on the left end position of the anode shift register 135, represents the most significant stage. As indicated previously, the six bits which represent the most significant character were entered into the console register 130 through the character load gates 127. These six bits are only entered into the last six flip-flops 131 of the console register 130 when the most significant stage of the anode shift register 135 is true.

After the most significant character has been loaded in the console register 130, actuation of a second key on the keyboard 112 will generate six more bits which will also enter through the character load gates 127 into the last six flip-flops 131 of the console register 130 when the second state of the anode shift register 135 is rendered true. This sequence continually takes place until all desired bits have been entered into the console register 130 from the keyboard 112 through loading when the desired stage of the circulating anode shift register 135 is true.

Each time that a key on the keyboard 112 is released, a strobe from the strobe delay 128 is entered into the enter shift register 132 thereby causing successive stages to the right to be rendered true in the enter shift register 132. After the ninth key has been actuated, it is impossible to introduce any further characters into the console register 130 inasmuch as the enter shift register 132 in only capable of shifting to nine successive stages. The display location decode circuit 133 advises when the six bits of interest are in the proper stages of the console register 130, by comparing the location of the true bit in the anode shift register 135 with the required bit location as defined by the position of the true bit in the enter shift register 132.

The display decode circuit 133 continually renders a pulse during the time that the recirculating true bit in the anode shift register 135 and the momentarily static true bit in the enter shift register 132 coincide. This pulse is used in the load gates 127 to load a six bit code into the last six stages 131 of the console register 130 whenever a key on the keyboard 112 is actuated.

The anode drivers in the anode driver circuit 135' serve as level converters to take the one recirculating true bit of the anode shift register 135 and make it capable of illuminating one display tube 111. Since the one true bit is recirculating in the anode shift register 135, each of the display tubes 111 is illuminated in sequence. At the same time the bits in the anode shift register 135 are being recirculated, the bits in the console register 130 are also being shifted a corresponding amount. Inasmuch as the console register 130 stores a six bits for each character, the console register 130 is shifted six times as the anode shift register is shifted once. As this occurs and a new display tube is illuminated, a new six bit code will appear in the six stages 131 of the console register 130, thus presenting a new code to the 6 to 13 line decoder 134. This decoder 134 selects the desired 13 segments of cathodes in each display tube 111 and the tube 111 will actually illuminate when the aforementioned anode is energized.

Illumination of the desired display tube in the manner thus described will cause a particular character representation to be displayed. As each new tube 111 is illuminated in sequence, the new six bit code causes a new character to be displayed. This process continues at a repetition rate sufficiently high that the human eye cannot detect the fact that the tubes 111 are being lit consecutively and accordingly, all the tubes 111 appear to be illuminated continuously.

Each of the 13 cathodes in each of the display tubes 111 are common to the corresponding cathode in each of the other tubes 111 and are driven from one of 13 cathode drivers. Furthermore, the selected cathode drivers resulting from the examination of the six bit code presented to the 6 to 13 line decoder 134 would be switched to a ground condition. One bit in the anode shift register 135 is permitted to circulate and this bit will cause a selected anode driver to be driven from a zero voltage state to a 170–230 volt state. As indicated, only one of the nine anode drivers in the anode driving circuit 135' will be energized at any one point in time. Accordingly, if six zero bits were being examined, the cathodes representing a zero in the display tube will be lit for a selected period of time. The register 130 again causes a shifting of six bits to the right.

These six bits which are used to shift the data in the register 130 are reduced to one bit by a divide by six counter 144 and then shift the anode shift register 135 by one bit. The proper anode driver in the anode driving circuit 135', along with the corresponding cathodes are selected and the next tube 111 is, in turn, energized to its proper display when the anode driver has been energized to a 170–230 volt state. The aforesaid selected period of time for energization of any of the display tubes 111 is determined by a delay 145 which receives an input from the divide by six counter 144 and also has an output to the counter 144. By reference to FIGS. 5B and 5C it can be seen that the anode shift register 135 also receives an output from the delay 145.

When all of the desired characters have been loaded into the console register 130, and it is desired to perform any operations with the console register 130, it is necessary to align the bits in the console register 130 so that the least significant character is in the six rightmost stages 134. This is accomplished by observing when the one true bit in the anode shift register 135 is in the right-most position of the register 135.

The clear switch 117 is connected through an OR gate 136' to a space code generator 136 in the manner as illustrated in FIGS. 5A and 5B. It can be seen that the space code generator 136 is also connected to the character load gates 127. When the clear switch 117 is actuated, it will enable the space code generator 136 to insert a six bit space code through the character load gates 127 into the console register 130. Accordingly, a space code is introduced in each and every six bit location of the console register 130, responsive to each actuation of the clear switch 117.

Introduction of a six bit space code into the console register 130 will cause a particular display tube 111 to remain deenergized. Accordingly, when the clear switch 117 is actuated, it is possible to introduce blank spaces into each six bit byte of the 54 bit console register 130. It should be pointed out that this space which is created by the generation of six bits is a valid code, and in fact, is as valid as the code generated by any other character on the keyboard 112. However, when writing into the console register 130, it is possible to write over these blank spaces. A zeros locator 137 is connected to the output of the shift register 130 for selecting a memory sector in the memory section of the central electronics uint H. A search light 137' is also located on the control panel 110 for reasons which will presently more fully appear.

Also mounted on the control panel 110 is a two decade thumbwheel add/subtract digit switch 138 containing a pair of thumbwheels 138' for introducing add and subtract data into the apparatus A. The thumbwheel 138' provided with deciaml digits numbered 0 and 1 through 9 on the peripheral surface thereof and represents the particular digit which is to be added or subtracted. For example, if it is desired to subtract one number from part data, this number is introduced into the apparatus B through the thumbwheel digit switch 138. The output of the two decade thumbwheel digit switch 138 is connected to a parallel to serial converter 139 by eight output lines. The parallel to serial converter 139 also receives an input from a set of clock gates 147 through various clocking structure in a manner to be hereinafter described in more detail.

Also mounted on the control panel 110 in proximate relationship to the display tubes 111 are nine pushbutton type character edit switches or so-called "digit change switches" 140, each one of which is associated with a particular display tube 111. Thus, in order to change any individual number or character appearing in any of the display tubes 111, it is possible to merely press the switch 140 associated with such tubes and thereafter actuate the proper key on the keyboard 112 for introduction of the proper character. Each of the character edit switches 140 has an output connected to the display location decoder 133. In like manner, the decoder 133 receives an output from the anode shift register 135, as previously described.

The console unit G also includes a part number/data flip-flop 141 which receives a sector clock input over a sector clock line SC from the central electronics unit H. In like manner, this latter flip-flop 141 receives index clock pulses from the electronics unit H over the index clock line designated as IC, reference being made to FIG. 5C. The console unit G also includes a modulo $n$—557 sector counter 142, as illustrated in FIG. 5B, where $n$ is the number of tracks located on a drum in the memory section to be hereinafter described. Five hundred and fifty-seven sectors are located on each track, the sector counter 142 will control sector selection so that when a desired drum location is determined, the counter 142 will be initialized and each time that the counter cycles through its initialization point, it represents that desired memory location.

Figure 5C:
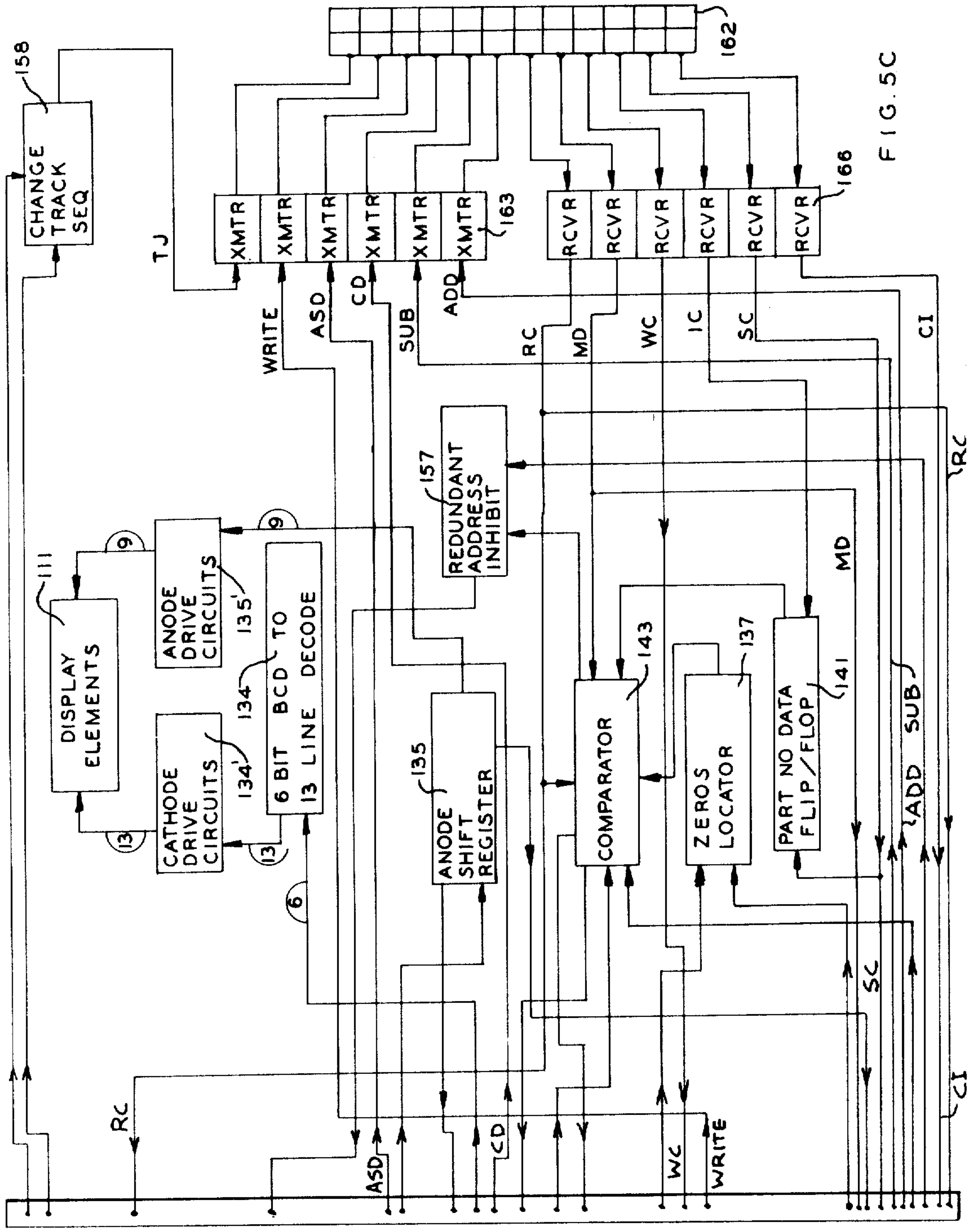

The console unit G also includes a comparator 143, a divide by 6 counter 144, and a 100 microsecond one-shot delay 145, all of which are connected in the manner as illustrated in FIGS. 5B and 5C. The console unit G includes any number of gating structures as illustrated in FIGS. 5A and 5B. The comparator 143 has an output connected to one input of the sector counter 142. The sector counter 142 also receives sector clock pulses from the central electronics unit H over the sector clock line SC. Connected to an input of the console register 130 is a data gate 146 which determines the data streams entering the console register 130. It should be observed that recirculating data and memory data from the memory section N may both be introduced into the console register 130 through the data gate 146.

The data gate 146 receives a gating input from the comparator 143, memory data from the central electronics unit H over a memory data line, designated as MD, an input from a read sequencer hereinafter described, and a gating input from a read-after-write sequencer 146'. The read-after-write sequencer 146' is connected in the console unit circuitry in the manner as described in FIGS. 5A–5C and automatically causes a read sequence to be performed after any write operation to verify proper loading of the data written in the memory section N. In addition, the data gate 146 receives recirculating data from the output of the console register 130. A bit counter 147' used in an addressing operation to be hereinafter described has an output connected to the comparator 143. The bit counter 147' receives a read clock input from the central electronics unit H over a read clock line, designated as RC.

A clock gate 147 has an output connected to the parallel to serial converter 139 and to the console register 130 in order to enable the shifting of the bits in the register 130 at clock pulse time. The clock gate 147, illustrated in FIG. 5B, receives write clock pulses over a write clock line designated as WC and read clock pulses over the read clock line RC from the central electronics unit H. The read clock pulses are used to maintain proper phasing with the data arriving from the memory section N. The write clock pulses are used to write data into the memory section N at clock pulse time. In addition, the data bits in the console register 130 are shifted in six bit bursts which are metered by the clock gate 147. Accordingly, these three clock functions are gated into the console register 130 depending upon which function is being served in the console register 130.

The clock gates 147 receive a number of clock inputs from the central electronics unit H for reasons which will presently more fully appear. The clock gates 147 receives read clock information from the central electronics unit H over the read clock line RC. The divide by six counter 144 also receives this read clock information, and the clock gates 147 receive an output from the divide by six counter 144 in the manner as illustrated in FIG. 5B. Finally, the clock gates 147 receive write clock information from the central electronics unit H over the write clock line WC.

The divide by six counter 144 receives an output from an inhibit gate 148 which receives inputs from the anode register 135, the read-after-write sequencer 146' and a read sequencer and a write sequencer to be hereinafter described. Essentially, the inhibit gate 148 provides an advisory signal to terminate the six bit bursts such as, at times when a least significant character is located in the least significant bit positions of the register 130. More specifically, this inhibit gate 148 will inhibit the six bit bursts immediately before comparison time or reading, or writing onto the memory section N.

The data gate 146 receives an input from the readafter write sequencer 146' and the comparator 143, as indicated previously. The inhibit to the data gate 146 from the read-after-write sequencer 146' and the comparator 143 enables the data gate 146 to introduce information into the console register 130 on a proper time basis.

A read sequencer 152 receives an input from the read switch 118. The sequencer 152 essentially serves as a controller to instigate inhibition of divide by six clock pulses through the inhibit gates 148, select read clock pulses through the clock gates 147, and cause the register data to be recirculated through the data gates 146. These functions will continue until the comparator 143 determines the proper sector to be entered into the register.

The divide by six counter 144 receives an input from the one-shot delay 145 and a read clock pulse input from the central electronics unit H. The divide by six counter 144 is properly disenabled when the six bit bursts from the counter 144 are terminated. The read clock input to the divide by six counter 144 comprises a steady stream of clock pulses from the memory section N and the output from this counter 144 by virtue of the divide by six feature is a series of six bit bursts. Each six bit burst causes the 100 microsecond delay one-shot 145 to inhibit the divide by six counter 144 for 100 microseconds thereby yielding a (100 microsecond time delay between bursts of six pulses.)

The sector counter 142 receives an initialization pulse from the comparator 143, the latter generating this pulse when the data from the central electronics unit H receives comparison with the data from the zeros locator 137. The zeros locater 137 transmits all zeros or register data to the comparator 143, depending on the command it receives from a write sequencer 153. The write sequencer 153 receives an input from the sector counter 142 and uses this input in conjunction with the various switch inputs, write data, write new part number, change part number, add, and subtract, to generate outputs to the zeros locator 137, the clock gate 147 and the inhibit gate 148 to perform the desired write operation. The writer sequencer 153 also has an output to the contral electronics unit H to command a write operation in a manner to be hereinafter described. The read-after-write sequencer 146' also receives an input from the sector counter 142 which is employed in association with a command from the write sequencer 153 to generate commands to the inhibit gate 148, the data gate 146 and the clock gate 147 to perform the desired read-after-write operation. The search lamp 137' is used to indicate the period during which the drum of the memory section N is being searched for data and receives inputs from the rear sequencer 152, the write sequencer 153 and the read-after-write sequencer 146' to indicate their respective search times. In other words, the search lamp 137' will be energized during the time that the drum in the memory section N is being accessed in a search for data.

The console unit G of the present invention also includes a redundant address inhibit circuit 157 which receives an input from the comparator 143 in the manner as illustrated in FIG. 5C. The redundant address inhibit circuit has an output which serves as an input to the write sequencer 153. This output to the write sequencer 153 is effective to nullify the writing of a new part number if the comparator 143 detects that the address of this new part number has already been recorded in the memory section N. The operation of the redundant address inhibit circuit is more fully described in detail hereafter.

The console unit G also includes a change track sequencer 158 which cooperates with and has an output to a similar sequencer in the central electronics unit H to be hereinafter described. The change track sequencer 158 receives inputs from both the read sequencer 152 and the write sequencer 153. The change track sequencer 158 has the ability to permit the sequential changing of tracks on the drum in the memory section for purposes of reading and writing sectors of information. The change track sequencer 158 is used with a particular addressing system (which is also described in more detail hereafter). However, in this particular addressing system, the part numbers are all written on the track and the data sectors associated with those part numbers are written on one or more other tracks, which are directly addressable by virtue of their location relative to the part number track. The console unit G of the present invention also includes an early clock sequencer 159 which receives an input from the write clock line WC from the central electronics unit H. The early clock sequencer 159 also receives an input from the write sequencer 153 and has an output to the clock gates 147, in the manner as illustrated in FIG. 5B. The early clock sequencer 159 is used to permit the transfer of information from the console unit G to the central electronics unit H on an early clock time basis in order to obviate delays incurred in long transfer lines between the console unit G and the central electronics unit H.

Finally, the console unit G includes an update clear sequencer 160 which receives inputs from the write sequencer 153 and the sector counter 142. The update clear sequencer 160 also receives a console inhibit input from the central electronics unit H over a console inhibit line designated as CI from the central electronics unit H. It can also be observed that the write sequencer 153 similarly receives the console inhibit input over the line CI. The update clear sequencer 160 has an output which is ored with the output from the clear switch 117 in the OR gate 136, in the manner as illustrated in FIG. 5A. The update clear sequencer 160 is designed to prevent the visual display of data in the display tubes 111 in the unusual event that a particular console unit and another remote console unit are attempting to access the same sectors of information in the central electronics unit H at the same point in time, or if information displayed on one remote console unit is updated by another remote console unit.

By further reference to FIGS. 5A–5C, it can be seen that the read sequencer 152 receives one input which is from the read switch 118. The read sequencer 152, however, has outputs directed to the comparator 143, the clock gate 147, the sector counter 142, the search light 137', the inhibit gage 148 and the change track sequencer 158. The write sequencer 153 receives inputs from the change part number switch 122, the sector counter 142, the write new part number switch 123, the add switch 119, the subtract switch 120, the write data switch 121, console inhibit signals from the console inhibit line CI, and the redundant address inhibit from the redundant address inhibit circuit 157. The write sequencer has outputs directed to the readafter-write sequencer 146', the search light 137', the inhibit gate 148, the zeros locator 137, the clock gate 143, and the WRITE output to the central electronics unit H. In addition, the write sequencer 153 has outputs directed to the space code generator 136, the enter register 132, the change track sequencer 158, and the early clock sequencer 159. The write sequencer 153 also receives a "send" input from the printer control console A.

It should be recognized that the various gates previously described actually consist of one or more gates to perform the various functions. However, these gates will not be described in any further detail herein, since the design of a gate is well within the purview of the skilled artisan.

By further reference to FIG. 5C, it should be observed that the console unit G receives inputs from a terminal board 161 located in the central electronics unit H. The console unit G receives index clock pulses over the index clock line IC, sector clock pulses over the sector line SC, write clock pulses over the write clock line WC, memory data over a memory data line MD, console inhibit signals over the console inhibit line CI, and read clock data over a read clock line RC. In like manner, the console unit G is provided with a terminal board 162 for connection to the terminal board 161. The terminal board 162 has contacts which match comparable contacts on the terminal board 161 for transmitting add/subtract data over an add/subtract line ASD, console data on a console data line CD, a write command on a WRITE line, console data on a console data line CD, add data on an add line ADD, subtract data on a subtract line SUB, and track jump signals on a track jump line TJ.

Figure 2:
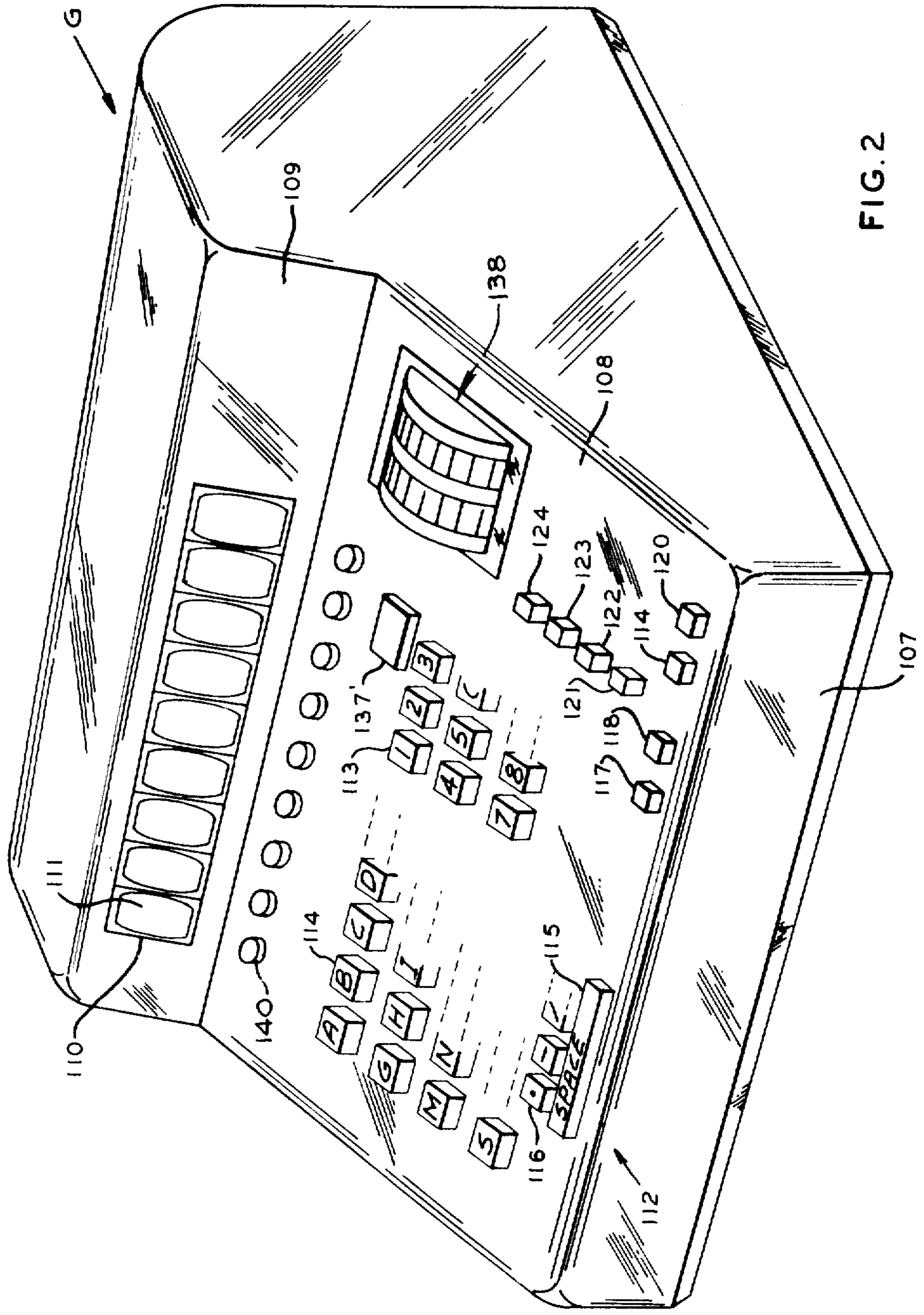
FIG. 2 is a perspective view of console unit forming part of an electronic data processing system constructed in accordance with and embodying the present invention.
Figure 6:
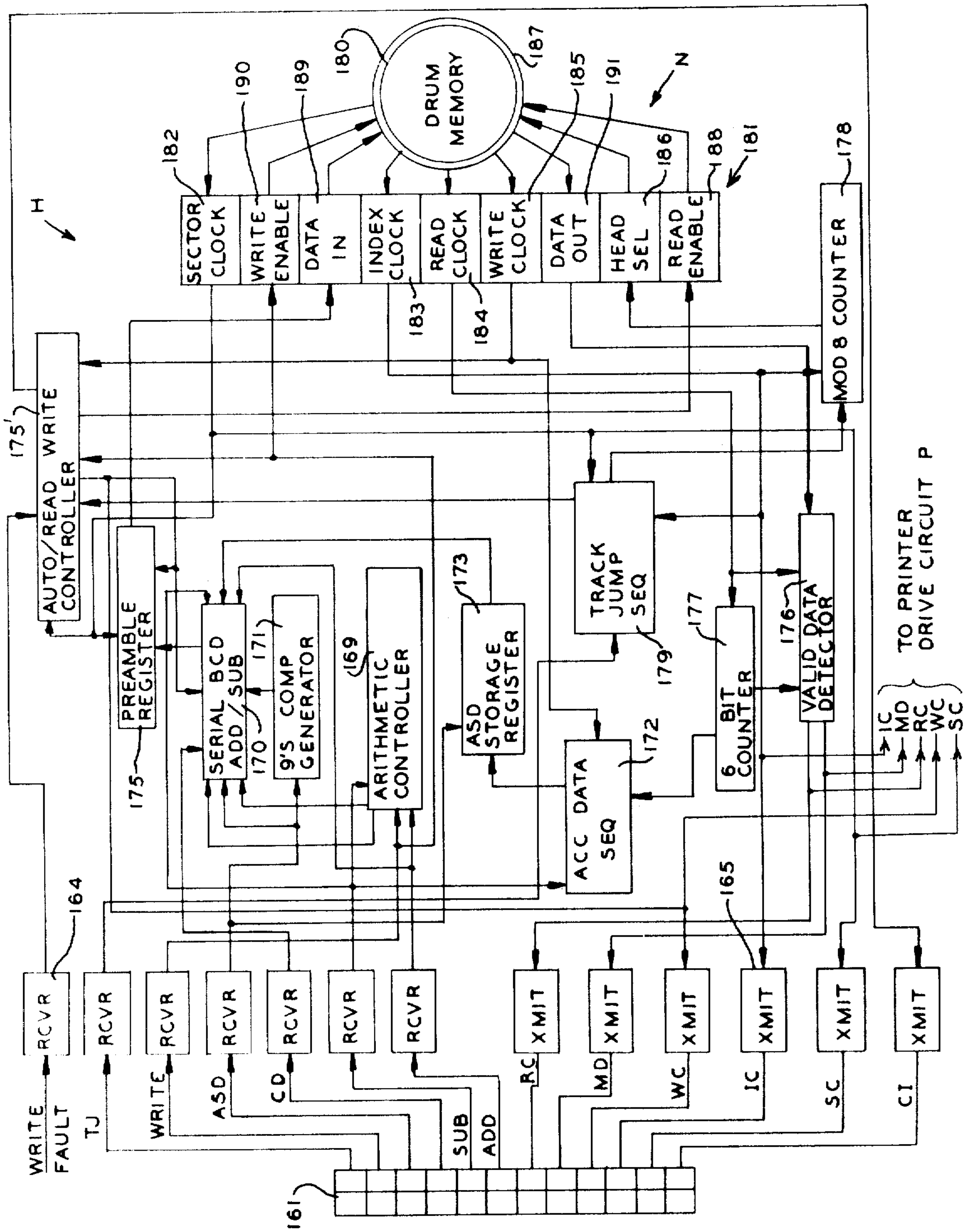
FIG. 6 is a schematic view of a central electronics unit forming part of the electronic data processing system.
Figure 13:
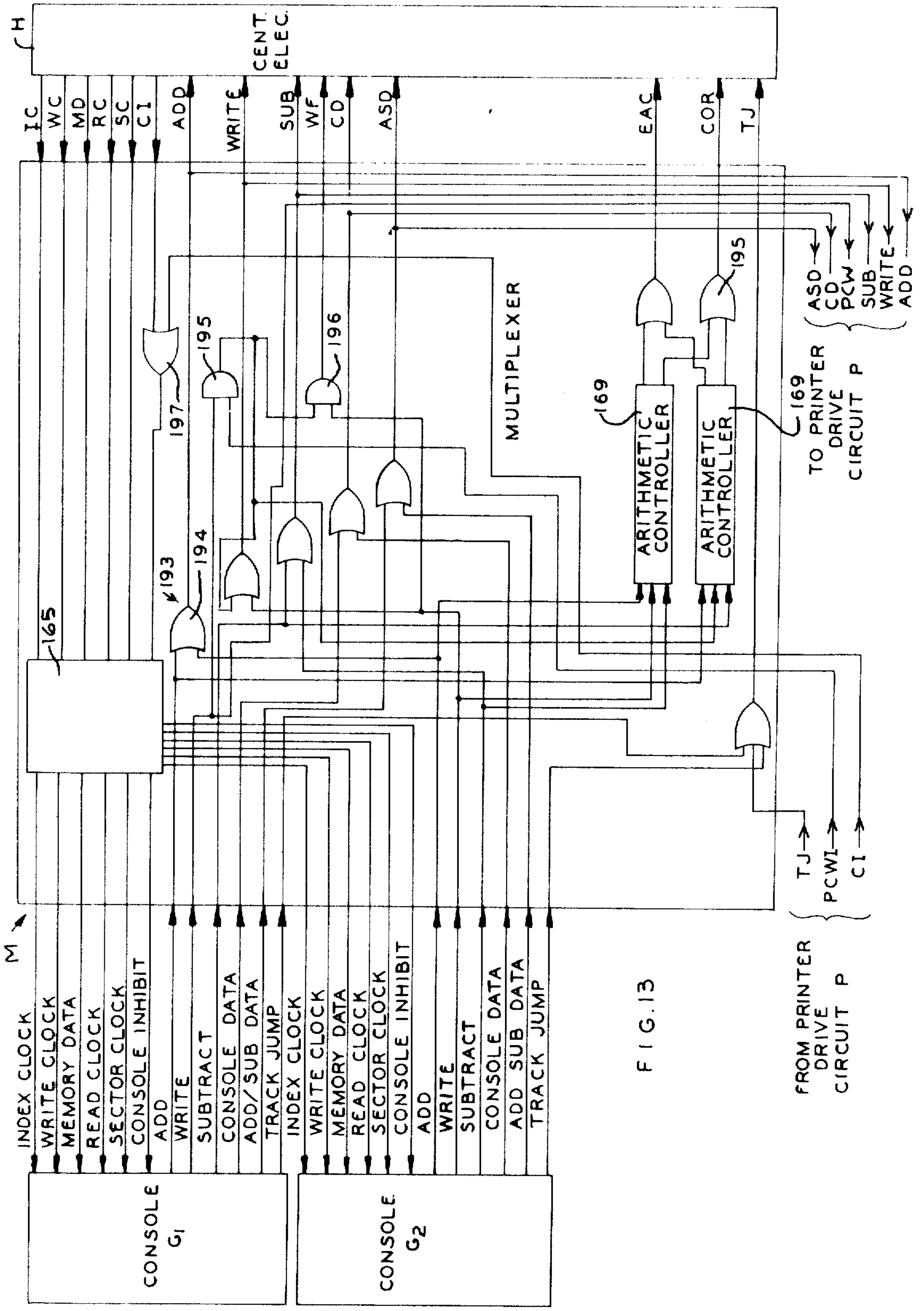
FIG. 13 is a schematic view of the electrical circuitry employed when multiple console units are interfaced with a single central electronics unit.

By reference to the composite view of FIGS. 5A, 5B and 5C, as well as FIG. 6, it can be seen that the console unit G can be removably connected to the central electronics unit H. Furthermore, a plurality of console units G can be connected to and operable from one central electronics unit H in a manner to be hereinafter described in more detail and as illustrated in FIGS. 1 and 13. It should also be recognized that if only one console unit G is employed, the console unit G and the central electronics unit H can be conveniently formed as a unitary assembly in a housing similar to that illustrated in FIG. 2. However, these units are generally formed as two distinct and separable units, which are capable of removable connection to each other. In order to view the composite illustration of FIGS. 5A through 5C and FIG. 6 as a unitary circuit, it is only necessary to envision a connection of the various lines extending among FIGS. 5A–5C and FIG. 6 and to envision a connection of the various contacts presented in the terminal connectors 161 and 162.

By further reference to FIGS. 5C and 6 it can be seen that the outputs of the console unit G are provided with transmitters 163 prior to connection to contacts on the terminal board 161. In like manner, the respective compatible lines on the central electronics unit H which receive the outputs from the console unit C are provided with receivers 164. Furthermore, the outputs of the central electronics section N are provided with transmitters 165 prior to connection to the contacts on the terminal board 162. The respective compatible lines in the console unit G which receive these outputs from the central electronics section H are provided with receivers 166.

These receivers and transmitters are necessary since the various lines connecting the console unit G and the central electronics unit H contain data for high speed transfer and these lines may have considerable length. Therefore, the transmitters 163,165 are low impedance drivers and are capable of supplying sufficient current to drive these lines when loaded with their characteristic impedance levels. Similarly, the receivers 164,166 are differential amplifiers with logic level outputs.

DETAILED DESCRIPTION OF THE CENTRAL ELECTRONICS UNIT

The central electronics unit H, wbich is more fully illustrated in FIG. 6, generally comprises an arithmetic controller 169 and a serial BCD adder/subtracter 170.

The adder/subtracter 170 receives both add/subtract data on the ASD line and console data on the CD line. In addition, the adder/subtracter 170 receives an add pulse on the ADD line and a subtraction pulse on the subtract line SUB. The adder/subtracter 170 also receives a pair of inputs from the arithmetic controller 169.

A nines complement generator 171 receives the add-/subtract data on the ASD line as well, and provides an output to the adder/subtracter 170 so that information is provided for either addition or subtraction. The add and subtract pulses provide an informative signal to the adder/subtracter 170 to place the decimal digit component of a sector either in condition for adding or subtracting. In addition, the add signal line ADD and the subtract signal line SUB are connected to the arithmetic controller 169 so that the add and subtract signals are coupled with the write signal in the arithmetic controller 169. The arithmetic controller 169 also receives a WRITE command from the control electronics unit G over the WRITE line. In this manner, the arithmetic controller 169 issues a correct pulse to the adder/subtracter 170 to convert sumes therefrom to BCD format and a set carry pulse to provide an end around carry for subtraction. The arithmetic controller 169 includes a flip-flop (not shown) which determines whether an add or a subtract function has been instituted. The arithmetic controller 169 also includes the necessary gating to send out either the add pulses or the subtract pulses when the write signal occurs. Both pulses may be generated, but at different times when an add operation and a subtract operation are to take place in different parts of the sector. Furthermore, since only four bits of each six bit byte are used in either of these arithmetic functions, the adder/subtracter 170 internally includes a device to account for the extra two bits in each six bit byte.

In the particular code employed, only four bits in the least significant bit positions of each six bit byte are used in the arithmetic functions. The additional bits are not used in the add sequencing, and accordingly, no carry can be introduced into the fifth bit position or the sixth bit position. In the event that a carry exists with respect to the first four bits, the carry is added into the first four bits of the next byte. A carryover could exist without any implications, since no non-numeric data bits were present. However, since characters including both numerals and arabic letters are included in the code employed in the system of the present invention, addition can only be performed to the first three least significant digit positions. It should be observed that any number of digits could be used in each sector for purposes of performing the arithmetic functions. The nines complement generator 171 serves to place the add/subtract data in proper condition for subtraction.

The central electronics unit H also includes an accumulated data sequencer 172 which receives a subtract data input over the subtract line SUB and a write clock input from the memory electronics to be hereinafter described. The accumulated data sequencer 172 has an output connected to the input terminal of an ASD storage register 173 which also receives add/subtract information over the add/subtract data line ASD. The ASD storage register 173 also has an output to the serial BCD adder/subtracter 170.

The output of the serial BCD adder/subtracter is introduced into a preamble register 175 which is designed to introduce both preamble and postamble bits to the data to be written into the memory section N. As previously indicated, each 54 bit sector of information, whether part number or part data, is provided with a preamble and a postamble. It should be observed by reference to FIG. 6 that the preamble register 175 also receives a reset in the form of a sector clock pulse from a sector clock amplifier located in the memory section N.

The preamble which is written by the preamble register 175 consist of eight zeros followed by a one. The preamble is always added to any part number sector or data sector which is to be written on the drum in order to allow synchronization of the read electronics on playback. The first eight zeros of the preamble allows sufficient time for the read electronics to synchronize upon receipt of a signal from the memory section N. A postamble of two zeros is added to each part number sector and each part data sector which is introduced into the memory section N. The postamble serves to insure that all of the permanent bits contained in any part number sector or any data sector has in fact been written in the mrmory section N.

The central electronics unit H also includes an automatic read/write controller 175' which receives an input from a write clock amplifier in the memory section N, to be hereinafter described, and the controller 175', in turn, provides an output to the preamble register 175, the serial BCD adder/subtracter 170 and a write clock output to the console unit C over the write clock line WC. An output from the read/write controller 175' is also directed to the read enable circuit in the memory section N. When multiple console units are employed in a manner hereinafter described in more detail, the clock pulses are transmitted to the multiplexer which controls the various console units. The automatic read/write controller 175' receives a write input from the console unit G over the WRITE line to inhibit a read signal to the drum in the memory section N. The automatic read/write controller 175' also receives a sector clock signal from the memory section N for the timing of the various functions performed by the read/write controller 175'. When multiple console units G are employed, the auto read/write controller will receive a write fault signal in the manner as illustrated in FIG. 6, if two or more console units attempt to update the same sector on the drum in the memory section N.

The read signal to the drum in the memory section N is derived from the automatic read/write controller 175' and must be disabled for a certain period of time in order to insure that information being received from the memory section N is free of write transients. This procedure is significant inasmuch as it is desirable to maintain a write operation for a minimum amount of time. Accordingly, the central electronics unit G will normally be maintained in a read condition so that the memory section N is not inhibited and must be biased to a write condition by the write signal from the console unit G over the WRITE line. However, as soon as writing has been completed, the central electronics unit H will automatically shift to a read condition. As indicated, the read and write functions are complements of each other with delays incorporated to provide for transient conditions. It should also be observed that the console inhibit signal over the console inhibit line CI to the console unit G is derived from the auto read/write controller 175', and is generated by any write signal from any console unit G.

It should be observed that the clock pulses used in the writing mode are not synchronous with the memory section N and, therefore, the postamble serves the function of insuring that all bits are written into the memory section. This postamble will enable the obviation of variations in motor speed, clock pulse rate, etc.

The central electronics unit H also includes a valid data detector 176 which operates in conjunction with a six bit counter 177 and receives an input from the six bit counter 177 in the manner as illustrated in FIG. 6. The valid data detector 176 operates in conjunction with the bit counter 177 to determine when a sector of 54 bits has been achieved. Accordingly, after 54 bits have been counted by the bit counter 177, the postamble of an unknown number of bits can be removed. The preamble ending in the first "one" bit can also be removed from the next 54 bit sector. Counting will be performed on a clock time basis inasmuch as the bit counter 177 receives clock pulses from the read clock amplifier in the memory section N. It can also be observed that read clock pulses and read data are transmitted from the valid data detector 176 to the console unit G.

The central electronics unit H also includes a modulo 8 counter 178 which operates in conjunction with the memory section N in a manner to be hereinafter described in detail. The modulo 8 counter 178 sequentially selects the eight tracks of the drum in the memory section N. This sequence is never altered except in the case of track jumping operations to be hereinafter described.

As indicated, the valid data detector 176 receives an input from the six bit counter 177. The valid data detector 176 also receives a data output signal and a read clock signal from the memory unit N in the manner as illustrated in FIG. 6. The valid data detector 176 thereupon provides a memory data output over the memory data line MD and a read clock output over the read clock line RC to the console unit G. The six bit counter 177 also receives a read clock input from the memory unit N and has an output directed to the accumulated data sequencer 172. The modulo 8 counter 178 receives an index clock input from the memory unit N and has an output to a head selection circuit in the memory unit N, in a manner to be hereinafter described in more detail.

The valid data detector 176 serves as a device for removing both a preamble and a postamble added to both part number sectors and part data sectors before the part numbers and part data are introduced into the memory section N. The vaoid data detector 176 is capable of receiving NRZ data from the memory section N in a manner hereinafter described and producing an NRZ output which is transmitted to the memory data line MD for transmission of this data to the console unit G. As indicated, the preamble associated with any part number sector or part data sector will be recognized by the valid data detector 176. In recognizing the preamble, the valid data detector 176 will determine when the preamble "one" occurs. This is determined by disregarding the read data subsequent to sector clock pulse for an amount of time determined by a delay (not shown). The valid data detector 176 is then capable of disregarding the preamble and postamble associated with any sector and generating an NRZ output for transmission to the console unit G. Furthermore, since it is undesirable to count preamble and postamble clock pulses, the bit counter 177 will only start counting when the valid data detector 176 sends an advisory signal to the bit counter 177 which occurs after the preamble and postamble removal.

The central electronics unit H also includes a track jump sequencer 179 which has an output connected to the modulo 8 counter 178, an output connected to the valid data detector 176 and an output connected to the auto read/write controller 175'. The track jump sequencer 179 also receives an input from the track change sequencer 158 over the track jump line JT in the manner as illustrated in FIG. 6.

The memory section N generally comprises a magnetic drum or disc 180 of the type normally used in digital computing equipment and which is capable of having NRZ data or data in phase modulation format or other conventional transitional coding scheme written thereon. Furthermore, it should be observed that the drum 180 may be made of a metallic disc having a magnetic tape or a magnetic recording surface disposed on the annular surface thereof.

The memory section N includes a memory circuit 181 which comprises a sector clock amplifier 182 providing sector clock pulses to the preamble register 175, the track jump sequencer 179, the valid data detector 170 and which also provides sector clock pulses to the console unit G along the sector clock line SC. It can be observed that the sector clock amplifier 182 receives the sector clock pulses from the drum 180. The memory electronics 181 also includes an index clock amplifier 183 which provides index clock pulses to the modulo 8 counter 178, the track jump sequencer 179, the valid data detector 176 and to the console unit G over the index clock line IC. The index clock amplifier 183 receives the index clock pulses from the drum 180. A read clock generator 184, which also receives the read clock pulses from the drum 180 provides a read clock output to the valid data detector 176 and the six bit counts 177. A write clock amplifier 185 also receives write clock pulses from the drum 180 and transmits these pulses to the console unit G over the write clock line after processing by the automatic read/write controller 175' . Write clock pulses are also introduced into the accumulated data sequencer 172. A head selection circuit 186 is operable in connection with the index clock generator 183 and receives pulses from the modulo 8 counter 178 based on index clock time. The head selection circuit 186 operates to select the proper track for reading and writing by three read/write heads 187 which are located in contact with the surface of the drum 189. The three heads 187 are illustrated as a circle in FIG. 6.

When the index clock amplifier 183 provides a clock pulse, the head selection circuit 186 will be energized in such manner that it causes the head 187 to switch to the next adjacent track on the drum 180. In this connection, it should be recognized that the drum 180 has a total number of sectors on each track which is equivalent to 547 sectors of 54 bits per sector. Furthermore, it should be observed that any number of tracks may be located on the drum 180, the number of which is limited only by the size of the drum 180. Moreover, the overall diameter of the drum 180 can be increased to provide space for recording additional sectors in each track on the drum 180.

The heads 187 function as both reading heads and writing heads and receive inputs from a read enable circuit 188, a data input circuit amplifier 189 and a write enable amplifier 190. The data in amplifier is capable of introducing both part number and part data onto the drum 180 in the drum code format and receives data from the preamble register 175 in NRZ format. The write enable amplifier 190 actually receives the write command from the console unit G on the WRITE line. The memory electronics 181 also includes a data output amplifier 191 where the data read from the drum 180 is transmitted through the amplifier 191 to the valid data detector 176. It can be seen that the read clock amplifier 185 also has an output connected to the valid data detector 176. Finally, the read clock amplifier 184 receives an input from the read enable circuit 188.

ADDRESSING SYSTEM

Prior to discussion of the operation of the system of the present invention, it is important to appreciate the unique internal addressing system which is employed for both recording part numbers and part data on the drum and reacquiring those part numbers and associated part data from the drum. The addressing system of the present invention which operates on the basis of the internal construction does not require any external "software" programming. Furthermore, this addressing system readily lends itself to rapid and convenient location of part numbers and data on the drum for printing of the same.

As indicated previously, the present invention is capable of introducing and recording information containing a locator portion (i.e., part numbers) and a descriptor portion (i.e., part data associated with the part numbers). The information may be recorded in such manner that a part number and part data associated with that part number are all located in the same track of the memory section, though it is possible to space the part numbers and associated data by one or more sectors. The part number would be recorded in one sector 54 bit spaces) of one track of the drum and the part data associated with that part number would also be recorded in the next succeeding sector (54 bit spaces) on the same track of the drum. Naturally, it is possible to vary this arrangement by recording the part number in one sector on one track of the drum and recording the data associated with that part number in another sector on the same track, but which data sector is spaced from the part number sector by one or more additional sectors in that track.

Figure 7:
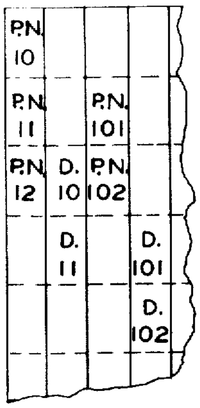
FIG. 7 is a schematic illustration of a magnetic drum or disc addressing scheme employed in the present invention.

In the preferred addressing technique of the present invention, the part numbers are recorded on one track of the drum and the data associated with those part numbers are recorded in sectors in another track of the drum which may be directly adjacent to the part number track or spaced from the part number track by a number of additional tracks. For example, it can be seen by reference to FIG. 7, that part numbers are recorded in consecutive sectors on the first track of the drum, that is, the lefthand track of the drum in FIG. 7. It should be recognized that only four tracks have been illustrated and a small number of sectors have been illustrated in each track. However, it should be understood that generally the drum contains a large number of tracks and a large number of sectors in each of these tracks. Furthermore, it should also be understood that each illustrated in FIG. 7 is sized to contain 54 bits of information.

Returning to FIG. 7, it can be seen that a part number designated as P.N. 10 is recorded in the first sector of the first track. A second part number designated as P.N. 11 is recorded in the second sector of the first track, and a part number designated as P.N. 12 is recorded in the third sector of the first track. The data which is associated with the part number P.N. 10 and which data is designated as D 10 is recorded in the third sector of the second track. The data D 11 which is associated with part number P.N. 11 is recorded in the fourth sector of the second track. In like manner, a part number designated as P.N. 101 is recorded in the second sector of the third track, and the data associated with that part number, namely D 101, is recorded in the fourth sector of the fourth track. It can thus be seen that in the preferred form of addressing, the part numbers are located in consecutive sectors on one track. The data is located in the next adjacent track and is spaced from the part number with which it is associated by at least two sectors. In this manner, a number of console units can simultaneously search the drum for a particular part number and when that part number is found, the head can be switched to the next adjacent track in order to locate the data associated with that part number. The mechanism for accomplishing the switching of track is described in more detail hereinafter.

From the foregoing, it can be seen that the part numbers are recorded in a form of associative addressing. When the part numbers are recorded on the drum, the part number can be located by introducing the same part number in the console register 130. A comparative search is then performed in a manner to be hereinafter described until the desired part number is found on the drum. In this manner, the pre-recorded address is found by comparing the pre-recorded address with the particular address introduced into the console register, and recognizing the pre-recorded address upon coincidence of comparison between the pre-recorded address and the desired address. On the other hand, it should be observed that the data associated with this particular part number is directly addressed with respect to the part number. It should also be observed that this data is located in a particular sector with respect to the part number. While the data may be located adjacent to the part number sector and in the same track, or it may be located in an adjacent track and even spaced from the part number by several sectors, it is nevertheless directly related in time and distance to the part number sector. Accordingly, when one searches associatively for the part number sector, the data associated with that part number sector is automatically defined by virtue of the particular track and sector it would be recorded in, with respect to the part number sector.

It should be observed that the present invention provides a unique type of addressing system which is a combination of a form of associative addressing and a form of direct addressing. In essence, the combination associative-direct addressing can be defined as "a process for recording a word having a locator portion and a descriptor portion, or a group of words with a locator portion and a descriptor portion in a magnetic memory, or retrieving such word or words for such memory by serially recording bit combinations for a locator portion in a particular location of one sector of the memory thereby defining a locator address, and recording bit combinations for a descriptor portion in a particular location of another sector of the memory and which location of the descriptor portion is related to the locator portion in addressable manner, thereby defining a descriptor address; and retrieving such word or words by associatively selecting the locator address of the locator and directly selecting the descriptor address from the locator address."

Thus, in the combination associative-direct addressing, it can be seen that the 54 bits representing the part number is located in a particular sector of a certain track on the drum. The sector includes all of the bit combinations representing the part number recorded in serial fashion. The data (namely the descriptor) is recorded in either the same track or another track and in a particular sector in the data track. In other words, when the part number sector is located, it is located by an associative addressing technique in the manner as previously described. The data sector is located by referring to the location of the part number sector inasmuch as the data sector is located in a track and sector which is located in time and space with respect to the part number sector, and therefore, automatically determinable.

In many cases, it is desirable to include two or more data sectors associated with a particular part number sector. The addressing scheme used in this latter case is more fully illustrated in FIG. 8. In this case, it can be seen that a part number designated as P.N. 10 is recorded in the first sector of the first track. The part number P.N. 10 will have two data sectors associated therewith which are designated as $D10_1$ and $D10_2$. The data sectors located in the track are adjacent to the first track, namely, the data sectors are located in track No. 2. It can be seen that the data sector $D10_1$ is located in sector 3 of track No. 2 and the second data sector $D10_1$ is located in sector No. 4 of track No. 2. The next part number, namely the part number designated at P.N. 11, is recorded in the second sector of the first track. The two data sectors associated with P.N. 11 and which data sectors are referred to as $D11_1$ and $D11_2$ are located in the fourth and fifth sectors, respectively, of track No. 3. In like manner, the part number designated as P.N. 12 is located in sector No. 3 of track No. 1. The two data sectors associated with P.N. 12, namely, $D12_1$ and $D12_2$ are located in sectors of five and six respectively, of track No. 2. Therefore, it can be observed that the two data sectors associated with the first part number are recorded in the next adjacent track, and are spaced from the part number by at least two sectors. For the next part number in the first track, the two data sectors are also spaced at least two sectors apart, and are located in the second adjacent track with respect to the part number track. The third part number has the two data sectors located in the next adjacent track and are also spaced by at least two data sectors. For each succeeding part number, this arrangement is continued.

OPERATION OF THE COMBINATION CONSOLE UNIT - CENTRAL ELECTRONICS UNIT

From the foregoing description, it can be observed that information may be entered into the console unit G by a plurality of techniques. First of all, both part numbers are part data associated with the part numbers can be introduced into the console G by means of actuation of the keys 113–116 on the keyboard 112. Secondly, data can be introduced into the console unit G, particularly for addition and subtraction functions, by means of the thumbwheel digit switches 138. Finally, data may be introduced into the console unit G by actuation of any one or more of the digit change switches 140. As indicated previously, information is introduced into the console unit G in such manner that a part number which may contain as many as nine characters either in arabic form or decimal digit form is represented by 54 bits, or nine bytes of six bits each. Thus, a part number will be represented by a sector of 54 bits and the part data associated with that part number will be represented by a second sector of 54 bits.

When it is desired to write a new part number onto the drum 180, the operator of the system will actuate the clear switch 117. The write new part number switch 123 operates with the zeros locator 137 to select an all zero sector location in the drum 180. After the clear switch 117 has been actuated, data may be introduced into the console register 130 through actuation of the various switches 113–116 on the keyboard 112. After the new part number has been introduced into the console register, recirculation of this information will take place through the console register 130. It can be observed that the output of the console register 130 is recirculated back through the gate 146 and into the input of the console register 130. It should be observed that the data introduced through the keyboard is delayed slightly in order to account for any keyboard vibration as previously described. The information introduced into the console register 130 will be visually depicted on the display tubes 111, also in the manner as previously described. The anode shift register 135 and the six bit to 13 segment decoder 134, in combination with the console register 130 operate to collectively and consecutively energize each of the display tubes 111. Each character which is represented by six bits in the console register 130 will be visually depicted on one of the display tubes 111 for approximately 100 microseconds. Thereafter, the display will shift to the next adjacent display tube 111 for an additional 100 microseconds. This procedure of consecutive display of each of the characters represented by respective bits in the console register 130 is based on memory clock data which is received from the drum 180.

After the part number has been introduced into the console register 130, the operator can then press the write new part number switch 123. As this occurs, the gating structure previously described will be enabled in such manner to permit the part number to pass through the console data line CD into the central electronics unit H. This part number will pass through the serial BCD adder/subtracter and into the preamble register 175 where both a preamble and a postamble can be introduced onto the part number, and thereafter, the part number is written onto the drum 180. When the write new part number switch 123 is actuated, the display on the display tubes 111 will momentarily vanish and thereafter display the new part number. During this sequence, the search light 137' will be energized to indicate that no information can be written into the memory until the light 137' is deenergized. At the time that the display tubes 111 are deenergized, the console register 130 is not immediately available for new data due to the access time in the memory section N. Accordingly, if another switch on the console unit G is actuated during the time that the search light 137' is energized, no function can take place.

It should be observed that information in the console register 130 is continually circulating from the right-hand end of the register, reference being made to FIG. 5C, back to the input thereof. The information will shift in six bit bytes on a memory clock time basis. After six shift pulses have been generated for shifting six bits in the console register 130, a delay is created for the strobing of the display tubes 111. A second shift of six bits takes place on a memory clock time basis and strobing of the next display tube 111 then occurs. This sequence takes place continuously during the display operation.

When writing data onto the drum 180, the clear switch 117 is then actuated. The part number with which the data is to be associated is then introduced into the console register 130 by actuation of the various keys 113–116 on the keyboard 112. This information is then introduced into the console register 130 in the manner as previously described. Thereafter, the write data switch 121 is actuated which immediately causes the display tubes 111 to deenergize and the search light 137' to become energized. In addition, the part number which was displayed on the display tubes 111 will disappear leaving a blank display. During the time that the search light 137' is energized, searching will be accomplished to determine the location of the desired part number on the drum 180. The comparator 143 which is located in the console unit G will receive bits on a serial basis from the console register 130 through the zeros locator 137. In like manner, the comparator 143 receives data from the drum 180 on the read/data line. When the write data switch 121 is actuated, the data output amplifier 191 will receive the various part number sectors on the drum 180 through the heads 187. This information will pass through the valid data detector 176 for preamble and postamble removal and for transmission over the memory data line MD. Accordingly, the information read from the drum 180 will be compared with the information from the console register 130 serially on a bit-by-bit basis.

After comparison has been recognized, the search light 137' will become immediately deenergized. It should also be observed that the sector counter 142 will be counting the sector clock pulses that are received from the central electronics unit H. The sector counter 142 will recognize the beginning of the sector in which comparison was found. As indicated, when comparison is found, the search light 137' will be deenergized. At this point in time, the operator can then introduce data into the console register 130 by actuation of the keyboard 112. Again, this data will be displayed on the display tubes 111 in the manner as previously described. The display of this data will enable the operator to make a visual check for accuracy of the information introduced into the console register 130. The operator then actuates the write data switch 121 for a second time. The display tubes 111 will again become deenergized and the new data will reappear thereafter in the display tubes 111. During the time that the display tubes 111 are deenergized, the search light 137' will be energized. When the write data switch 121 is actuated for the second time, the write data line is enabled thereby permitting the write amplifier 119 to cause the heads 187 to write this new data onto the drum 180. In addition, the write line WRITE will be actuated causing the new data to be recorded.

Part data contained on the drum 180 can be read by first actuating the clear switch 117 and thereafter introducing the part number associated with the desired part data into the console register 130 by actuation of the keys 113–116 on the keyboard 112. After the desired part number has been introduced into the console register 130 and displayed on the display tubes 111, the operator can then actuate the read switch 118. It is to be noted that read information has been introduced into the console unit G at all times on the read data line. When the read switch 118 is actuated, the console register 130 will permit circulation of the bits contained therein until the least significant bit of the part number sector is located in the least significant bit position in the console register; that is, where the least significant bit is located in the right-hand flip-flop 131 in the console register 130. Comparison is then made with the information on the drum 180 on bit-by-bit basis in the manner as previously described. Comparison will be determined only at sector time, also in the manner as previously described. If the information in the console register 130 is compared with information read from the drum 180 on a bit-by-bit basis, then the next adjacent sector on the drum 180 in sequence, is the part data sector which contains the part data to be read. It should also be observed that the modulo 557 sector counter 142 was set in order to record the location on the drum 180 from which part data was read and introduced into the console register 130.

This counter 142 is initialized so that each time the counter 142 achieves a counter of 557 bits, the location of the desired data is recognized. At this point in time, the next sector is gated through the input gate 146 into the console register 130 and is circulated six bits at a time and displayed on the display tubes 111. When the read switch 118 is actuated, the display on the tubes 111 will momentarily vanish and the data associated with the part number will then appear. During the time that the display 111 is deenergized, the search light 137' will be energized in the manner as previously described. At this point in time, the data associated with the introduced part number has then been transferred to the console register 130. This data, as indicated, will be depicted on the display tubes 111.

In order to rewrite or change an existing part number, the operator will actuate the clear switch 117. Thereafter, the operator will introduce the existing part number into the console register 130 by actuation of the keys 113–116 on the keyboard 112. This existing part number will be displayed on the display tubes 111 in the manner as previously described. Thereafter, the change part number switch 122 is actuated. At this point in time, the display tubes 111 will then clear and the search light 137' will become energized. During this portion of time, the existing part number which has been introduced into the console register 130 is being compared with information read from the drum 180 on a bit-by-bit basis in the manner as previously described. When comparison has been found, the search light 137' will be deenergized.

The operator can then introduce the new part number into the console register 130 by actuation of the selected keys 113–116 on the keyboard 112. The change part number switch 122 is actuated for a second time which will cause a de-energization of the display tubes 111 and reenergization of the search light 137'. As this occurs, the changed part number which was introduced into the console register 130 is written on the drum 180. This information is passed through the output of the console register 130 over the console data line CD through the serial BCD adder/subtracter 170 and into the preamble register 175. A preamble and postamble will be added to this part number in the manner as described where the part number will be in a form to be properly written onto the drum 180 and the new part number is then redisplayed. If it is desired to read the part data associated with the rewritten part stock number, the read switch 118 is then actuated and this part data will appear in the console register 130 and the display tubes 111 in the manner as previously described.

As indicated previously, the preferred method of addressing the information which is recorded on the drum 180 resides in the recording of part number sectors on one track of the drum and part data sectors associated with those part numbers on at least the next adjacent track, and on a sector which is spaced in advance of the part number sector. It has been found that by recording the part numbers successively on an individual track or on a plurality of tracks, where the tracks contain only part numbers, that all part numbers can be examined in a substantially smaller amount of time than when data sectors are mixed with the part number sectors on the same track. Accordingly, the access time to the drum 180 is substantially reduced.

In the searching operation for a part number, the systematic search of all part numbers in the part number track will take place in the manner as previously described. When it is desired to acquire the data associated with that part number, the head select circuit 186 will select another track on the drum 180 containing the data sectors. In like manner, when it is desired to write data, the data is written on a sector of one of the tracks which does not include the part numbers. It is to be noted that the change track sequencer 158 has inputs from both the read sequencer 152 and the write sequencer 153. Accordingly, when it is desired to read or write in a sector located on a track other than a part number track, the read sequencer 152 or the write sequencer 153 is advised of the changes occurring in the change track sequencer 158. The change track sequencer 158 is connected to the track jump sequencer 179 and is capable of commanding a track jump to the central electronics unit H.

The console unit G issues the track jump signal at the end of a particular part number sector. This track jump signal is a high speed signal to the track jump sequencer 179 in the central electronics unit H. The track jump sequencer 179 also immediately issues a track jump signal to the auto read/write controller 175' to cause the head select circuit 186 to select a different track on the drum 180. Simultaneously therewith, the track jump sequencer 179 causes a switching from the read clock pulses to write clock pulses. It is to be noted that the input to the valid data detector 176 from the track jump sequencer 179 also causes an immediate inversion of the data which is being transmitted to the console unit G over the memory data line MD. This inverted information transfer is desirable after a track change in order to allow for a head recovery and also apprises the console unit G that a track jump has occurred. After head recovery has taken place, the write clock pulses are switched back to read clock pulses so that data transfer may be again initiated. However, the data will remain inverted until all of the data for that particular address has been read and the head select circuit 186 causes the heads 187 to switch back to the original track. Actually, the read clock pulses will not be initiated until the head recovery in the original track is achieved. At this point in time, the data is reinverted to its original correct position. Inversion of the data is caused by an inverter (not shown) located in the valid data detector 176.

It should also be observed that the switching of the clock pulses is achieved by a signal from the track jump sequencer 179 to the auto read/write controller 175'. Furthermore, it can also be observed that the track jump sequencer generates an input signal to the modulo 8 counter 178.

It is to be noted that the data sector is located at least two sectors after the part number sector and on a different track in order to allow for head recovery time. Thus, when the reading head 187 detects the presence of the desired part number in a part number track, the change track sequencer 158 and the jump track sequencer 179 will cause another head 187 to read the next adjacent track in order to locate the correct data associated with that part number. In many cases, a sector of information is not read as the head switches from track to track and, accordingly, by locating the data sector at least two sectors in advance of the part number sector, the head 187 is capable of reading the data sector after the track switching operation. Furthermore, after the head 187 switches back to the original part number track, the head will remain on that track for at least a revolution of the drum 180 before any additional track switching operations take place.

While the present invention speaks of switching the heads 187, it should be recognized that this terminology has been employed to maintain consistency with the terminology of this art. Actually, the head 187 does not physically change position during track switching operations, but only the head of the next adjacent track is caused to read or write in such next adjacent track. However, it should also be recognized that with proper circuitry, only one head 187 could be employed and with proper shifting mechanism, the head 187 could physically shift from track to track.

In the case where two or more sectors of data are employed with each part number, a sector counter (not shown) in the track jump sequencer 179 determines whether the part number sector is an even-numbered sector or an odd-numbered sector. This particular counter receives the sector clock pulses and the index clock pulses for this purpose. It should be observed that the track jump sequencer 179 receives index clock pulses and sector clock pulses from the memory electronics 181. Accordingly, it is possible to maintain a recognition of the occurrence of the part number in the particular part number track. For example, in the situation where multiple data sectors are associated with one part number sector, the track jump sequencer will determine if the part number is an odd-numbered or even-numbered part number with respect to its location on the track. Thus, the part number of P.N. 10 is an odd-numbered part number since it occurs in the first sector of the part number track. Accordingly, the data associated with this part number sector is located in the next adjacent track. The part number designated as P.N. 11 is located in an evennumbered sector, namely the second sector and therefore, the data associated with this part number is located in the third track. In like manner, if three sectors of data were associated with a particular part number, data for the third part number in succession would be located in the fourth track.

The redundant address inhibit circuit 157 is designed to prevent the writing of a part number which has already been recorded but still remains active in the drum 180. It is to be noted that all sequencers, and in fact, most of the components in this system are initialized by reset signals from the clear switch 117. The circuitry to each of the components from the clear switch 117 and the OR gate 136' has not been illustrated, in order to maintain clarity in the drawings. It is to be noted that the redundant address inhibit circuit 157 receives an input from the write part number switch 123 which provides indication to the redundant address inhibit circuit 157 when a write part number operation has been initiated upon actuation of the write part number switch 123. Further, the input to the redundant address inhibit circuit 157 from the comparator 143 advises when a sector of all zeros has been found in the drum 180 for the writing of a new part number. In like manner, the redundant address inhibit circuit 157 has an output to the write sequencer 153 which provides a nullify signal to the write sequencer 153 if the comparator detects the presence of the redundant address in the drum 180.

When the comparator 143 has found an all zeros location for writing a new part number, the write sequencer 153 will cause a review of the entire drum 180 to rearrive at the desired writing location. During the time interval between the finding of an all zeros location and the actual writing, which is equivalent to a full revolution of the drum 180, the comparator 143 is still looking for comparison with the console register data, namely the part number to be written. If during this period of time, the comparator finds that the part number has already been recorded on the drum 180, it inhibits any further writing as a result of the input to the write sequencer 153.

The bit counter 147 enables the use of partial sector addressing in the alpha-numeric data system of the present invention. In many cases, it is not necessary to employ all character positions in a sector for part number (locator) addressing. For example, a nine character sector space is available and if only five characters are necessary to identify a part number, the remaining four characters can be used for part data associated with the part number represented by the first five characters. In this case, the five six bit bytes or 30 bits would represent the part number and the additional 24 bits of the sector would represent part data associated with the five character part number.

When employing a partial sector address, the comparator 143 uses only those characters which comprise the address portion for purposes of comparison, and thereby ignores those characters representing data in that sector. In order to accomplish this partial address comparison, the comparator 143 is initialized after the data portion of the sector has passed in time. Inasmuch as the bit combinations representing the characters in the sector are recorded in reverse order, the first set of characters of a particular sector would then be data representing characters. Accordingly, if four of the characters in the nine character sector were data characters, the first four characters read by the comparator 143 would constitute the data characters. The bit counter 147' would count the first 24 bits representing these four characters, thereby rendering a determination that the data characters have passed beyond or passed through the comparator 143. At this point in time, the comparator then initiates comparison so that the remaining five characters in each part number sector are compared with five characters introduced from the keyboard 112 and then into the console register 130.

The data for addition and subtraction is introduced into the console unit G by means of the thumbwheel digit switches 138. This data is converted in the parallel to serial converter 139 and transmitted to the serial BCD adder/subtracter over the add/subtract data line ASD. The add/subtract data on the ASD line is also introduced into the nines complement generator 171 and the output of this generator 171 is reintroduced into the adder/subtracter 170.

In order to perform the addition or subtraction function, the operator first actuates the clear switch 117 and then introduces the part number associated with the part data to be changed by actuation of the keys 113–116 on the keyboard 112. The six bits representative of each character or the total sector of 54 bits is thereby introduced into the console register 130 in the manner as previously described. This part number will be displayed on the display tubes 111, also in a manner as previously described. Thereafter, the operator actuates the read switch 118 which will cause the display on the tubes 111 to momentarily vanish and the search light 137' to become energized. The part number address is searched in the memory 180 and when comparison is found, the search light 137' will be deenergized and will display the part data associated with that part number.

After the part number address has been found on the memory drum 180, the next adjacent sector to that part number contains the part data associated with that part number, and hence that part data will be displayed on the display tubes 111. The desired amounts to be added or subtracted are introduced into the console unit G by turning the thumbwheels 138 on the thumbwheel digit switches 138 to the desired quantities. If an addition function is to take place, the operator will then actuate the add switch 119 and, as indicated previously, the addition will take place in the adder/subtracter 170.

When the least significant bit is located in the least significant bit position in the console register 130, an inhibit line to the console register 130 will prevent clock pulses from being introduced into the console register 130. The sector counter 142 will then count the 557 bits and will recognize the address in the drum 180 when the least significant digit is located in the least significant bit positions of the console register 130. It should be observed that when the least significant bit of the sector is located in the least significant bit position in order to enable a subsequent writing operation, accordingly, clocking operations in the console register 130 terminate before receiving any sector clock pulses from the sector counter for proper addressing. Console data information and add/subtract data is simultaneously transmitted through the adder/-subtracter 170. After addition has been accomplished, the sum is passed through the preamble register 175 where both the preamble and postamble are written onto the new part data. This sum is then written directly onto the drum 180 in the proper location.

The data generated by the thumbwheel digit switches 138 is in parallel form and is converted to serial format in the parallel to serial converter 139 and transmitted in this serial form to the adder/subtracter 170. In like manner, data from the console register 130 is also added to the serial BCD adder/subtracter 170 over the console data line CD. Addition of these streams of bits from the register 130 and parallel to serial converter 139 can only take place when the least significant bit of each of the bit sectors is located in such fashion that it is the first bit in the sector to be received by the serial BCD adder/subtracter 170. Furthermore, bit streams from both the converter 139 and the register 130 are shifted by means of clock pulses so that comparison is made on a clock pulse basis.

When the add switch 119 or the subtract switch 120 is actuated by the operator, the display tubes 111 will be momentarily deenergized and the search light 137' will be energized. Actuation of the addition switch 119 or the subtraction switch 120 will also enable this information, which is operated upon in the adder/subtracter 170, to be written onto the drum 180 in the proper data sector after it passes through the preamble register 175. The new data is then displayed on the display tubes 111.

A character introduced into the console register 130 and displayed on the display tubes 111 can be changed in the same manner as the character was changed in the numeric apparatus A. When it is desired to change any particular character as represented by the display tubes 111, the operator merely presses the digit change switch 140 located proximate to that display tube 111 and the new character is introduced by actuating the proper key on the keyboard 112. The character will then immediately appear in the display tube 111 and the bits representing that new character will also be properly introduced in the proper bit positions in the console register 130.

It can be observed that the output of the display location decode circuit 133 is anded with the strobe from the six bit BCD encoder 126 through the delay 128 in the character load gates 127. An output from the display location decode circuit 133 will occur when the six bits representing the character to be changed are located in the least significant bit positions (flip-flops 131) of the console register 130. For example, when one of the character edit switches 140 is actuated, an output from the display location decode 133 will occur when the stage of the anode shift register 135 associated with that particular edit switch 140 is rendered true.

If the operator actuates the seventh character edit switch, an output from the display locator decode circuit 133 will occur when the seventh stage of the anode shift register 135 is rendered true. One of the keys on the keyboard 112 is actuated after the actuation of a character edit switch 140. Actuation of this key will generate six bits through the six bit BCD encoder 126 and which six bits are introduced into the character gate 127. Again, these six bits will only enter into the last six bit positions of the console register 130 when a strobe is received at the character load gate 127. Furthermore, these six bits will only enter the last six bit positions of the console register 130 when the seventh stage of the anode shift register 135 is rendered true.

It should be observed that the part number/data flip-flop 141 monitors the various sectors which are part number sectors and the various sectors which are part data sectors. In essence, this flip-flop 141 maintains a monitoring of which sector should be allocated for part data and which sector should be allocated for part numbers. The first sector reached after a track change on the drum 180 is allocated for part numbers. This procedure eliminates the searching for a part number and avoids inadvertent possible comparison with part data. Accordingly, the flip-flop 141 discriminates between the various sectors in order to avoid any possibility of part data/part number confusion. It should also be observed that the particular clock pulses used will change with the particular memory section N employed. The index clock pulses are generated for each revolution of the drum 180. The sector clock pulses are provided by the sector clock amplifier 182 at the beginning of each sector. A write clock pulse is generated by the write clock generator 185 which is essentially an oscillator used to clock the data on the drum. Read clock pulses are also generated from the data as it comes off of the drum 180 so that the read clock pulses are always in proper timing with the data read from the drum 180. Decoding is performed in the drum 180 by detecting flux reversal for generation of data as well as read clock pulses.

The modulo 8 counter 178 by virtue of receipt of the index clock pulses selects the proper head 187 for reading from the drum 180. The head select circuit 186 actually selects one of the eight heads on the drum for this reading function.

This selection operation is based on a continuous cycling for selection of the proper head 187 so that all sectors are examined sequentially. In essence, the sector clock pulses generated in the sector clock generator 182 indicate the beginning of each data sector of 54 bits and advises the console unit G of the beginning and ending of each sector in order to attain the proper 54 bits.

It should be observed that all clock information transferred from the console unit G to the drum 180 of the central electronics unit H and all return information to the console unit G are high speed transfers at the drum rate. However, it can be observed that if a long cable length were employed between the drum 180 and the console unit G, then all information transfers and the clock pulses would be delayed by as much as several hundred nanoseconds. Accordingly, the system of the present invention employs an early clock system which includes the early clock sequencer 159, illustrated in FIG. 5B.

Figure 9:
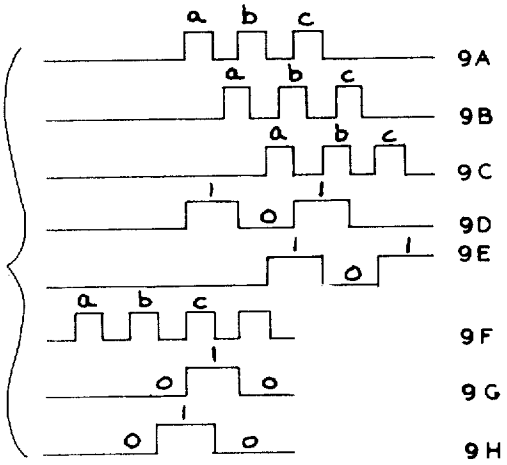

It can be seen that the early clock sequencer 159 receives a write clock input over the write clock WC. It can also be seen that the auto read/write controller 175' generates the write clock signals from the central electronics unit H, and these write clock pulses are always used in any write operation for recording either part numbers or data on the drum 180. FIGS. 9A–9H illustrate the various timing relationships between the write clock pulses and that data which is to be written on the drum 180. FIG. 9A illustrates three write clock pulses, designated as "*a*," "*b*," and "*c*," as they leave the central electronics unit H at the drum rate. If long cable transfer is involved, FIG. 9B illustrates the timing relationship with respect to the generation of the clock pulses and the time at which the three clock pulses, *a*, *b*, and *c* are received at the console unit G. FIG. 9C illustrates the timing at which data accompanies by these clock pulses would be received at the central electronics unit H after transmission from the console unit G. It can be seen that the clock pulses are received at the console unit G (FIG. 9B) approximately one and a half clock pulses late, due to long cable transfer. Again, it can be observed that the clock pulses received at the drum 180, as represented by the clock pulses in FIG. 9 C, would be approximately three clock pulses late.

FIG. 9D illustrates the timing in which it is desired to have data from the console unit received at the central electronics unit for purposes of writing. However, it can be observed that due to the long cable transfer delay, the data which would accompany the clock pulses in FIG. 9C arrive in a time relationship as illustrated in FIG. 9E. Again, it can be seen that the "1"data pulse is again one and a half clock pulses late at the drum 180.

FIG. 9F illustrates the issuance of three clock pulses from the auto read/write controller 175' and which are two clock pulses early. By generating the clock pulse frame with two early clock pulses, it can be seen that the same "1" data pulse arrives at the central electronics unit H in accordance with FIG. 9G. Furthermore, it is possible to offset the data pulse with respect to the clock pulses so that the data pulse arrives in the manner as illustrated in FIG. 9H. Accordingly, to avoid the problem with temperature and time shifts, it is possible to add the proper delay so that the clock pulse falls essentially in the middle of the data pulse as illustrated by comparing FIG. 9A with FIG. 9H.

The number of early clock pulses which is utilized in any particular console unit G depends on the amount of cable delay incurred between that console unit G and the central electronics unit H. If a number of console units G were connected to the central electronics unit H, the amount of the number of early clock pulses utilized by each of the console units may differ, depending upon the amount of cable length. The maximum number of early clock pulses utilized by any one console unit would be sent to all console units and each of the individual console units would utilize the required number of early clock pulses for transmission of the data to the central electronics unit for a proper time basis. It can be observed that by employing early clock pulses, this excess in the total number of write clock pulses transmitted to all console units would interfere with reading operations. Those console units which are reading as opposed to writing would experience a net gain in clock pulses, and this would manifest itself during the recirculation of the data in the console register during write operations. Accordingly, the data would be shifted with respect to the sector clock pulse time, thereby nullifying the capability of reading. It can be observed that the data always lines up with the least significant bit first, and if three or four early clock pulses are directed to each console unit, there would be a shift in console data with respect to sector clock. Accordingly, the data shift in the console register 130 would be off at least three or four bits with respect to the first significant bit. In order to correct this possible situation, during the sector following any write operations the auto read/write controller 175 will send to all console units G, a number of clock pulses less than the normal amount, by an amount identical to the extra clock pulses during the writing operation. In other words, if three early clock pulses are sent to all console units during the writing operation, and in the sector following, three less clock pulses will be sent to each console unit, thereby rendering a net gain of zero clock pulses after two sectors.

Figure 10:
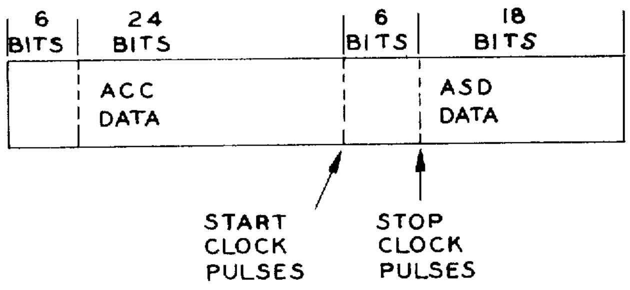
FIG. 10 is a schematic view of a 54 bit sector showing a portion of the sector reserved for accumulated data.

The system of the present invention includes a provision of accumulating certain of the data in each of the data sectors, by virtue of the existence of the accumulated data sequencer 172, and the ASD storage register 173. It should be observed that in a nine character sector consisting of 54 bits, several of the bit positions would be reserved for an accumulated data portion where another portion of bits would be reserved for arithmetic data. Referring to FIG. 10, it can be seen that four character positions containing 24 bits are reserved for accumulated data, and three character positions consisting of 18 bits are reserved for arithmetic data which is often called add/subtract data.

The accumulated data sequencer 172 is initiated by the subtract signal over the subtract line SUB, and also employs an input from the six bit counter 177, the latter of which indicates the position of the accumulated data in the sector. The six bit counter 177 will permit the gating of write clock pulses through the accumulated data sequencer 172 to the ASD storage register 173 in order to present add/subtract data to the serial BCD adder/subtracter 170. The clock pulses are added to the ASD storage register 173 during the portion of the sector which contains add/subtract data. This data is the first group of bits which is read from the drum 180. The pulses directed to the ASD storage register 173 are stopped for the bit positions containing the next character which does not represent arithmetic data. The clock pulses are again started when the 37 bit is read from the drum 180, and this bit represents the beginning of the character positions. The clock pulses to the ASD storage register 173 and the adder/subtracter 170 are controlled by the accumulated data sequencer 172. At a proper point in time, a clock pulse is directed to the ASD storage register 173 to cause the bits in the register 173 to be entered into the serial BCD adder/subtracter 170, so that these bits can then be serially added to data of the console register 130.

Thus, it can be seen that if data is entered by means of the thumbwheel switches 138 into the parallel to serial converter 139, that data is transmitted over the ASD line through the arithmetic controller to the serial BCD adder/subtracter 170. This information is then subtracted from the ASD data portion of the sector and stored in the ASD storage register 173. This information is then clocked out of the ASD storage register 173 and then added to the accumulated data portion of the sector. Further, it should be noted that information can be continually accumulated in the portion of the sector reserved for accumulated data. Each time one wishes to add more data to this portion of the sector, the data merely accumulates itself as data is subtracted from the ASD portion of the sector. For example, if one wished to accumulate the number of sales, the four character positions consisting of 24 bits would be reserved for the accumulated sales.

ZEROING OF ACCUMULATED DATA

The present invention may also include a circuit for adding and reading out, or so-called "zeroing-out" the accumulated data. In many cases, it is desirable to accumulate a certain portion of the data, such as sales in order to provide a periodic summary of this data. For example, referring to FIG. 10, it can be seen that in one data sector the first three characters consisting of 18 bit spaces contains add/subtract data. The next three characters of the 54 bit sector contains 18 bit positions representing other data such as price information, or the like. The next two characters consisting of 12 bit spaces would contain the accumulated data. Finally, the last character consisting of six bit spaces would contain other data. If the user of the apparatus desired to obtain a periodic reading of the accumulated data, such as a weekly or monthly indication of this accumulated data, it would be necessary to reduce the accumulated data to zero at the start of each week or monthly period in order to accumulate data only for that following week or month, or other selected period.

Figure 11:
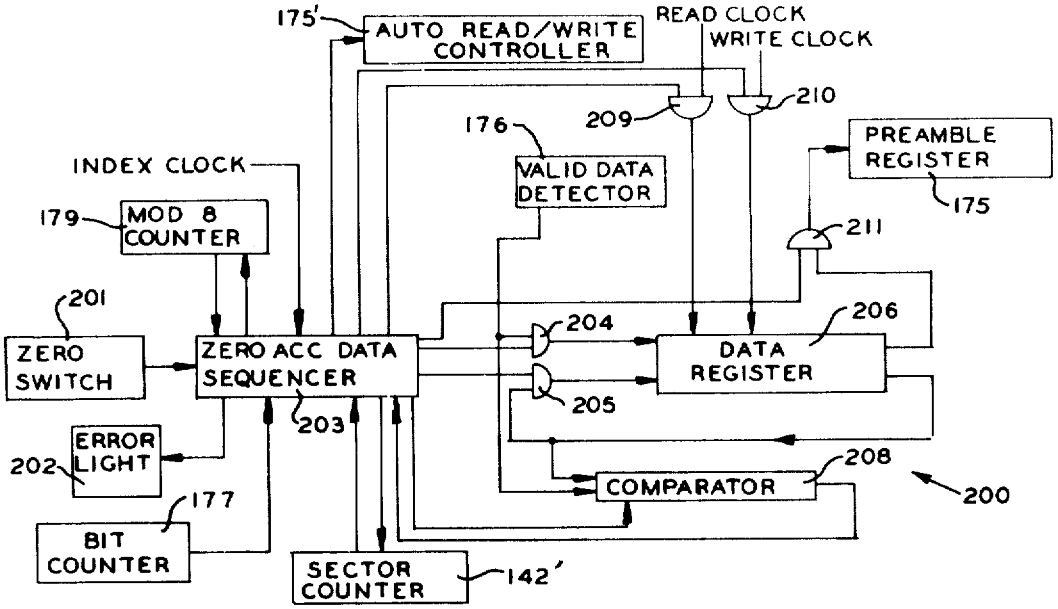
FIG. 11 is a schematic view of an additional electrical circuit which can be employed to zero-out any accumulated data in sectors of the magnetic memory.

The present invention therefore provides a zeroing-out circuit 200 which is more fully illustrated in FIG. 11 and which includes a zero switch 201 and an error light 202. The switch 201 and error light 202 are suitably mounted on the control panel 110 in any desired position. It can be seen that the zero switch 201 is connected to a zero accumulated data sequencer 203 which receives an input from the modulo eight counter 179 and also has an output directed to the modulo eight counter 179. The input to the zero accumulated data sequencer 203 essentially informs the sequencer 203 when the first track on the drum is ready for reading. The output from the sequencer 203 to the modulo eight counter 179 essentially inhibits the counter from counting on certain perdetermined conditions, which are hereinafter described. The zero accumulated data sequencer 203 also receives index clock pulses from the memory section N in the manner as previously described. At this point it should be noted that the sequencer 203 is connected to many of the components which are described in FIGS. 5A-5C, as well as FIG. 6 and can be easily incorporated in the circuitry of FIG. 6. Further, the zero accumulated data sequencer 203 receives an input from the auto read/write controller 179; and an input from the bit counter 177. This input from the bit counter 177 essentially informs the sequencer 203 in what portion of the sector the accumulated data may exist.

The zero accumulated data sequencer 203 also receives an input from the sector counter 142', which is similar to the sector counter 142 and which essentially informs the sequencer 203 when one complete revolution of one track has been performed in the memory section N. The output from the sequencer 203 to the sector counter 142' is designed to initialize the sector counter 142'.

The zero accumulated data sequencer 203 has a pair of outputs connected to AND gates 204, 205 which, in turn, have outputs connected to a data register 206. One of the outputs of the sequencer 203 is anded with signals from the valid data detector 176 in the AND gate 204. The other of the outputs from the sequencer 203 is anded with recirculated data in a recirculating line 207 from the register 206 in the AND gate 205. By further reference to FIG. 11, it can be seen that an output from the recirculating line 207 and the output from the valid data detector 176 are both introduced into a comparator 208, which also receives an input from the zero accumulated data sequencer 203. Finally, the output of the comparator 208 is, in turn, introduced into the zero accumulated data sequencer 203. By further reference to FIG. 11, it can be seen that the outputs of the zero accumulated data sequencer 203 are anded with both read clock pulses and write clock pulses, respectively, in AND gates 209, 210. It can also be observed that the outputs of the AND gates 209, 210 serve as inputs to the data register 206. The output of the data register 206 is anded with the output of the zero accumulated data sequencer 203 in an AND gate 211, which is, in turn, connected to the preamble register 175.

In order to zero-out the accumulated data contained in the accumulated data spaces of a particular data sector, the operator merely actuates the zero switch 201, which is located on the control panel 110, as previously mentioned. This action will cause the accumulated data in every sector on the drum to be reduced to a condition of all binary zeros, and hence, all character zeros. Actuation of the switch 201 will initialize the zero accumulated data sequencer 203. When the sequencer 203 receiveds a signal from the modulo eight counter 179, the sequencer 203 also sends an inhibit signal to the counter 179, thereby preventing any further track changes on the drum 180. At this point in time, the sequencer 203 will cause the first appropriate data sector to be read from the drum into the data register 206. This data from the drum will be introduced into the data register 206 at the read clock rate by virtue of the introduction of read clock pulses into the gate 209. When the particular sector containing the accumulated data has been read, the sector counter 142' will send a pulse to the zero accumulated data sequencer 203 advising the sequencer 203 when the track has been traversed and the sector in the data register is again available. The zero accumulated data sequencer 203 will thereby command a write operation to the auto read/-write controller 175' and also permit the gating of write clock pulses to the data register 206 through the AND gate 210.

An input from the bit counter 177 to the sequencer 203 enables the sequencer 203 to prevent data from being recorded on the drum during the accumulated data portion of the sector, thereby causing zeros to be written on the drum during this portion of the sector. It should also be observed that during the write operation, the appropriate data is circular shifted in the data register 206 through the recirculation line 207 so that it will be retained in the register 206. During the succeeding revolution of the drum 180 in the memory section N, the sector counter 142' also advises the sequencer 203 where the data contained in the data register 206 was written on the drum 180 and will again reappear. The sequencer 203 thereby commands the comparator 208 to make a bit for bit comparison of the data which was written on the drum with that data which is contained in the data register 206. If comparison does in fact exist, the zero accumulated data sequencer 203 will thereupon read the next appropriate data sector in sequence and repeat the above procedure. If, on the other hand, comparison did not exist, the sequencer 203 will cause the error light 202 to energize and also cause the cessation of further action.

When all data sectors on the track of the drum 180 which contain accumulated data character positions have been zeroed, the zero accumulated data sequencer 203 will allow the modulo eight counter 179 to increment the heads 187 to the next rack. When the modulo eight counter 179 signifies track one is again the next tract to be read, the zeroing sequencing has been completed and terminates.

MULTIPLE DATA SECTORS

The present invention also includes a provision for reading and writing in two or more data sectors associated with each particular part number sector. In many cases, the number of characters representing data often exceeds the number of characters representing that part number. Hence, if the part number is represented by nine characters or 54 bits, the data would contain more than nine characters and would exceed the length of a data sector of 54 bits. In this case, a second data sector is also employed, and if necessary, three or more data sectors may be employed. For the purpose of describing this facet of the present invention, only two such data sectors are described in connection with a particular part number sector. However, it should be understood that the same principle of operation applies to three or more data sectors associated with a particular part number sector.

Figure 12:
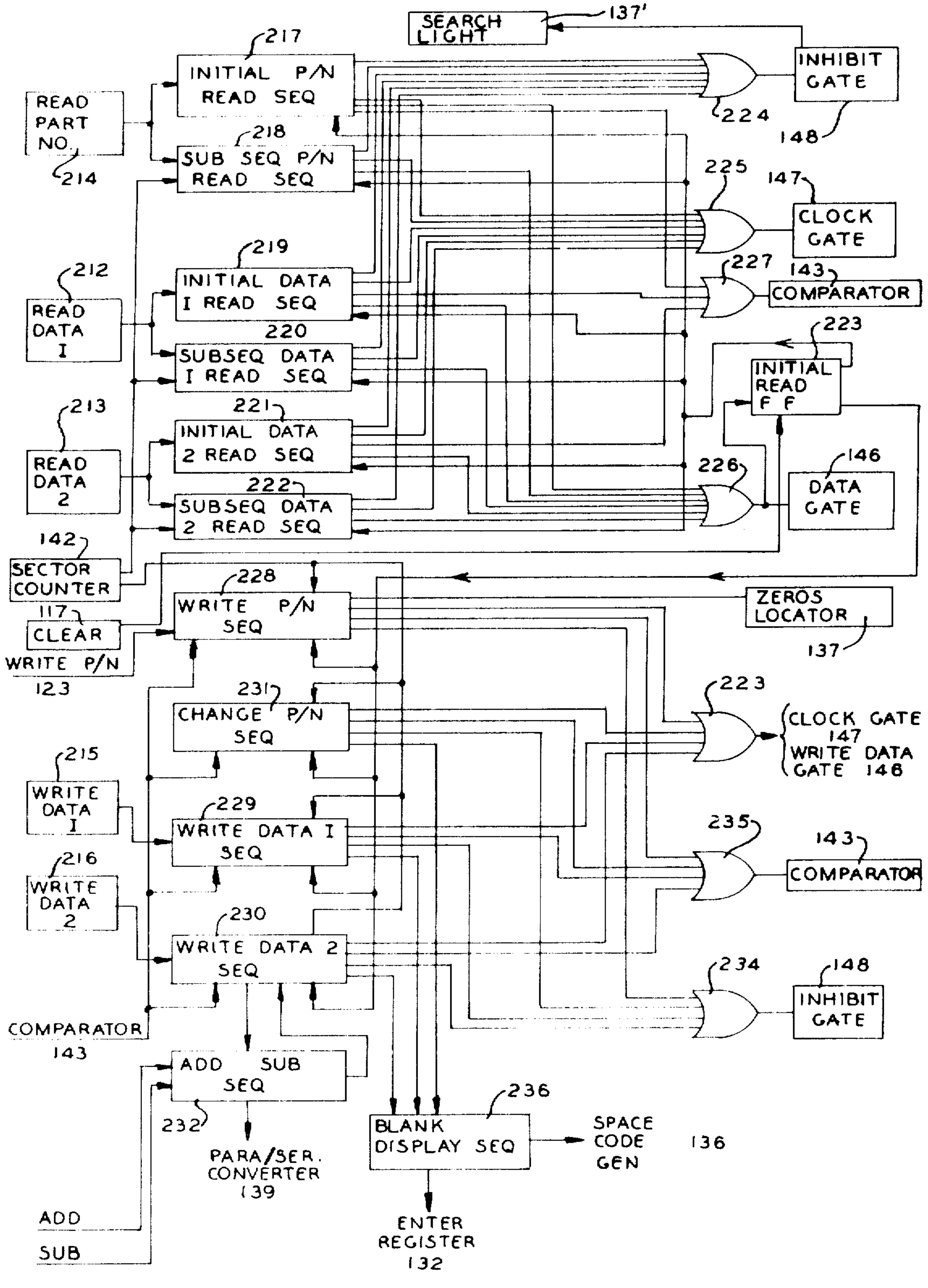
FIG. 12 is a schematic view of an additional electrical circuit which can be used for writing and reading two or more sectors of data associated with a particular part number.

In the event that two data sectors are used with each part number sector, the console unit G is provided with a read data-1 switch 212, a read data-2 switch 213, and a read part number switch 214 in the manner illustrated in FIG. 12. These three switches 212, 213, 214 are all suitably mounted on the control panel 108 and will replace the read switch 118. The control panel 108 will also include a write data-1 switch 215 and a write data-2 switch 216. These two switches 215, 216 will replace the write data switch 121 which normally appears on the control panel 110 in the manner as illustrated in FIG. 3. The write new part number switch 123 and the clear switch 117 will also exist on the control panel 110 in the manner as illustrated in FIG. 3. The change part number switch 124 will also remain on the control panel 108.

It can be observed by reference to FIGS. 5A and 5B that the read switch 118 was connected directly to the read sequencer 152 and the read sequencer 152 had outputs directed to the data gate 146, the comparator 143, the clock gates 147, and the inhibit gate 148. When the dual read data switches, such as the switches 212, 213 are employed, the same general circuit structure exist except that additional sequencers are employed. By further reference to FIGS. 5A and 5B it can also be observed that the write data switch 121 was connected directly to the write sequencer 153 which had outputs directed to the read-after-write sequencer 146, the clock gate 147, the inhibit gate 148, the zeros locator 137 and the search light 118. When dual write data switches, such as the write data-1 switch 215 and the write data-2 switch 216, are employed, essentially the same circuit structure is present except that additional sequencers are added to the circuit.

Referring to FIG. 12, it can be seen that the read part number switch 214 is connected to an initial part number read sequencer 217 and a subsequent part number read sequencer 218. The read data-1 switch 212 is connected to an initial data-1 read sequencer 218 and a subsequent data-1 read sequencer 220. The read data-2 switch 213 is connected to an initial data-2 read sequencer 221 and a subsequent data-2 read sequencer 222. It can be seen that each of the sequencers 277-222 receive an input from an initial read flip-flop 223 which is connected to the clear switch 117.

Each of the sequencers 217–222 have first outputs which are ored together in an OR gate 224, the output of which is connected to the inhibit gate 148. It can also be observed that the inhibit gate 148 is connected to the search light 137' in the manner as illustrated in FIG. 12 and in FIG. 5A as well. Each of the sequencers 217–222 have second outputs which are ored together in an OR gate 225, the output of which is connected to the clock gate 147. In addition, each of the sequencers have third outputs which are ored together in an OR gate 226, the output of which is connected to the data gate 146. The output of the OR gate 226 is also connected to the initial read flip-flop 223.

Each of the initial sequencers, that is the initial part number read sequencer 217, the initial data-1 read sequencer 129, and the initial data-2 read sequencer 221, have outputs which are ored together in an OR gate 227. The output of the OR gate 227 is connected to the comparator 143. Each of the subsequent sequencers, that is the subsequent part number read sequencer 218, the subsequent data-1 read sequencer 220 and the subsequent data-2 read sequencer 222 each receive an input from the sector counter 142.

Figure 8:
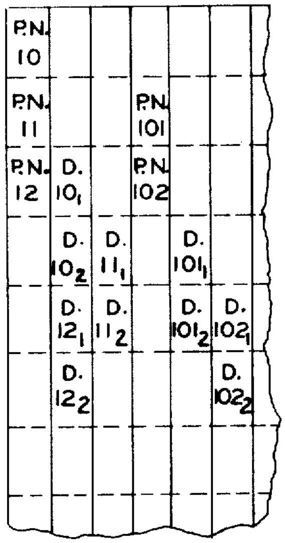
FIG. 8 is a schematic illustration of a modified form of magnetic disc or drum addressing scheme employed in the present invention.

For purposes of describing the operation of reading where two data sectors are associated with a particular part number sector, it may be assumed that each of the part number addresses have a data-1 sector and a data-2 sector relating to that part number address. Again, the data sectors would be directly addressed with respect to the part number sector in the manner as previously described and as illustrated in FIG. 8.

In order to read either of the data sectors associated with a particular part number, the part number is introduced into the console register 130 by means of the switches on the keyboard 112. This part number will also be displayed on the display tubes 111 in the manner as previously described. When the read data-2 switch 212 is actuated, it will operate in conjunction with the initial read flip-flop 223 to initiate the initial data-1 read sequencer 219. The initial data-1 read sequencer 219 will enable the comparator 143, which will perform an associative comparison, to determine the location of that particular part number on the drum 180, in the manner as previously described. When the comparator 143 determines that the proper part number has been found on the drum 180, an input from the initial read data-1 sequencer 219 to the OR gate 226 and then to the data gate 146 determines which sector is loaded into the console register 130 for display.

The read sequencers are divided into two types: (*a*) initial read sequencers 217, 219, 221, and (*b*) subsequent read sequencers 218, 220, 222. The initial read sequencers are activated only when a read switch, such as switches 212, 213 are actuated the first time after the clear switch 117 is actuated. In other words, the location of data associated with a part number is initially determined by a bit for bit comparison in the comparator 143. Once this comparison and location determination has occurred, the location of all the data sectors is maintained by the sector counter 142. Since it may be desired to read and re-read the data sectors without re-entering the part number, the sector counter 142 can be used for all subsequent read operations. The first time a read operation occurs, the initial read sequencers are used. Once the sector counter 142 has been initialized, the subsequent read sequencers are used. The use of these sequencers is determined by whether or not a read has occurred since the clear switch 117 was first actuated.

Simultaneously with the loading of this information in the console register 130, the sector counter 142 is initialized and the initial read flip-flop 223 is set. A subsequent action of the read data-1 switch 212 will work in conjunction with the now set initial flip-flop 223 to initiate the subsequent read data-1 read sequencer 220. This sequencer 220 uses an output from the sector counter 142 to determine which sector to load into the console register 130 by means of the OR GATE 226 and the data load gate 146. The other read sequencers work in a similar manner to load the desired data into the console register 130. When the clear switch 117 is actuated, all of the sequencers 217-222 will be reset and cleared. Accordingly, it is possible to introduce a new part number for associatively searching the drum to find that part number and hence read the data sectors associated with that part number in the manner as previously described.

Referring again to FIG. 12, it can be seen that the write part number switch 123 is connected to a write part number sequencer 228, the write data-1 switch 215 is connected to a write data-1 sequencer 229, and the write data-2 switch 216 is connected to a write data-2 sequencer 230. It should also be observed that a change part number sequencer 231 is also provided. Each of the sequencers 228–231 receives input signals from the comparator 143 and input signals from the sector counter 142. The sequencers 228–231 each receive a reset signal from the initial read flip-flop 223 in the manner as illustrated in FIG. 12.

The write data-2 sequencer 230 has an output connected to an add/subtract sequencer 232 which receives add data from the console unit G over the add line ADD and subtract data from the console unit G over the subtract line SUB. The add/subtract sequencer 232 also has an output connected to the parallel/serial converter 139 and an output back to the write data-2 sequencer 230. Each of the sequencers 228–231 have first outputs which are ored together in an OR GATE 233 and second outputs which are ored together in an OR gate 234. The output of the OR gate 233 is connected to the clock gate 147 to the write line WRITE and the data gate 146. The OR gate 234 has an output which is connected to the inhibit gate 148. Finally, each of the sequencers 228–231 have third outputs ored together in an OR gate 235, which, in turn, has an output to the comparator 143. The write part number sequencer 228 also has an output to the zeros locator 137. The remaining three sequencers, namely the data-1 sequencer 229, the write data-2 sequencer 230 and the change part number sequencer 231 all have outputs which are connected to a blank display sequencer 236. It can be observed by reference to FIG. 12, that the blank display sequencer has an output to the space code generator 136 and an output to the enter register 132.

If it is desired to write a part number recorded in a 54 bit part number sector and which has two or more data sectors associated therewith, the operator merely actuates the write part number switch 123. Actuation of the switch 123 will initialize the zeros locator 137. By reference to FIGS. 5B and 5C it can be seen that the zeros locator 137 receives an input from the write sequencer 153. Actuation of the write part number switch 123 also will initialize the comparator 143. It can be observed that all of the sequencers 228–231 utilize a sector count or sector clock pulse from the sector counter 132 to determine the actual writing location.

As indicated previously, when only one data sector was assoicated with a part number sector, the add and subtract data which was entered through the thumbwheel switches 138 was formerly entered into the write sequencer 143. However, when employing two or more data sectors, the add/subtract sequencer 232 is necessary. Only one of the data sectors associated with a particular part number sector will contain the arithmetic data, such as the add data or the subtract data. For the purpose of describing the operation of the present invention it will be assumed that the second data sector contains the arithmetic data; however, it should be recognized that the first data sector could otherwise contain the arithmetic data. It whould also be recognized that the entire sector of 54 bits could be utilized for arithmetic data, or only a portion of the sector could be utilized to contain arithmetic data. In the event that the first data sector would contain the arithmetic data, the output of the add/subtract sequencer 232, which is illustrated as being connected to the write data-2 sequencer 230, would instead be connected to the write data-1 sequencer 229.

When it is desired to either add or subtract information to any of the arithmetic data portions of the second data sector, the operator introduces the second data sector into the console register 130 by actuation of the read data-2 switch 213 in the manner as previously described. The add or subtract data is introduced by means of actuation of the thumbwheel switches 138. It can be seen that this add and subtract data is transmitted to the parallel to serial converter 139 in a manner commanded by inputs to the parallel to serial converter 138 from the add/subtract sequencer 232.

The blank display sequencer 236 is connected to the enter register 132 and to the space code generator 136 for purposes of removing the display in the display tubes 111 after actuation of any of the write switches, such as the switches 123, 215, or 216. If the operator attempts to write any information in the wrong data sector, the display tubes 111 will immediately generate an all blank display upon actuation of the improper write switch. In other words, if the operator intends to write information in the second data sector and calls up the second data sector from the drum 180, he will actuate the write data-2 switch 216. If the operator thereafter introduces information by means of actuation of the switches on the keyboard 112 and inadvertently actuates the write data-1 switch 212, the display tubes 111 will immediately "blank" and all blanks will be entered. However, a subsequent actuation of the same write data switch, namely the write data-1 switch 212, will actually write the new data introduced through the keyboard 112 onto the drum 180.

If the sector in which it is desired to write, is already displayed on the tubes 111, actuation of the proper write data switch will rewrite the data that is displayed and subsequently read that data back through the console register 130 and the display tubes 111. In other words, if the operator introduces the first data sector into the write data-1 sequencer 229 by actuation of the write data-1 switch 215 and enters new data through the keyboard 112 into the console register 130 a subsequent actuation of the write data-1 switch 215 will cause the information introduced into the console register 130 to be written into the first data sector and hence the information which he has previously introduced into the first data sector on the drum. Thereafter, this information will be automatially read back through the console register 130 and displayed on the display tubes 111.

For example, if the operator introduces a part number into the console register 130 by means of actuation of the switches on the keyboard 112 and actuates the write data-1 switch 215, an associative search is performed until that particular part number address is found on the drum 180. The blank display sequencer 236 will then blank the display and allows the operator to introduce additional data by means of the keyboard 112 and actuates the write data-1 switch 215 again. The action will introduce the information into that first data sector. It should be observed that this feature of blanking the display tubes 111 allows the employment of the character edit switches 140. Furthermore, it should be observed that any time a write operation is performed through actuation of any of the switches 123, 215 or 216 a read operation is thereafter automatically performed.

The add/subtract sequencer 232 actually serves two main purposes in that it loads the parallel/serial converter 232 with the add/subtract data from the console unit G, and sequencer 232 renders a signal to the write data sequencer 153 to write this data on the drum 180 and display the data in the display tubes 111. The addition functions merely involve the sending of console data to the central electronics unit H to be written along with the add/subtract data in the parallel/serial converter 138. The central electronics unit H actually performs the addition through the use of the arithmetic controller 169 and subtraction through the use of the arithmetic controller 169 in conjunction with the nines complement generator 171 and will cause this information to be written on the drum 180.

The initial read flip-flop 223 serves as a sequencer select flip-flop since it determines whether the sequencers will use the comparator 143 or the sector counter 142. If the operator actuates the clear switch 117 and introdues a part number by means of the switches on the keyboard 112 and then further actuates the write data-1 switch 215 the display tubes 111 will immediately display the part number and will blank. However, during this sequence the comparator 143 is used to search the part number on the drum 180 and also sets the sector address counter 142. If a subsequent write or read operation is initiated before the clear switch 117 is actuated the sequencers 228-231 will always utilize the input from sector counter 142 rather than from the comparator 143.

The initial read flip-flop 223 also prevents the accidental writing or changing of a part number after an operation. The write part number sequencer 228 and the change part number sequencer 231 are disenabled by the initial read flip-flop 223 to prevent accidental use while other operations are being performed. In order to use these sequencers again, it is necessary to clear the system by actuation of the clear switch 117.

MULTIPLE CONSOLE UNITS WITH MULTIPLEXER

It is possible to connect a plurality of console unitw G to one central electronics unit H in the manner as illustrated in FIG. 13. It should be observed that each of these alpha-numeric console units G is schematically illustrated in FIG. 13 and only two of such units are shown. However, it should be recognized that at least three or more of these console units G could be connected to one central electronics unit H. When multiple console units are employed these console units are interfaced to the central electronics unit H through the multiplexer M. The console units have been designated as $G_1$ and $G_2$.

The data outputs of each of these console units $G_1$ and $G_2$ are all connected to an OR gate structure 193 including five OR gates 194 contained in the multiplexer M. An individual arithmetic controller 169 is associated with each console unit so that a separate arithmetic controller will be provided for each console unit and each of these arithmetic controllers are contained in the multiplexer M. Thus, it can be seen that the add-/subtract data line from each of the console units $G_1$ and $G_2$ are connected to a first OR gate 194. The console data line CD of each of these console units is connected to a second OR GATE. In like manner, the write line WRITE, the add line ADD, and the subtract line SUB from each of these units is respectively connected to an OR gate 193 in the manner as illustrated in FIG. 13. In addition, the write, add and subtract lines are inputs to the arithmetic controller 169 associated with a particular console unit which issues "set carry" or end-around carry pulses labeled EAC and "correct" pulses labeled COR for each console unit to enable addition and subtraction functions. The outputs of each of these arithmetic controllers 169 are ored together in OR gates 195.

The outputs of the central electronics unit H do not pass through any gating structure but are connected directly to each of the individual console units $G_1$ and $G_2$ through the transmitters 165. For example, the sector clock line from the multiplexer M has two outputs, each being connected to a particular console unit. In like manner, the index output, the read clock output, the memory data output, the console inhibit output, and the write clock output from the central electronics unit H are each individually connected to the console units in the manner as illustrated. The data is sent continuously and sequentially to all console units from the central electronics unit except during the sector time in which any console unit performs a write operation, and the sector time immediately following the first sector time.

When comparing FIG. 6 with FIG. 13, it can be seen that the components of the central electronics unit H and the memory section N have been combined into a unit schematically illustrated and labeled "Central Electronics." The central electronics unit of FIG. 13 contains all of the components of the memory section N and the central electronics unit H, the latter including the modulo eight counter 178, the valid data detector 176, the six bit counter 177, the nines complement generator 171, the serial BCD adder/subtracter 170 and the preamble register 175. The outer read/write controller 175', the accumulated data sequencer 172, the ASD storage register 173 and the track jump sequencer 179, with the exception of the arithmetic controller 169.

The five input signals from each console unit, namely, the add, subtract, add/subtract data, console data and WRITE signals are all concerned with writing information on the drum 180 of the memory section N. Since these signals are only concerned with writing in one or more particular sectors of the drum 180, they can be gated so that a multiplicity of console units can virtually write into the memory section N simultaneously. In other words, the probability of two or more consoles functioning to write into the same memory sector of the drum during the same memory revolution is virtually zero, even with a large number of console units interfaced to the multiplexer M.

The add, write and subtract lines after being regenerated by the receivers 160 (not shown in FIG. 13) are inputs to the arithmetic controller 169. The arithmetic controller 169, in turn, generates convert and set carry output signals based on the combination of the inputs to the controller 169. These outputs occur only at a sector time during which a write function is to take place. These outputs are then ored with the like signals from other console units in the OR gates 194.

The add/subtract data lines ASD and the console data lines CD are similarly ored in the gates 194. The outputs of all seven OR gates 194 are then transferred to the multiplexer M. It can be seen that each console is able to access the memory section for a read or write operation without delaying or interfering with another console unit which interfaced to the multiplexer M.

When more than one console unit is connected to and capable of accessing a single central electronics unit, the system contains circuitry for (1) the detection of updates to observed data, and (2) the prevention of a simultaneous changing of any part number or data from different console units. In other words, if one console unit G has accessed the memory section N and is displaying a part number or data sector on the display tubes 111, another remote console unit updating the part number or the data sector sectors associated with that part number will cause the former console to blank its display. For this purpose, it is to be noted that the auto read/write controller 175′ generates a console inhibit signal which is transmitted to each of the console units over the console inhibit line CI at the time any write operation takes place. Further, it is to be noted that the console inhibit signal is directed to the write sequencer 153 in each of the console units. In addition, the console inhibit signal is directed to the update clear sequencer 160 in each of the console units.

By means of this circuitry, if one console unit G has accessed the central electronics unit H in the memory section N by means of accessing the multiplexer M, this first console unit G will have the part number or the data sector associated therewith displayed on the two display tubes 111. If another console unit G writes, a console inhibit signal is generated in the auto read/write controller 175 and the console inhibit signal is transmitted to each of the console units which are connected to the multiplexer unit. It should be noted that the sector address counter of the console unit G accessing the multiplexer M will detect in time when the data or part number which is desired is passing the read and write heads 187 on the drum 180. Accordingly, if another remote console unit attempts to update that particular address by means of the part number or the data associated therewith, the remote console unit, which is also receiving the console inhibit signal, will generate a clear signal so that the data will be cleared from the display of the remote console unit. In addition, if two console units G attempt to update the same memory section, the AND gate 194 in the multiplexer M recognizes this update condition. Thereafter, a write fault signal is generated and transmitted to the auto read/write controller 175′ inhibiting any write operation and generating a console inhibit signal to be sent to all console units G. This write fault signal is timed so as to clear all console units attempting to update this sector location.

As indicated previously, the inhibit signal which is generated in the central electronics unit H is combined with the console inhibit signal generated in the printer drive circuit P and is transmitted to all console units. Accordingly, the particular console unit G which intends to write data on the drum 180 also receives the same console inhibit signal. However, it is not desired to clear the console register 130 of the console unit G which is being operated to write information in the drum 180, so long as no other remote console unit is simultaneously accessing that particular address. Accordingly, when a particular console unit G is accessing the drum 180 at a particular address, the multiplexing unit issues a write fault signal and when the central electronics unit receives the write fault signal, the console inhibit signal is transmitted one sector away. Accordingly, two console units attempting to write in the same sector are subjected to a condition where the console register 130 and hence the display tubes 111 in both console units G are cleared in the same manner as if some remote console unit wrote in the same address. Furthermore, it can be seen that only the console unit G which is operating in a particular address can write information in that address, e.g., both the part number and data sectors. However, any other console units attempting to write either that part number sector or data sector will generate a clear signal, thereby clearing the display tubes 111. This immediately advises the operator that someone else is accessing the drum 180 for those particular sectors. It can be seen that the auto read/write controller 175′ will generate the console inhibit signal on the console inhibit line CI in the absence of any write fault signal.

As indicated previously, the auto read/write controller 175′ generates the console inhibit signal in the presence of the write fault signal but waits for one sector before sending out this console inhibit signal. The multiplexer M also receives a print console write inhibit signal from the printer drive logic P and which is anded with the WRITE signal from console unit G1, in an AND gate 195. This console unit G1 can be conveniently referred to as the "PRINT CONSOLE" inasmuch as this particular console unit controls the printing operation hereinafter described. The output of the AND gate 195 is anded with the WRITE signals from each of the other console units G in an AND gate 196 to generate the write fault signal WF in the manner as illustrated in FIG. 13. It should be observed that the receiver which receives the write fault signal in FIG. 6 does not have a compatible transmitter illustrated in FIG. 5C. Furthermore, as indicated previously, all WRITE lines from each of the console units are combined in the AND gate 196. The console inhibit signal which is generated in the central electronics unit H is ored with a console inhibit signal from the printer drive circuit P in an OR gate 197 in the multiplexer M. This ored console inhibit signal serves as the true console inhibit signal which is transmitted to each of the console units G.

The update clear sequence 160 is capable of clearing the console register 130 and the display tubes 111 when any other remote console unit attempts to change the data being examined in a particular console unit. It should be observed that the update clear sequence receives inputs from the console inhibit line, the sector counter 142 and the write sequencer 153 in order to accomplish this function.

Figure 14:
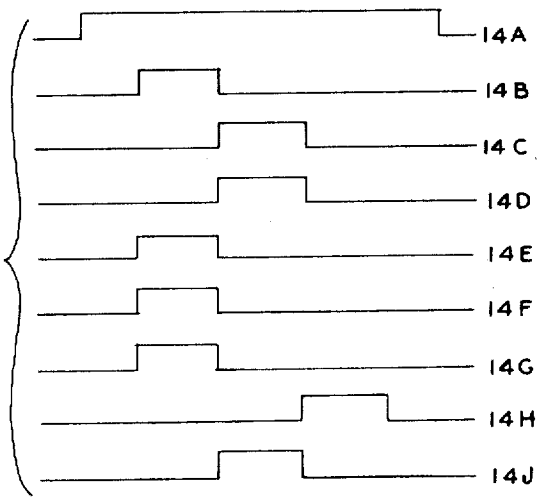

The timing relationship of the signals which prevents simultaneous writing of data is more fully illustrated in the composite illustration of FIG. 14 consisting of FIGS. 14A–14I. In this FIG. 14, it can be seen that FIG. 14A represents the size and timing relationship of the pulse from sector counter 142. FIG. 14B represents the size and timing relationship of the WRITE signal from each console unit for a normal write operation. FIG. 14 C represents the size and timing relationship of the console inhibit signal over the console inhibit lines CI from the central electronics unit H. Furthermore, FIG. 14D represents the timing of the console inhibit override signal which is generated in the console unit to enable the particular console unit to write in a selected sector without regard to the console inhibit. It can be seen that both the console inhibit signal and the console inhibit override signal appear at the same time, and furthermore, both occur at the end of the WRITE signal.

If two or more console units attempt to update the same sector, FIG. 14E represents the WRITE signal for one console unit and FIG. 14F represents the WRITE signal for a second console unit, and both of which occur at the same point in time. FIG. 14G represents the timing of the write fault signal from the multiplex unit to the central electronics unit H. It can again be observed that the write fault signal occurs simultaneously with the WRITE signals from both of the console units. FIG. 14H represents the console inhibit signal sent to all console units if two console units attempt to write as shown in FIGS. 14E and 14F. The console inhibit override signal is represented by FIG. 10J and which is generated internally in each console unit that attempted to write.

If two console units G attempt to write in the same sector, as shown by two write signals (FIGS. 14E and 14F), a write fault signal (FIGS. 14G) is generated in the multiplexer. This write fault signal inhibits any writing and causes the console inhibit signal (FIG. 14H) to be one sector later than normal, causing both console units to clear since it negates the effect of the consoles own console inhibit override signal (FIG. 14J).

The track jump signal which is generated in the printer drive circuit P in a manner to be hereinafter described, is ored with the track jump signals from each of the console units in one of the OR gates 194 contained in the multiplexer M and these ored track jump signals serve as the true track jump signal to the central electronics unit H.

PRINT CONTROL CONSOLE

The print control console A is more fully illustrated in FIG. 4, and as indicated previously, contains various code positions. The print control console A includes a selector switch 250 and an execute pushbutton switch 251. Referring to FIG. 1, it can be seen that the print control console A has four data lines designated as I, II, III and IV and these data lines generate BCD commands based on the position of the selector switch 250.

As indicated previously, the selector switch 250 is shiftable to a number of printing mode positions. These printing mode positions have been designated generically in FIG. 4. However, it should be understood that a particular user of the system may employ a specific code representing a print format selected by this particular user. These print mode positions have been listed below generically and corresponding thereto is a listing of related print mode selections for one specific use.

| | |
|---|---|
| OFF | OFF |
| ENTER START | ENTER START |
| ENTER STOP | ENTER STOP |
| ENTER CODE | ENTER MANUFACTURER'S CODE |
| PRINT SEQUENTIAL | PRINT INVENTORY |
| PRINT SEQUENTIAL BY CODE | PRINT INVENTORY BY MANUFACTURER |
| PRINT SEQUENTIAL QUANTITY 1 LESS THAN QUANTITY 2 | PRINT ORDERS BY MANUFACTURER |
| PRINT SEQUENTIAL 3 = 0 | PRINT ZERO SALES |
| PRINT ADD OR SUBTRACT | PRINT TRANSACTIONS |

It should be observed that the specific nomenclature set forth above is only exemplary and any type of nomenclature for any desired print mode of operation can be employed.

The printer console A internally includes a diode matrix (not shown) for generating the proper command in the BCD format based on the position of the selector switch 250. However, a conventional deck-type switch wired to generate the BCD format signals could be employed as well. The four lines carry the BCD format command to the printer drive circuit P. The fifth line from the print control console A to the printer drive logic B carries the execute signal based on operation of the execute pushbutton switch 251.

In many of the printing transactions which are to be hereinafter described, the printer drive circuit P examines the various part numbers to determine which part number sectors and data sectors contained on the drum 180 are to be printed. Accordingly, it is necessary to understand the magnitude ordering of the arabic and decimal characters which may represent a part number recorded in the memory section N. For the purposes of the present invention, it has been established that part numbers which contain the smallest number of characters are smaller than part numbers which contain more characters. For example, two digit part numbers are smaller than three digit part numbers. A part number with a left-most blank or punctuation character position is smaller than a part number which has a character in the same position. Arabic characters are assigned a higher value than numeric characters. The numeric characters increase in magnitude from zero and 1 through 9. The arabic characters increase in magnitude from A through Z. Therefore, the arabic characters "A" will have a higher assigned magnitude than the numeric character "9." Punctuation characters are assigned a higher priority then numeric characters and arabic characters in the following fashion: slash marks, dash, periods and asterisks. A space character is assigned a higher priority than any punctuation character. By examining the above assigned magnitude of the characters used in the part number designations, it can be seen that the following part numbers, which are illustrative, are listed in order of increasing magnitude:

1
A
10
10/1
10-1
10.1
10*1
69-148
6V-2PTG
AA
AA-5
AA-10
AB
TP-482

It should be recognized that many other types of character magnitude systems could be employed in the present invention and that the invention is not necessarily limited to the magnitude comparison system described above. However, this magnitude system has been found to be quite effective for use in this type of data storage and retrieval system. In like manner, it should also be observed that the printer control console is not necessarily limited to the various modes of printing described above, and that any number of printing modes could be employed in the present invention.

Figure 15:
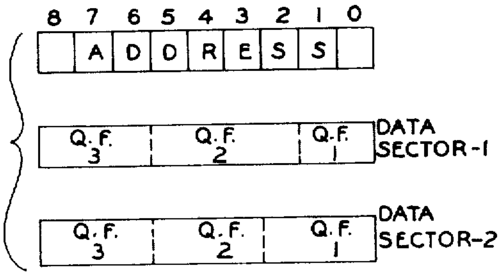
FIG. 15 is a schematic view of three sectors containing nine characters each, and one of the sectors represents an address sector, where the other two sectors represent data sectors.

FIG. 15 represents the format of three sectors of information which can be stored and printed in the system of the present invention. It can be seen that each of the sectors contain nine character positions and each character position is represented by six bits; hence a total sector is represented by nine bytes containing a total of 54 bits. As indicated previously, the first sector generally represents the part number or address of the information to be recorded. This sector can be referred to as the "address field." In like manner, only a part of the sector may be used to represent an address, and only those characters representing the address or part number would constitute the address field. The remaining portion of the sector can then be used to contain data. The second two sectors represent a first data sector and a second data sector.

For the purpose of illustrating the present invention, the first data sector has been illustrated as being subdivided into two character positions representing a first data field of two characters, a second data field of four characters and a third data field of three characters. The second data sector has been illustrated as being subdivided into three data fields, each of which contain three characters. It should also be observed that any one of these data fields may contain accumulated data in the manner as previously described in connection with FIG. 10. In like manner, any one or more of these data fields may be reserved for numeric data in which various arithmetic functions may effect the data of such data field or data fields. For the purpose of describing the present invention, it will be assumed that all data fields of the data sector-2 will contain numeric data.

PRINTER AND PRINTER INTERFACE CIRCUIT

Any of a number of commercially available printers, or so-called "printing heads" may be used in the system of the present invention. The printer K has been schematically illustrated in block diagram form in FIG. 1, and has not been illustrated in any further detail herein, inasmuch as the general construction of electronic printers is conventional. For example, it is possible to use an electronic digital printer, such as the Friden 1150 digital printer which is described in the Singer, Friden Division Bulletin No. 74-291. However, any of a number of other commercially available printers could be employed. In like manner, teletype machines, digitally controlled electric typewriters and similar printing equipment could be used in the present invention.

The particular type of printer named above generally employs a single, multi-character print wheel, and a single, synchronized print hammer. The print wheel and print hammer are driven across a print substrate, such as paper, from right to left at a uniform speed. Upon a proper signal, the handle of the hammer will shift to cause an impact between the paper and a character on the print wheel which has been previously rotated to proper character print position. Generally, the characters on the print wheel are offset in order to maintain column alignment.

The printers of this type generally contain internal logic such as shift registers which are loaded with the characters that are to be printed and various clocking mechanisms, and the like.

Referring again to FIG. 1, it can be seen that the printer K receives three solenoid actuated signals from the printer interface circuit J. The printer hammer and print wheel are mounted on a movable carriage in the printer K and move transversely across the paper during the printing operation. It should also be observed that the printer interface circuit J receives three inputs from the printer K. The carriage ready input to the printer interface circuit J indicates that the carriage in the printer K has returned to the left-most margin and is ready to start a new line of print. The index pulses from the print head K to the printer interface circuit J occur as the character zero on the print wheel passes under the hammer, once each revolution of the print wheel. The characters are organized on the print wheel in printing format and also in increasing order of an assigned priority. Thus, as indicated previously, the lowest character on the print wheel is the numeral zero followed by the decimal digits 1–9. The numeric characters are followed by the arabic characters A–Z and these arabic characters are followed by the four punctuation marks described previously. Accordingly, as the character zero passes under the print hammer on each revolution, an index pulse is generated. By utilizing a binary counter in the printer K, the counter is capable of representing the character under the print hammer.

The printer interface circuit J also receives the character pulses from the printer K on the character pulse line CP and these character pulses occur as each character on the print wheel passes under the print hammer. Accordingly, the binary counter is decremented for each character shift of the print wheel.

The data ready signal from the printer interface circuit J to the print head K is the signal which initiates a line of print and starts the carriage to move transversely with respect to the paper substrate. The hammer drive signal on the hammer drive line HD actuates the print hammer to force the substrate into contact with a character on the print wheel. In this connection, it should be observed that suitable inking rollers and ink transfer roller are located in the printer K for inking the embossed characters on the print wheel. A line feed signal is initiated by the internal electronics of the printer K after the last character in each line or each sector has been printed. This signal is designed to advance the paper through a suitable advancing mechanism contained in the printer K. In addition, this signal causes the print carriage to return to its initial left-hand position.

Figure 16B:
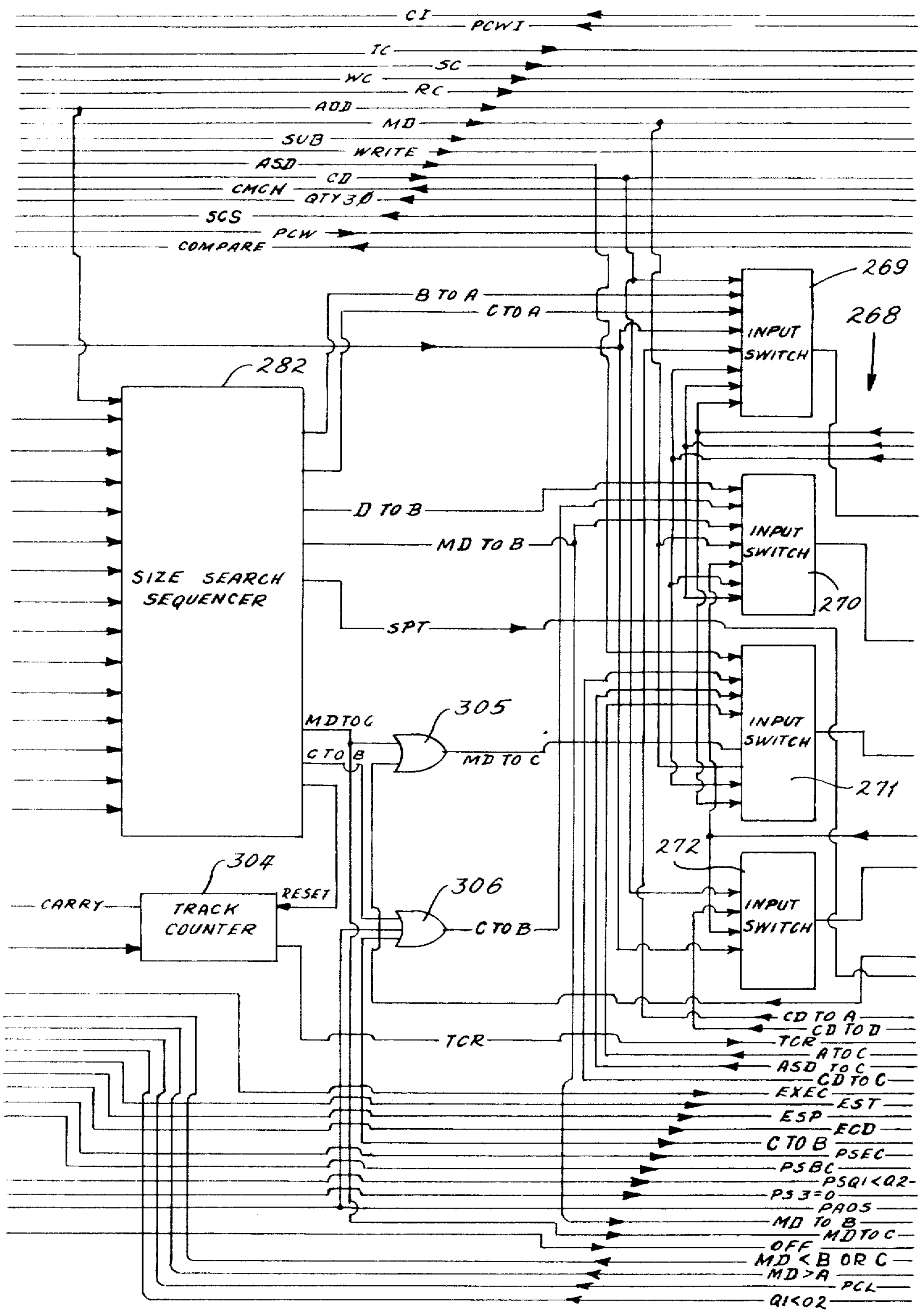
Figure 16C:
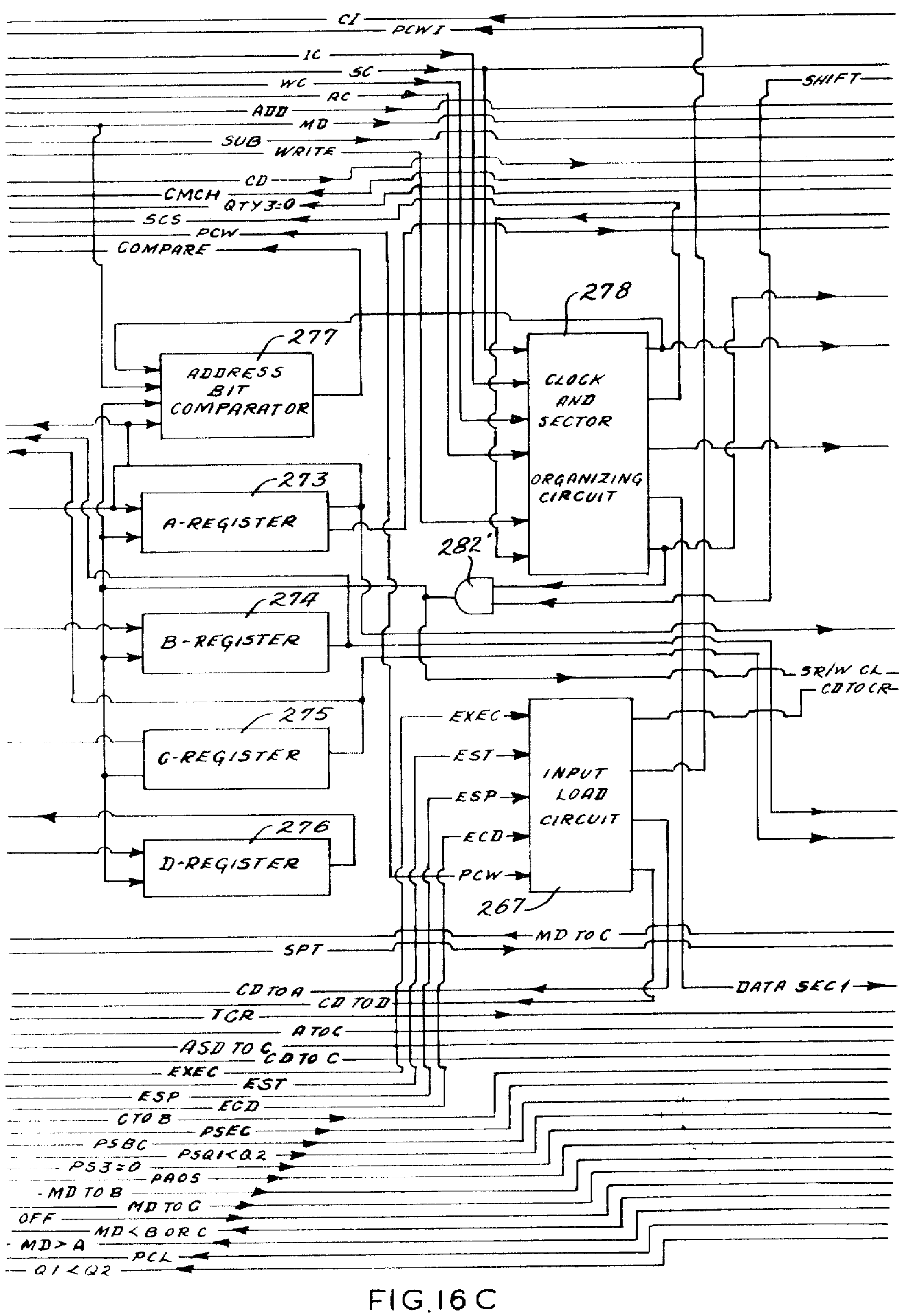
Figure 16D:
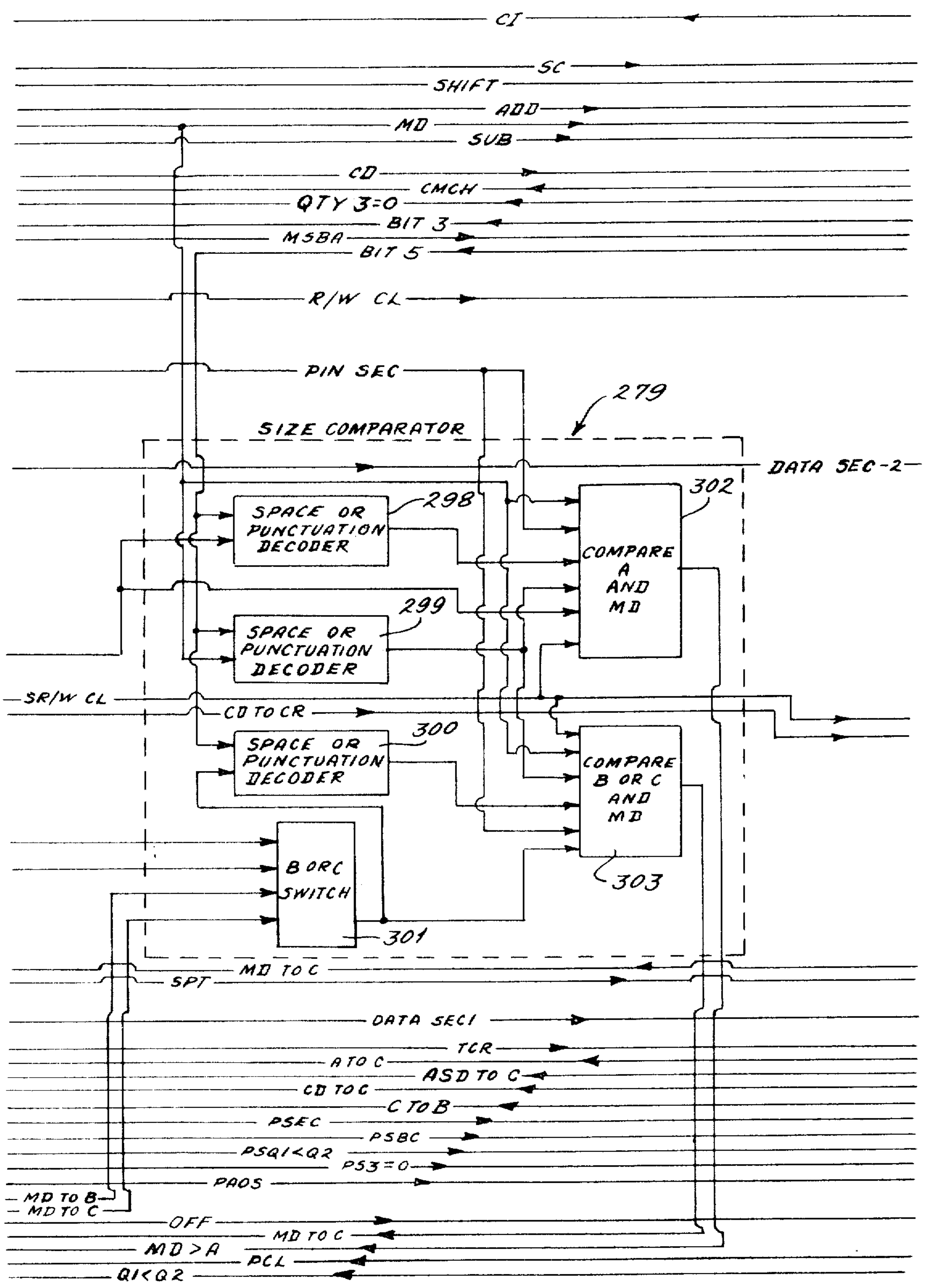
Figure 16E:
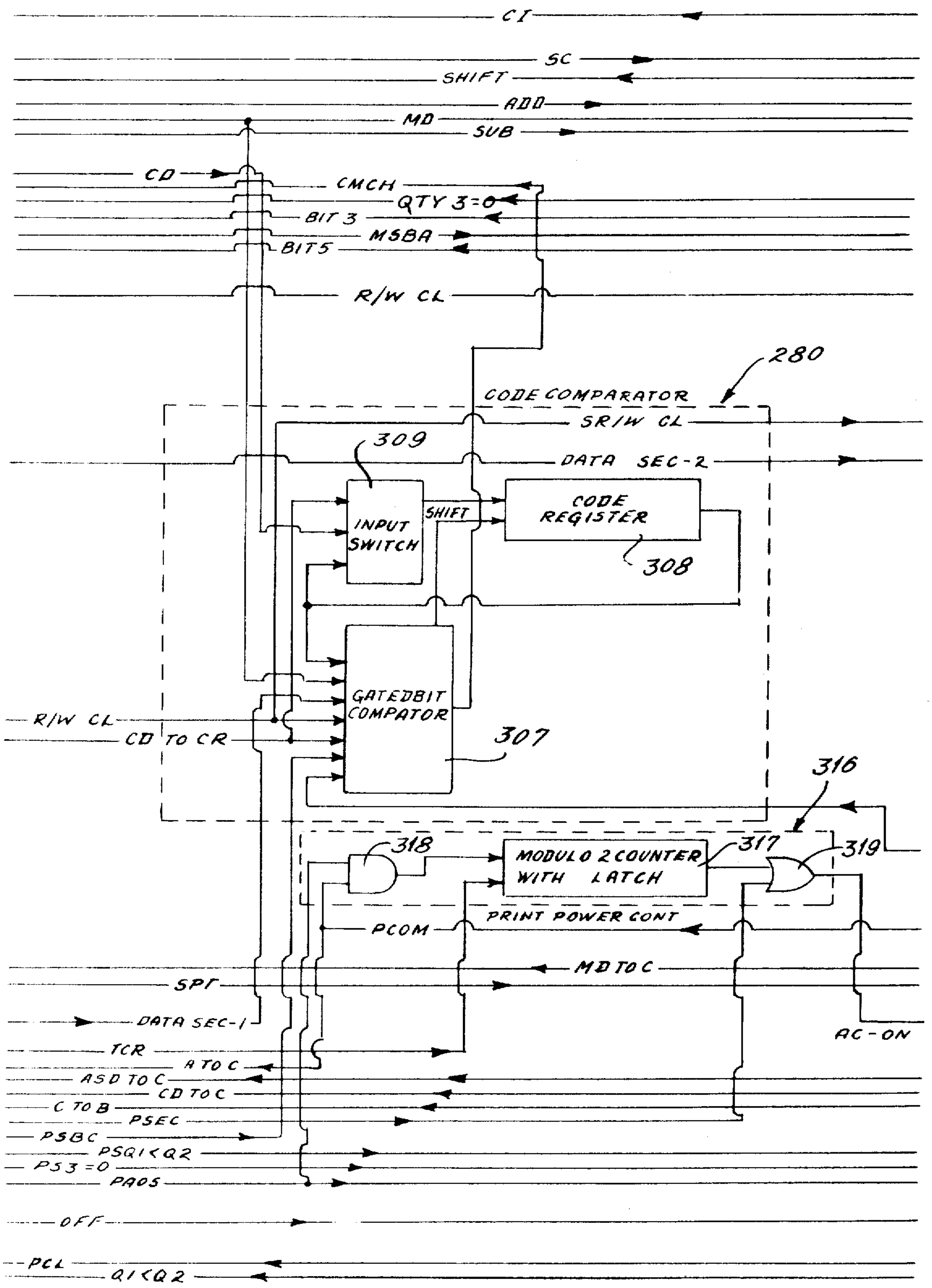
Figure 16F:
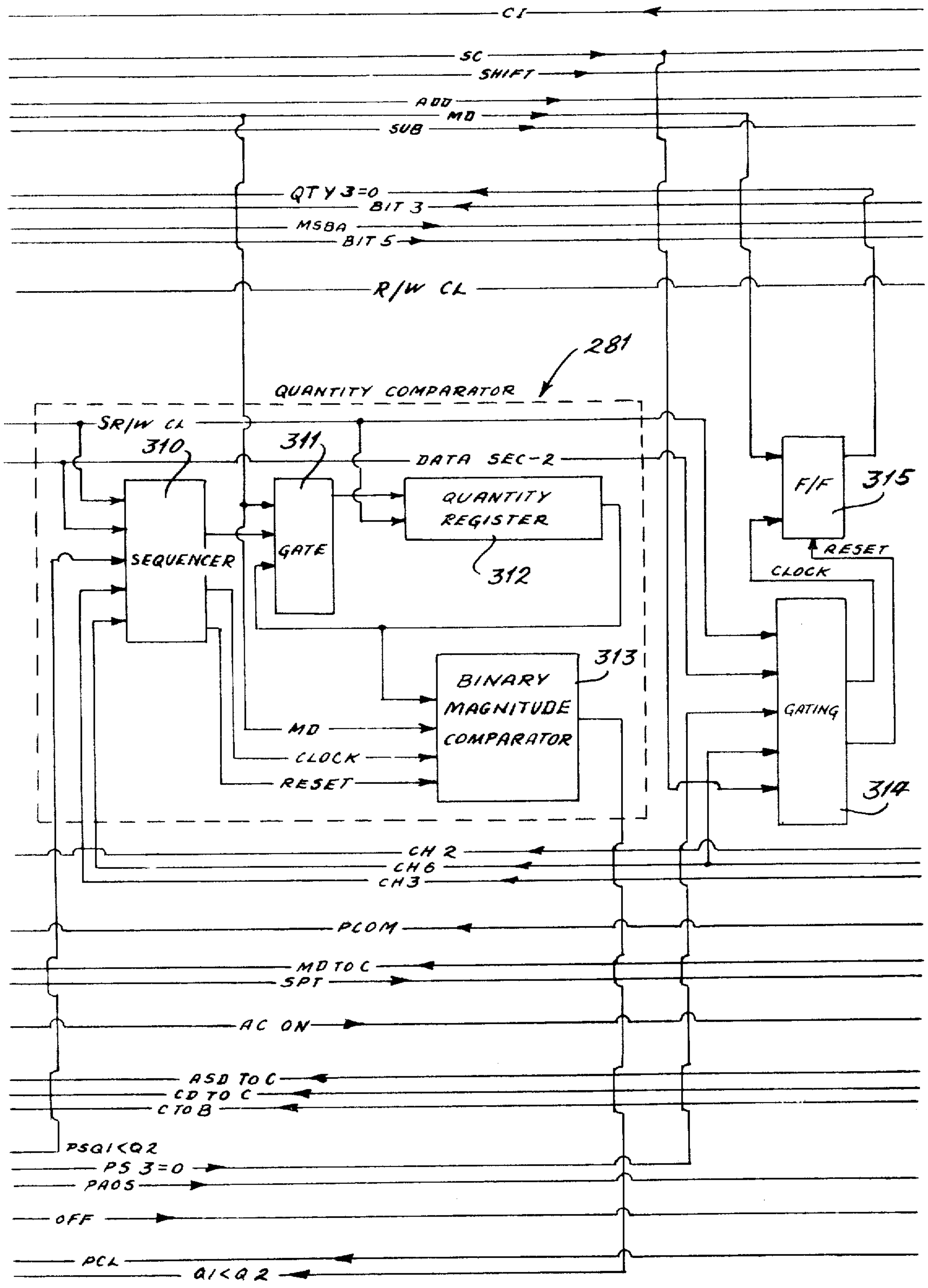
Figure 16G:
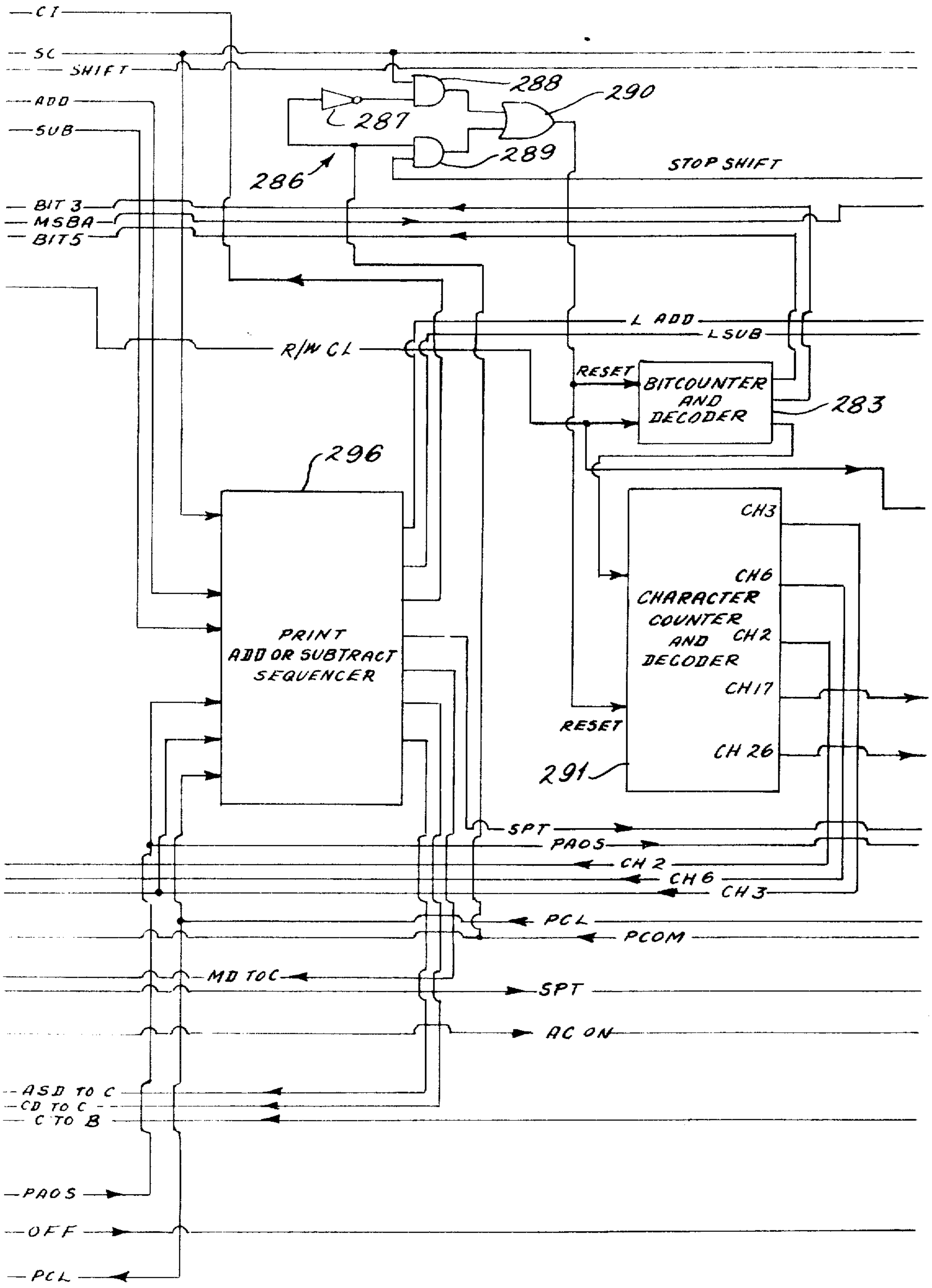
Figure 16H:
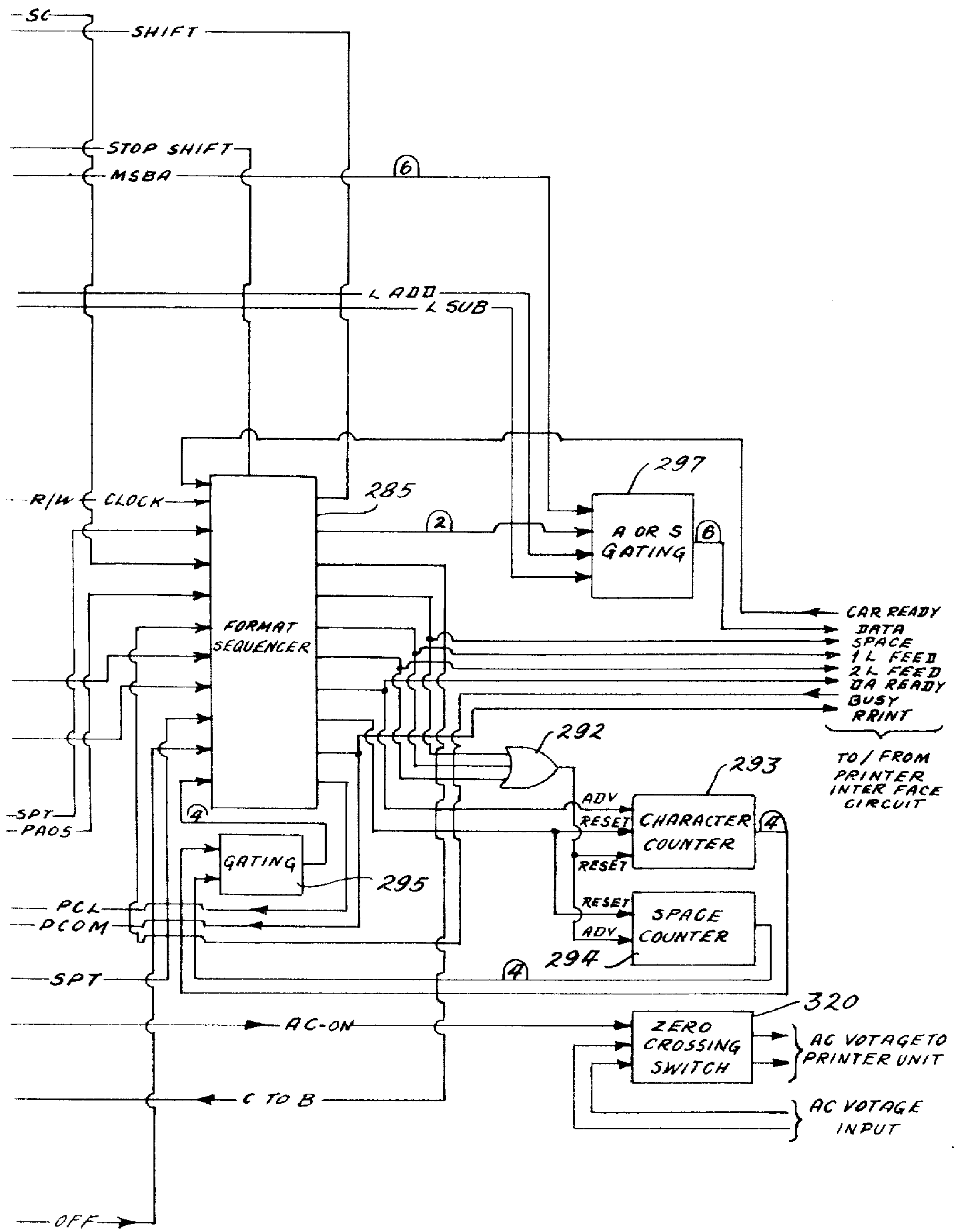

The printer interface circuit J is only schematically illustrated in FIG. 1 inasmuch as the logic contained in this circuit is essentially conventional and can be easily constructed in any of a variety of forms with a simple knowledge of the inputs and outputs illustrated in FIGS. 1 and 16H. As indicated previously, the printer interface circuit J receives from the printer drive circuit P, a print command input PCOM, a space input SP, a data ready input DR, a pair of line feed signals LF, and six data inputs DA. The printer interface circuit J also receives an index pulse input IP, a character pulse input CP, and a carriage ready input, also designated as DR, from the print head K.

The printer interface circuit J has a busy output and a carriage ready output to the printer drive circuit P. In like manner, the printer interface circuit J also has a hammer drive output HD, a carriage start output CS and a line feed output LF to the print head K.

The printer interface circuit J includes a down counter for receiving six bits. On receipt of this six bits, the counter essentially counts down to zero and when the counter reaches a zero count, the hammer in the print head K is initiated. The format sequencer 285 in the printer drive circuit P issues the data to the printer interface circuit J along the data line DA and the printer interface circuit J issues a carriage start signal to the print head K. A delay of approximately two revolutions of the print wheel is created prior to the printing of any character in order to permit the print wheel a sufficient amount of time to achieve the desired operating speed. After two complete revolutions of the print wheel have occurred, the six bits representing the first character are loaded into the down counter contained in the printer interface circuit J and the counting is initiated. The number of counts represent the particular character which is to be printed. For example, if the print wheel is initially located at the zero position, a total of six counts are necessary to print the character five since the character zero assumes the first count and the first five digits will assume the other five counts.

PRINTER DRIVE CIRCUIT

The printer drive circuit P is more fully illustrated in the composite views of FIGS. 16A–16G. By reference to FIG. 16A, it can be seen that the four binary inputs from the print control console or so-called "printer control console" A and the execute input from the printer control console A to the printer drive circuit P pass through low pass filters 260 and into a BCD to 10-line decoder 261. The signals generated in the printer control console A are generally low speed signals of either 20 volt potential or ground potential. These low pass filters generally serve as switching filters and are constructed in the form of resistance-capacitive networks.

The decoder 261 receives the four binary signals from the various switch positions on the printer control console A and decodes the signals into a zero output signal which, in turn, is directed to a load flip-flop 262. The BCD to 10-line decoder 261 is also provided with an "enter start" output, an "enter stop" output, an "enter code" output, a "print sequential" output, a "print sequential by code" output, a "print sequential quantity-1 less than quantity-2" output and a "print sequential quantity-3"= 0 output. In addition, the decoder 261 has an output which is directed to both the clocked set and d.c. reset inputs of an add or subtract flip-flop 263.

For purposes of brevity, the "execute" signal will be designated as "EXEC," the "enter start" signal will be designated as "EST," the "enter stop" signal will be designated as "ESP," the "enter code" signal will be designated as "ECD," the "print sequential" signal will be designated as "PSEC," the "print sequential by code" signal will be designated as "PSBC," the "print sequential quantity-1 less than quantity-2" signal will be designated as "PSQ1<Q2," the "print sequential quantity 3 = 0" signal will be designated as "PS-3 = 0 ", and the "print add or subtract" signal will be designated as "PAOS."

It can be seen that the "off" signal from the decoder 261 is also directed to an OR gate 264 which also receives a signal input from a power supply 265 through a time delay 266. The oring of the add or subtract signal with the power reset signal from the time delay 266 generates an "off" signal at the output of the OR gate and which "off" signal is carried in a line, designated as "off." It can also be observed, by reference to FIG. 16A, that the execute signal is directed to the input of an add or subtract flip-flop 263 and to the load flip-flop 262.

The enter start, the enter stop, and the enter code outputs from the BCD to 10-line decoder 261 serve as inputs to an input load circuit 267 as illustrated in FIG. 16C. The input load circuit also receives an execute command over the execute line EXEC which is generated at the print control console A. The input load circuit also receives a print console write input over the print console write line PCW from the multiplexer M. The input load circuit 267, which mainly comprises an AND gate structure, generates the print console write inhibit signal which is directed to the central electronics unit H, such as in the manner illustrated in FIGS. 1 and 16C. The input load circuit 267 also has three outputs for loading console data and which outputs are described in more detail hereinafter.

The printer drive circuit P also includes a register circuit 268 which comprises four input switches, namely a register-A input switch 269, a register-B input switch 270, a register-C input switch 271, and a register-D input switch 272, in the manner as illustrated in FIGS. 16B and 16C. The register load circuit 268 also comprises four shift registers 273, 274 275, and 276. It can be observed that the register 273 is designated "a-register," the register 274 is designated as "B-register" the register 275 is designated as "C-register," and the register 276 is designated as "D-register." Finally, the register circuit 268 includes an address bit comparator 277.

It can be observed that the execute signal which is generated in the printer control console A passes through the printer drive circuit P and is directed to the multiplexer M in the form of the print console write inhibit signal which is carried over the print console write inhibit line PCWI. Accordingly, when the execute switch 251 is actuated, this signal permits the input load circuit 267 to issue the print console write inhibit signal which inhibits the console unit G from recording any information in the central electronics unit H. The input load circuit 267 generates the proper signals to the register circuit 268, as well as other components (to be hereinafter described), in the printer drive circuit P.

One of the outputs of the input load circuit 267 is directed to the input switch 269 for introduction of console data information into the A-register 273. The second of the outputs of the input load circuit 267 is directed to the input switch 272 for ultimate loading of console data into the D-register 276. It should be observed that these two lines are designated as "CD-A" and "CD-D." The input switches 269 and 272 also receive the output from the load flip-flop 262. The input switch 269 will receive the "zero" input whereas the input switch 272 will receive the "one" input from the flip-flop 262. In accordance with the character magnitude priority system described above, the "ones" thus loaded into the D-register represent a blank space in the aforesaid priority scheme. The input switches 269 and 272 also receive a console data input directly from the multiplexer M over the consold data line CD which carries the information introduced into the console register 130 of the console unit G. The input switches 270 and 271 receive memory data over the memory data line MD directly from the memory section N in the central electronics unit H. The address bit comparator 277 also receives the memory data input from the memory section N of the central electronics unit H.

By further reference to FIG. 16C, it can be seen that the various registers 273–276 are connected in such manner that the outputs of one of the registers can be introduced as an input to another of the registers. This output-input mechanism is accomplished through the use of the various input switches 269–272. Thus, it can be seen that the D-register 276 has an output which serves as an input to the input switch 272 and which serves as an input to the input switch 270. The input switch 272 has an output directed to the D-register 276 and the input switch 270 has an output directed to the B-register 274. In like manner, the input switch 271 provides an input to the C-register 275. Finally, the A-register 273 receives an input from the input switch 269 and which is also coupled with a recirculating output from the A-register 273. Each of the registers 273–276 as well as the address bit comparator 277 receive switched read/write clock signals over a switched read/write clock line designated as "SR/W CL." The source of these switched read/write clock signals is described in more detail hereinafter. The output of the C-register 275 provides inputs to the input switch 269, the input switch 270 and the input switch 271. The output of the B-register 274 provides inputs to each of the input switches 269, 270.

By means of the above outlined circuitry, it can be seen that information contained in any of the registers 273–276 can be transferred to some of the other registers or other components in the printer drive circuit P. Also, all of the aforesaid registers 273–276 are capable of recirculating the data loaded therein. Furthermore, when information is not being transferred out of any of the registers, the information contained in such registers is being recirculated therein. For example, the operator of the system can enter the start number in the A-register 273. This operation is accomplished by shifting the selector switch 250 to the enter start number position to thereby enter the correct start number through the console unit G, and thereafter actuating the execute switch 251. The information transfer among the registers 273–276 is accomplished automatically after the information is properly entered into the system. This start number is introduced through the input switch 269 into the A-register. The stop number is entered into the D-register 276 through the input switch 272 by means of a similar procedure. It can be observed that the input load circuit 267 receives both the enter start number and the enter stop number signals and provides outputs to the respective registers 273 and 276 over the line designated as "CD to A" and a line designated as "CD to D" through the respective input switches 269, 272.

The A-register 273 and the D-register 276 contain a sufficient number of bistable elements to enable the registers to retain at least nine six-bit characters of information, i.e., the length of one sector. Accordingly, each of these registers will contain 54 bits of information at any point in time. Furthermore, it can be observed that the information can be shifted by means of the read/write clock signals which are received by each of the registers 273–276. Considering the three registers, A-register 273, B-register 274 and C-register 275, it can be seen that these three registers are capable of containing nine characters each or a total of 27 characters of information.

Information is loaded into each of the registers 273–276 in such manner that the most significant character of register 273 is located on the left-most portion or first six bit positions of the A-register 273 and the least significant character is located in the right-hand portion or last six bit positions of the A-register 273. The same holds true with the B-register 274 and the C-register 275. The information contained in these registers can be shifted so that the information from C-register 275 can be introduced into B-register 274, the information contained in the B-register 274 can be introduced into the A-register 273 and the information contained in A-register 273 can be reintroduced into the C-register 275.

Information transfers among the registers 273–276 are controlled by a format sequencer to be hereinafter described. In order to shift the information contained in these three registers 273–275, one character to the left, a right circular shift of 26 characters is employed. Thus, it can be seen that by shifting the characters 26 positions to the right, an effective one character left-shift is accomplished for a total of 27 characters. Furthermore, it can be observed that if all characters are right circular shifted for 26 positions in order to accomplish a one left character shift, that the most significant character of C-register 275 is located in the least significant character position of A-register 273. The next character position in A-register 273 would be filled by the least significant character originally contained in A-register 273. In like manner, the most significant character which was originally located in the A-register 273 will be contained in the least significant character position of the B-register 274. The next adjacent character in the B-register would be filled by the least significant character which was originally contained in the B-register 274. Finally, the least significant character position of the C-register 275 would be filled by the most significant character which was originally located in the B-register 274 and the next adjacent character position to the left thereof would be filled by the least significant character which was originally located in the C-register 275.

If an additional eight groups of 26 right circular shifts were then accomplished, it can be observed that the least significant character which was initially in the A-register 273 will be located in the most significant character position of the A-register 273. The next adjacent right-hand position in the A-register 273 will be filled by the most significant character originally located in the C-register 275. The most significant character position of the B-register 274 will be filled by the least significant character originally contained in the B-register 274. The next adjacent right-hand character position will be filled by the most significant character which was originally located in A-register 273. Finally, the most significant chacracter position of the C-register 275 will be filled by the least significant character which was originally located in the C-register 275 and the next adjacent character position will be filled by the most significant chacracter which was originally located in the B-register 274. The reason for this type of shifting mechanism will be described in more detail hereinafter.

The printer drive circuit P also includes a clocking circuit 273, a size comparator 279, a code comparator 280 and a quantity comparator 281. The clocking circuit 278 generally internally includes a two stage shift register, a latch, a sector counter and a pair of clocking gates (not shown herein). The clocking circuit 278 receives index clock pulses, sector clock pulses, write clock pulses and read clock pulses from the central electronics unit H. The clocking circuit 278 also receives a write command input over the write command line WRITE from the multiplexer M.

The sector clock pulses serve as a count signal to the sector counter included in the clocking circuit 278 and the index clock pulses serve as a reset signal to this sector counter. The write signals operate a latch in the clocking circuit 278. The write clock signals and read clock signals from the central electronics unit H are "ored" together in an OR gate (not shown) in the clocking circuit 278 in order to generate the read/write clock signals. A gate in the clocking circuit 278 receives the sector clock signals as well as an inhibit signal from the shift register to generate a switched sector clock signal. In addition, the sector counter and decoder generate an address sector clock signal, a data sector-1 clock signal, and a data sector-2 clock signal.

The address sector clock signal output from the clocking circuit 278 is introduced as an input to the size search sequencer 282 and serves to distinguish between address (part number) sectors and the various data sectors. This output is also introduced into the size comparator 279 and the code comparator 280 in a manner to be hereinafter described in more detail. The sector counter included in the clocking circuit 278 is a modulo-3 counter which is reset by the index clock signal so that the first sector that occurs after the index signal is a part number or address sector.

As indicated previously, the central electronics unit H may generate a plurality of early clock pulses which are used to obviate the problems of long cable transfer delay. The printer drive circuit P would also receive these early clock signals. For example, if the central electronics unit H generated the three early clock signals in a sector time, in the manner as previously described, the clocking circuit 278 would receive the three early clock signals with respect to each sector of 54 bits. Furthermore, the read/write clock signals which are generated at the output of the clocking circuit 278 would also contain three early clock signals with respect to each sector of 54 bits. Accordingly, the first three read/write clock pulses from the clocking circuit 278 are eliminated. As indicated previously, the write clock signal from the central electronics unit H is introduced into the latch which also receives an inhibit signal from the shift register in the clocking circuit 278.

Switched read/write clock signals are generated by anding the read/write clock output of the clocking circuit 278 with shift pulses in an AND gate 282'. These switched read/write clock signals are carried over a line designated as "SR/W CL." When a write operation is to occur at sector clock time, the latch will cause an inhibit signal to be generated in order to detect and ultimately inhibit the three early clock pulses.

The printer drive circuit P also contains a bit counter and decoder 283 generating a bit-3 pulse, which is introduced as an input into the clocking circuit 278. This bit-3 pulse is introduced into the latch of the clocking circuit 278 as a reset input. When the bit counter 283 generates this bit-3 pulse, the reset to the latch removes the inhibit signal and accordingly permits the read/-write clock pulses to be generated at the output of the clocking circuit 278.

As indicated previously, the sector following the sector containing the three early clocks will have three fewer clock pulses. In other words, if one sector contains three early clock pulses, the following sector will contain the normal number of clock pulses minus three. In the normal reading and writing operations, provision was made for the lack of these three clock pulses. However, in printing operations the entire sector which does not contain at least the normal number of clock pulses is eliminated entirely. Accordingly, if information transfer is attempted from one of the registers 273–276 to another of such registers during a sector where the clock pulses have been eliminated, no transfer will be performed since no clocking can occur. Recirculation of information in the registers 273–276 is also prevented until clock pulses are again introduced.

When the latch in the clocking circuit 278 turns "false" the shift register in the clocking circuit 278 is energized thereby creating another inhibit signal to the sector clock gate. Furthermore, the switched sector clock pulses are generated and these switched sector clock pulses are used to initiate and terminate the transfer of information between the respective registers 273–276. For example, if the nine characters contained in B-register 274 are to be entered into the A-register 273, the output of B-register 274 is introduced through the input switch 269 into A-register 273. This switching is initiated and terminated at sector clock time so that 54 read/write clock pulses must be received during information transfer.

Figure 17:
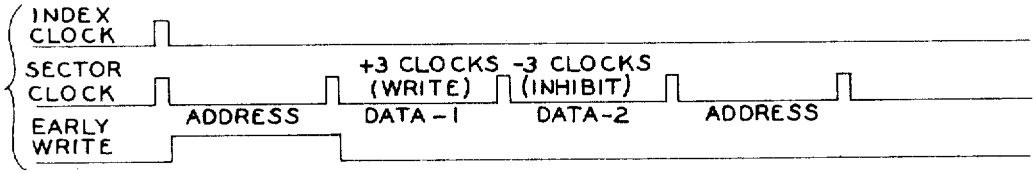
FIG. 17 is a schematic view of various signals showing the timing relationship with respect to the early clock pulse system in the printer drive circuit forming part of the present invention.

The timing relationship with respect to the early clock pulse system is more fully illustrated in FIG. 17. It can be seen that each sector clock pulse will occur after 54 bits. The first data sector contains three extra clock pulses enabling a write or print operation. It can also be observed that the following sector, namely data-2 sector contains three less clock pulses than the normal number of pulses and accordingly all clock pulses are inhibited. The sector clock pulses initiates the address sector and further, it can be seen that the first sector following the index clock pulse is an address sector.

The address bit comparator 277 is essentially an exclusive OR self-latching flip-flop, and as indicated previously receives an input from the output of the A-register 273. It is possible to employ only a partial sector address, as described above, so that less than nine characters may be used to represent the part number or address. In the event that partial sector addressing is employed, the address bit comparator only clocks for those characters which are part of the part number or address. Accordingly, if five characters are employed to represent the part number or address, the address bit comparator 277 will only clock five such characters. The address bit comparator 277 has a compare output which is directed as an input to the size search sequencer 282. The compare output is a signal which is generated at the end of each address sector or partial address sector in which comparison is found. This compare output on the line designated as "COMPARE" also serves as a track jump output which is directed to the central electronics unit H. It can be observed in FIG. 16A that this track jump output is carried on a line designated as "TJ" which is an extension of the COMPARE line.

Figure 18:
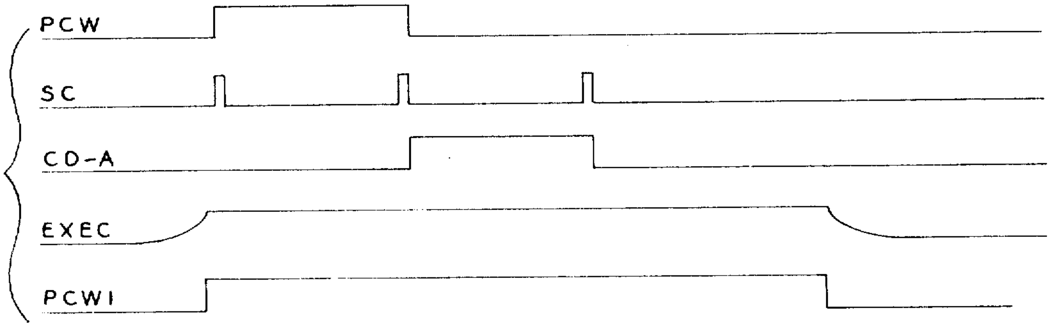
FIG. 18 is a schematic view of various signals used in printing operations and the timing relationship created during printing operations.

The input switches 269–272, which are were previously discussed, are essentially AND-OR gates. The switches 269–272 are designed to control the registers 273–276 in such manner that if information is not being loaded into the registers 273–276, the information contained in each of these registers will be recirculated. Accordingly, whenever console data is entered into either of the input switches 269 or 272 this same console data information will appear at the output of the switches 269 or 272 and will be directly introduced into the A-register 273 and the D-register 276, respectively. When the execute switch 251 is actuated, the print console write inhibit signal is generated as previously described. Furthermore, the print console write signal from the multiplexer M is introduced into the input load circuit 267. As indicated previously, console data from the input load circuit 267 is also directed to the A-register 273 and the D-register 276. The timing relationship for these various signals is more fully illustrated in FIG. 18. It can be observed that a print console write signal is generated simultaneously with a sector clock signal and after generation of the execute signal which results from actuation of the switch 251. In addition, at the end of the second sector clock signal the console data from the input load circuit 271 is introduced into the A-register 273.

The print console write inhibit signal, which is directed to the multiplexer M to prevent writing of such information on the drum 180, is initiated at the beginning of the execute signal in the input load circuit 267; and terminates at the end of the execute signal. Essentially the same timing relationship exists for the loading of the stop number into the D-register 276 and for the loading of a particular code which is hereinafter described in more detail. When the input load circuit 267 receives the print console write signal over the print console write line PCW, the load circuit 267 recognizes that in the subsequent sector, console data will be introduced along the console data line CD. Furthermore, at this point in time, a load strobe signal will be generated in the input load circuit 267 to introduce this information into the A-register 273. The pulse which enables the console data to be transferred to the A A-register 273 lasts for the length of one sector during which console data is received at the input load circuit 267. The input load circuit 267 actually includes a series of NOR gates along with an inverter.

The bit counter and decoder 283 is essentially a modulo-6 counter which is reset by the unswitched sector clock pulses unless a print cycle is in progress. In the event that a print cycle is in progress, then the bit counter and decoder 283 is reset from a format sequencer 285 to be hereinafter described.

By reference to FIG. 16G, it can be seen that the bit counter and decoder 283 is controlled by an AND-OR function circuit 286 including an inverter 287 having an output to an AND gate 288 and which cooperates with an AND gate 289. The outputs of each of the AND gates 288, 289 are connected to an OR gate 290, the output of which provides a reset pulse to the bit counter and decoder 283. It is to be noted that the other input to the AND gate 288 is derived from the sector clock line SC. The AND gate 289 receives an input from the print command line PC and a stop shift input from the format sequencer 285. In like manner, the inverter 287 receives an input from the print command line PCOM. The bit counter and decoder 283 is provided with a pair of decoders (not shown) for decoding a three bit position or count and a five bit position or count. The three bit position signal is transmitted over a line designated as "bit-3" and is introduced into the clocking circuit 278. The bit five position signal is transmitted over a line designated as "bit-5" and is directed as an input to the size comparator 279 in a manner to be hereinafter described in more detail. The bit counter and decoder 283 also receives an input of write clock signals over the read/write clock line R/WC.

Referring again to FIG. 15, it can be seen that character-2 represents the end of the first data field (Q.F. 1) in data sector-1. Character-2 in data sector-1 will represent the beginning of data field-2 (Q.F. 2). Thus, the two least significant character positions of data field - 1 in data sector-1 may represent a particular code such as manufacturer's code or locator code. If three or more characters were employed to represent this data field-1 as in the case of data sector-2 then a character-3 position would be of importance as opposed to a character-2 position. The character-5 position represents the last character of quantity field-2 in data sector-1. A character-17 position is of importance in the system of the present invention in that by using the right circular shift technique in order to obtain a one left circular shift position the most significant character of register 274 or 275 would be acquired by shifting 17 characters to the right. For example, if all nine characters of the address sector were shifted to the left, a shift of 17 characters would enable the printing of the most significant character of data sector-1. Again, it should be observed that each character position is represented by a six bit byte.

The bit counter and decoder 283 has a carry output which serves as a count input to a character counter and decoder 291. In essence, the character counter and decoder 291 is incremented by the carry output from the bit counter and decoder 283. The bit counter and decoder 283 receives unswitched read/write clock pulses over the read/write clock line R/WC from the clocking circuit 278.

The character counter and decoder 291 has several character positions which are more fully illustrated in FIG. 16G. The character counter and decoder 291 has a character-3 output, designated as "CH3" and which is directed to the quantity comparator 281, a character-6 output, designated as "CH6" and which is also directed to the quantity comparator 281 and character-2 output, designated as "CH2" and which is directed to the code comparator 280. The character counter and decoder 291 has a character-17 output, designated as "CH17" and which is directed to the format sequencer 285 and a character-26 output, designated as "CH26" and which is similarly directed to the format sequencer 285.

The format sequencer 285 provides the various outputs to the printer interface circuit J and these various outputs are illustrated in FIG. 1. Referring again to FIG. 16G, it can be seen that the format sequencer 285 has a space output on the space line SP, a one line feed and a two line feed on the line feed lines LF, a data ready output line DR and a print command output on the print command line PCOM. The busy signal from the printer interface circuit J is directed as an input from the format sequencer 285. As indicated previously, the print command output from the format sequencer 285 also serves as an input to the inverter 287 in the AND-OR function circuit 286. The space signal, the one line feed signal and the two line feed signal on the output of the format sequencer 285 are ored together in an OR gate 292 and the output of the OR gate 292 provides a reset input to a character counter 293 and an advance input to a space counter 294. The character counter 293 receives an advance signal from the data ready line DR and and an additional reset signal from the format sequencer 285. In like manner, the space counter 294 also receives a reset signal from the format sequencer 285. The four outputs of the character counter and the four outputs of the space counter 294 serve as inputs to a gate circuit 295 which provides four inputs to the format sequencer 285. Finally, the format sequencer 285 has a print complete output, designated as "PCL," and which serves as an input to the size search sequencer 282.

The format sequencer 285 receives four inputs from the gating circuit 295, and a busy signal input from the printer interface circuit J in the manner as previously described and as illustrated in FIG. 16H. In addition, the format sequencer 285 receives read/write clock input, a sector clock input over the sector clock line SC, and a start print input over a start print line, designated as "SPT" from the print add or subtract sequencer 296. Furthermore, the format sequencer 285 receives a print add or subtract input carried over the print add or subtract line PAOS from the add or subtract flip-flop 263. The format sequencer 285 also receives another start print input from the size search sequencer 282 and an "OFF" signal input from the output of the OR gate 264. Finally, the format sequencer 285 receives a character-17 input and a character-26 input from the character counter and decoder 291.

A print sequence which is selected by the switch 251 on the print control console T is initiated by either the size search sequencer 282 or a print add or subtract sequencer 296, the latter being described in more detail hereinafter. Actually, the print sequence can be initiated by the size search sequencer when the part number or address sector is located in the A-register 273, the data sector-1 is located in the B-register 274 and the data sector-2 is located in the C-register 275. After the print sequence has been initiated the six most significant bits representing the most significant character (that is the left-most character) in the A-register 273 is presented to the printer interface circuit J over a most significant bit transfer line, designated as "MSBA." The MSBA line actually constitutes six lines for carrying the six bits representing the most significant character in the A-register 273. It can be seen that this MSBA line passes into an add or subtract gating 297 which in turn provides six outputs to the printer interface circuit J.

After all the characters which were initially located in the A-register 273, and which constitutes the address sector, have been printed, the format sequencer 285 will issue a one line feed signal to the printer interface circuit J and to the printer K. This signal will permit the paper in the printer K to be shifted with respect to the carriage in the printer K and thereby enabling the printing of the first data sector. The same sequence will occur after the entire nine characters of the first data sector have been printed to thereby allow for the printing of the second data sector. When the end of any line of print is reached in the printer K there is a time delay for the printer carriage to return to its initial print position. A busy signal is initiated by the printer K from the electronics circuit contained therein. When the busy line which carries the busy signal is turned low, the printer drive circuit is advised that the printer K is in a position to accept a new character for printing. In addition, the carriage ready signal from the printer interface circuit advises the format sequencer when the carriage has returned to the left margin after a line feed.

When pqintimg information containing either the part number sector or the various data sectors, it may be necessary to insert spaces between various characters and the sectors. For example, in the event that a partial sector address is employed, it may be necessary to insert a space between that portion of those characters which represent the part number (address) and those characters which represent data. This space is not normally introduced in the sectors of information which are displayed on the display tubes 111. However, in printing it may be necessary to introduce this additional space. For example, data field-1 (Q.F. 1) may represent price and data field-2 (Q.F. 2) may represent warehouse locations. It is desirable to introduce a space between the characters representing these two data fields in order to avoid confusion and to provide a more legible print format.

The format sequencer 285 is programmed to introduce these space positions in the print out. When extra spaces are desired between various characters being printed, the space line from the format sequencer 285 is energized. It should be noted that this space code could be generated through the A or S gating 297 as well. Furthermore, if an additional add or subtract operation is being printed, subsequent to the last character of the sector-2, the printer K will cause the printing of an "A" or "S" to represent that either an add operation or subtract operation has taken place. The "a" and "S" which is printed is represented by a six bit code which is generated in the A or S gating 297. Some internal programming of the format sequencer 285 is necessary to the extent that it is desirable to generate a space code at the locations where spaces are to be introduced between the various characters being printed. For example, if one user of the system desired to print a data field containing three characters, it may be necessary to generate a space code between the second and third characters. Therefore, to this extent, it is necessary to preprogram the format sequencer 285.

When a particular user's pring format may change, the programming of the format sequencer 285 can be accomplished by making changes in the gating circuit 295, which as indicated previously, provides an input to the format sequencer 285. As a character is printed, the character counter 293 is incremented and as the character counter 293 reaches a count where a space is required, such as for example, between the third and fourth characters, the space gate circuit 295 will enable the format sequencer 285 to generate this space signal. The space signal is thereafter transmitted to the printer interface circuit J and the printer K over the space line SP. At this point in time, the space counter 294 is incremented and the character counter 293 is reset to zero.

The initial print sequence is started with a character count of zero and a space count of zero when the character count is decoded to insert a space after the fifth character, for example. The character counter 293 will count the number of characters being printed and when the counter reaches a count of five, this count is gated with space counter. Simultaneously therewith the space counter will be incremented to "one."

The data ready line DR remains deenergized until 26 character shifts have been obtained. Thereafter, this data ready line DR is energized so that a printing operation may be initiated. The print add or subtract sequencer 296 will also control the add or subtract gating 297 in order to print the A or S.

The size comparator 279 is more fully illustrated in FIG. 16D and generally comprises a space or punctuation decoder-A 298, a space or punctuation decoder-B 299 and a space or punctuation decoder-C 300. Each of the decoders 298, 299 and 300 receive the bit-5 input from bit counter and decoder 283. In addition, the decoder-A 298 receives an input from the A-register 273. The decoder-B 299 receives a memory data input from the central electronics unit H over the memory data line MD. The decoder-C 300 also receives an input from a register B or C switch 301. The B or C switch 301 receives the outputs of both the B-register 274 and the C-register 275. The register B or C switch 301 also receives a transfer memory data to B-register "MD to B" input and a transfer memory data to C-register input, designated as "MD to C" from the size search sequencer 282.

The size comparator 279 also includes a comparison circuit 302, designated as "compare A and MD" as well as a comparison circuit 303, designated as "compare B or C and MD." The comparison circuit 302 is designed to compare the memory data with the sector of information contained in the A-register 273. The comparison circuit 303 is designed to compare memory data with the sector of information contained in either B-register 274 or C-register 275, as determined by the register B or C switch 301. The comparison circuit 302 receives a part number sector input from the clocking circuit 278 as well as a memory data input from the memory data line MD. The comparison circuit 302 also receives an input from the space or punctuation decoder-A 298, and input from the space or punctuation decoder-B299, an input from the A-register 273, and a switched read/write clock input from the output of the AND gate 283. The comparison circuit 303 also receives a memory data input, an input from the space or punctuation decoder-B299, and an input from the space or punctuation decoder-C 300. The comparison circuit 303 also receives an output from the B or C switch 301. In addition, the comparison circuit 303 receives a part number sector input and a switched read/write clock input. The comparison circuit 302 generates a memory less than B or C output, designated as "MEM<B or C," and a memory greater than A output, designated as "MEM>A." These outputs serve as inputs to the size search sequencer 282, for reasons which will presently more fully appear.

The size comparator 279 is designed to determine the respective sizes of part numbers in accordance with the assigned part number ordering described above. As indicated previously, arabic characters have been assigned a higher binary magnitude value than numeric characters and the punctuation marks have been assigned a higher binary magnitude value than the arabic characters. For purposes of size comparison, the use of the space or punctuation decoders 298-300 renders a lower value to the space character and punctuation characters than the numeric or arabic characters. The size of the various part number sectors which are introduced into any of the load registers 273–276 is compared with like sectors contained on the drum 180 in the memory section N. As indicated previously, this drum information is received in the size comparator 279 over the memory data line MD. In many cases, it is desirable to print all of the part numbers contained on the drum 180 and which have a size between a minimum part number or so-called "start part number" and a maximum part number or so-called "stop part number." For example, if the start number was "123" and the stop number was "178," the size comparator 279 would detect all part numbers between "123" and "178," e.g., "149," "163," "170," etc.

As indicated previously, any sector of information which is read from the drum is read with the least significant character first. Accordingly, in a nine character sector, the least significant character of that sector is read first and the most significant character is read last. In like manner, the least significant bit of the least significant character is read first. Any space or punctuation in the address is decoded at bit-5 time as determined by the bit counter and decoder 283. If the address has neither spaces or punctuation marks included therein, the bits normally representing spaces or punctuation are not included in the comparison. However, if the address sector which is introduced in the A-register 273 does include spaces or punctuation and a particular address read from the drum 180 and transmitted to the comparison circuit 302 of the size comparator 279 does not include any spaces or punctuation, the comparator 279 will determine at those character positions, that the address being read from the drum 180 is larger. During the comparison of more significant characters, that is reading from right to left in the address sector, if it is found that both the address contained in the A-register 273 and the particular address being read from the drum 180 both contain punctuation and/or spaces in different character locations, then the length determination normally made by the size comparator 279 is inhibited.

The space or punctuation decoders 298–300 generally include a series of NOR gates and a series of AND gates (not shown). Each of the decoders 298–300 are essentially identical in their construction and can be logically designed by the skilled artisan with only a simple knowledge of the input/output relationships defined herein and the alpha-numeric size ordering described above.

The comparison circuits 302, 303 internally include binary magnitude comparators (not shown) to determine which of the bits representing a character have higher binary magnitudes. In essence, the comparison is made starting from the least significant bit to most significant bit and from least significant character to most significant character. The binary magnitude comparator inputs are derived from the space or punctuation decoders 298–300 in such manner that space or punctuation marks are considered to be of smaller binary magnitude than any digit or letter.

A space and numeral magnitude comparator flip-flop (not shown) is located in each of the comparison circuits 302, 303 and determines that the bits representing a space are smaller in assigned magnitude than the bits representing the character zero or any other numeral character. As stated previously, the space or punctuation mark is larger in binary code than that of any letter or number in accordance with the established magnitude scheme. However, the determination that the space or punctuation marks have a value magnitude of less than zero for purposes of comparison is required since part numbers with less characters are deemed to be smaller than part numbers with more characters. The part number address with the largest number of characters is the more significant character positions, excluding punctuation marks or spaces in these positions, would constitute the largest part number address. The following part numbers are listed in descending order according to their magnitude:

9256-2
9256
987-342
987
123-4
123
12-3
12
1

The output of the comparison circuit 302 is rendered true to generate the MD>A signal at the end of comparing an address sector in the A-register 273 with the size of the addresses read from the memory section N, when the size of an address in the memory section N is larger than the address which has been introduced into the A-register 273. The comparison operation for the address sector stored in B-register 274 and C-register 275 are similar to the comparison operation with the address stored in A-register 273. The output of the comparison circuit 303 which compares the addresses in B-register 274 and C-register 275 with memory data is rendered true at the end of the address sector comparison where the address contained in either of the registers 274, 275 is smaller than or equal to the address read from the memory section N. The comparison circuit 302 is provided with a series of flip-flops and NOR gates (not shown) in such manner that the comparison circuit 302 actually serves as a memory and provides a gated comparison. It can be observed that the address sectors located in either B-register 274 or C-register 275 can be compared with memory data in accordance with the position of the register B or C switch 301. If the address sector located in B-register 274 is being right circular shifted, then the new address sector is loaded into C-register 275. In like manner, if the address sector located in C-register 275 is being right circular shifted, a new address is loaded into B-register 274.

The size search sequencer 282 is more fully illustrated in FIGS. 16A and 16B, and as indicated previously, receives a switched sector clock input over the SCS line, a print complete input over the PCL line, a memory less than register B or C input over the MD<B or C line and a memory greater than A-register input over the MD>A line. In addition, the size search sequencer 282 receives a compare input which is generated at the output of the address bit comparator 277, to thereby indicate comparison between the part number address in the A-register 273 and memory data. A memory data input to the sequencer 282 is derived from the memory data line MD in the manner as illustrated in FIGS. 16A and 16B.

The size search sequencer 282 also receives a quantity-3 = zero input from a line designated as "QTY 3 = 0" and which signal is generated in a manner to be hereinafter described in more detail. Furthermore, the quantity comparator 281 generates a quantity-1 less than quantity-2 output, designated as "Q1 >Q2" and which serves as an input to the size search sequencer 282. The size search sequencer 282 receives a code match signal over a code match line designated as CMCH. In addition, the size search sequencer 282 also receives a reset signal and an execute signal which is generated at the print control console A and passed through the low pass filter 260. The sequencer 282 also receives a number of inputs from the BCD to 10 line decoder 261, such as the print sequential output PSEC, the print sequential by code output, PSBC, the print sequential quantity-1 less than quantity-2 output, PS Q1 >Q2 and the print sequential quantity 3 = 0 output, PS 3 = 0.

The size search sequencer 282 can be readily designed with a knowledge of (1) the address organization of the information recorded on the drum 180, (2) the requirement for the print out in the desired order and in alpha-numeric format, and (3) the assigned magnitude priorities of the various characters and determination of larger and smaller numbers. In the initial search for various part numbers on the drum 180 which are sized between the start part number and the stop part number, the start number is loaded into the A-register 273 and the stop number is loaded into the D-register 276. The part number sectors are introduced into the registers 273, 276 through the input switches 269 and 272, respectively.

The size search sequencer 282 essentially operates in either of two modes. The first mode is operable with the A-register 273 and is designed to enable the searching for a start number exists on the drum 180. The A-register 273 recirculates the information contained therein and the size search sequencer 282 watches for a compare pulse. Simultaneously, the size search sequencer 282 watches for a track counter carry pulse. If a qualifying start number is located on the durm 180, a compare pulse will be generated. However, if no compare pulse is generated and an index counter carry signal is received, it is recognized that there is no qualifying start number on the drum 180.

The second mode of operation of the size search sequencer 282 relates to a data storage and print-out function if the start number is found in the first mode of operation. The storage and print-out will be initiated on the receipt of the compare pulse. If no compare pulse is received, but an index counter carry signal is received, then the printing operation is inhibited. The size search sequencer will also contain a select flip-flop (not shown) for controlling the loading of memory data into the B-register 274 of the C-register 275. If memory data is loaded into the B-register 274, then the information in the C-register 275 will be recirculated, and if the memory data is being loaded into the C-register 275, then the information in the B-register 274 will be recirculated.

During the actual searching operation, the stop number which was intially loaded into the D-register 276 is therefore loaded into B-register 274 in the manner as previously described by employing the input switch 270. At this point in time, the start number is loaded into A-register 273. The memory data is loaded into C-register 275. The particular part number loaded from the memory section N into the C-register 275 actually constitutes a candidate number for comparison against the start number and the stop number. If the candidate number meets the criteria, namely, that is larger than the start number and smaller than or equal to the stop number, this particular candidate number will be retained. If a candidate part number does not meet both of these two criteria, it is not retained. Inasmuch as this candidate number is the next number on the drum 180 which is immediately smaller than the stop number, this last candidate number that meets both criteria constitutes the new candidate for print out and the new maximum number for purposes of comparison.

It is now possible to search for a second candidate number. At this point in time, the start number is still in the A-register 273 and the first qualifying candidate number is located in C-register 275. Therefore, a second candidate part number which is transmitted over the memory data line MD can be loaded into the B-register 274. If the second candidate number meets the criteria of being larger than the start number and smaller than the first candidate number, it also qualifies for printing. Furthermore, the second candidate number which then exists in the B-register 274 constitutes the new candidate. A third candidate number transmitted from the memory section N over the memory data line MD is then loaded into C-register 275. It is to be noted that the various input switches 269-272 control this loading arrangement into the respective registers.

The various part number addresses located on the drum 180 which qualify for printing are found in the manner as previously described. When a track counter carry signal is generated by the track counter 304, the present candidate is the next number to be printed. Accordingly, the address of this particular number is thereby determined. Thereafter, it is necessary to search for the two data sectors associated with this particular part number sector. The address or part number which is to be printed is then transferred to the A-register 273. When this address is found on the drum 180, the two data sectors associated with this address is introduced into the cascaded B-register 274 and C-register 275, as previously described. If a track counter carry signal is generated without finding a qualifying candidate, address, or part number, then the search sequence is complete, since no number is present that is smaller than or equal to the stop number.

It is to be noted that the size search sequencer 282 has a transfer B to A output, designated as "B to A," and which is directed to the input switch 269. The size search sequencer 282 also has a transfer C to A output to the input switch 296 and which is designated as "C to A." In essence, these two signals control the transferring of the sectors of information in B-register 274 and C-register 275 to the A-register 273. The size search sequencer 282 also has a transfer D-register to B-register output, designated as "D to B," and which serves as an input to the input switch 270, the latter controlling the transferring of a sector of information from D-register 276 to B-register 274. Furthermore, the size search sequencer 282 has a transfer memory to register B output, designated as "MD to B," and which is directed to both the input switch 270 and the register B or C switch 301.

When the size search sequencer 282 determines that a candidate part number is to be printed, it issues a start print command, designated as "SPT," and which is directed as an input to the format sequencer 285. The size search sequencer 282 also issues a transfer memory data to C-register output over a line designated as "MD to C," and which is directed to the input switch 271, in the manner as illustrated in FIG. 16B. The memory data to C-register output of the sequencer 282 is ored with a similar transfer memory data to C-register output from the print add or subtract sequencer 296 also designated as "MD to C," in an OR gate 305. The output of memory data to C-register output of this OR gate 305 is directed as an input to the input switch 271. Furthermore, the size search sequencer 282 has a transfer C-register to B-register output, designated as "C to B," and which is ored with a print add or subtract output, designated as "PAOS" from the add or subtract flip-flop 263 and a transfer C-register to B-register output from the format sequencer 285 in an OR gate 306. A transfer C-register to B-register output of the OR gate 306 designated as "C to B" serves as an input to the input switch 270. It can also be observed that the input switches 269, 271 receive an input from the output of the A-register 273. Finally, the input switch 271 receives a transfer A-register to C-register input, designated as "A to C," or transfer add/subtract data to C-register input, designated as "ASD to C" input, and a transfer console data to C-register input desiganted as "CD to C," and each of these inputs are derived from the print add or subtract sequencer 296.

The size search sequencer 282 includes the aforementioned select flip-flop (not shown) which determines whether information is loaded into the B-register 274 or the C-register 275. The flip-flop has an output which provides for loading of the information in the B-register 274 and another complementary output which provides for loading of information into the C-register 275. When both outputs of the comparator 279, namely a memory less than or equal to the B or C output and a memory greater than A output, are true, the select flip-flop included in the size search sequencer 282 is toggled at the end of the second data sector.

The select flip-flop, which is located in the size search sequencer 282, also receives a code match output from the code comparator 180, a quantity 1 less than quantity 2 output, Q1 <Q2 from the quantity comparator 281 and an output from certain zero quantity logic to be hereinafter described. These inputs to the select flip-flop in the size search sequencer 282 are only used when the proper printing mode has been selected through the switch 251 on the print control console A.

The code comparator 280 is more fully illustrated in FIG. 16E and generally comprises a gated bit comparator 307 which has output to a code register 308. The code register 308 is essentially a shift register having a series of bistable elements such as flip-flops and the number of bistable elements or "stages" of the register 308 will be equal to the number of bits representing a particular code. Thus, if one of the data fields in either of the data sectors, as illustrated in FIG. 15, represented a two character manufacturer's code, the code register would have a sufficient number of bistable elements to accommodate two characters or a total of 12 bits.

The code register 308 also receives an input from an input switch 309, the latter receiving console data directly over the console data line MD from the multiplexer M. The input switch 309, input switch 309 also receives the output of the code register 308. Finally, the input switch 309 receives a transfer console data to code register line, designated as "CD to CR," and which is generated as an output at the input load circuit 267.

The gated bit comparator 307 receives the output of the code register 308, the switched read/write clock input and the console data to code register input. In addition the gated bit comparator 307 receives a memory data input over the memory data line MD from the central electronics unit H. The clocking circuit 278 has a data sector-1 output which serves as an input to the gated bit comparator 307, and the print sequential by code output from the BCD to 10-line decoder 261 also serves as an input to the gated bit comparator 307. The gated bit comparator 307 finally receives a character-2 input from the character counter and decoder 291. The gated bit comparator 307 of the code comparator 280 generates a code match output which is designated as "CMCH" and which serves as an input to the size search sequencer 282.

If the last two characters of data sector-1 represented a manufacturer's code, these two characters would be initially loaded into the code register 308. When the code register 308 is shifted, the gated bit comparator 307 is enabled during the first two character position time of data sector-1. The gated bit comparator 307 is reset at the beginning of any part number sector. If the bits representing data field-1 of data sector-1 or the manufacturer's code, compare with the code register, assuming a print sequential by code transaction was selected, then the gated bit comparator output is true at the beginning of any subsequent part number sector.

The quantity comparator 281 is more fully illustrated in FIG. 16F and is designed to determine whether the binary magnitude of the characters in data field-1 are smaller than the characters in data field-2 of data sector-2. The quantity comparator 281 generally comprises quantity sequencer 310 which receives a read/-write clock input and a data sector-2 input directly from the clocking circuit 278. The sequencer 310 also receives a character-6 input and a character-3 input from the character counter and decoder 291. Finally, the sequencer 310 receives a print sequential quantity-1 less than quantity-2 command PS Q1 <Q2 input from the BCD to 10-line decoder 261.

The quantity comparator 281 also includes a gating circuit 311 which introduces data field information into a quantity register 312. The gate 311 receives an input from the sequencer 310 and a memory data input from the memory data line MD. Furthermore, the gate 311 receives the output from the quantity register 312.

A binary magnitude comparator 313 in the quantity comparator 281 receives the output of the quantity register 312 and a clock input and a reset input which are derived from outputs of the sequencer 310. Finally, the binary magnitude comparator 313 receivews a data sector-2 input from the data sector-2 line.

The character-3 input to the sequencer 310 essentially advices of the end quantity field-1 and the beginning of quantity field-2 of the data sector-2. Character-6 advises of the end of quantity field-2. By reference to FIG. 15, it can be seen that data sector-2 has been selected with a three character quantity field-1 and a three character quantity field-2. Accordingly, character-3 represents the end of quantity field-1 the beginning of quantity field-2 of data sector-2. In like manner, character-6 would represent the end of quantity field-2 of data sector-2.

Assuming that the operator selects the "print sequential quantity-1 less than quantity-2" mode on the print control console A and operates the execute switch 251, the first three character of each data sector-2 are loaded into the quantity register 312 concurrently with a size search performed by the size search sequencer 282. Starting with character-3, the binary magnitude of the bits in the quantity register 312 are compared with the data field-2 bits of each data sector-2 transmitted over the memory data line MD. If a magnitude comparison by the binary magnitude comparator 313 determines that data field-1 of data sector-2, which is entered into the quantity register 312, is smaller than the data field-2 of the memory data sector for these three characters, then at the end of the second data sector, the output of a flip-flop in the binary magnitude comparator 313 is rendered true.

If the memory data which is introduced into the binary magnitude comparator 313 is greater than the magnitude of the number contained in the quantity register 312, then the output line Q1 <Q2 is energized. All clocking functions in the quantity comparator 281 are then stopped at the end of character-6. It can be observed that the quantity comparator 281 not only determines whether data field-1 is smaller than data field-2, but also stores that determination until the end of the sector.

As indicated previously, in many cases it is desirabled to accumulate quantity transactions and accordingly, the data processing system of the present invention is capable of zeroing accumulated data and this feature is described in the section entitled "Zeroing of Accumulated Data." In FIG. 10, an exemplary data sector was illustrated as being divided into four data fields and the third of the data fields consisting of two character positions contained accumulated data. For the purposes of describing the printing operation, reference will be made to FIG. 15 and it will be assumed that data field-3 (QF 3) of data sector-2 will contain the accumulated data.

The circuitry which enables the printing of print sequential quantity-3 = 0 includes a gating circuit 314 and a flip-flop 315, in the manner as illustrated in FIG. 16F. It can be seen that the gating circuit 314 receives a switched read/write clock input over the switched read/write clock line SR/W, a data sector-2 input from the clocking circuit 278, a print sequential quantity 3 = 0 input over the PS3 = 0 line from the BCD to 10-line decoder 261, a character-6 input from the character counter and decoder 291 and a sector clock input over the sector clock line SC. The gating circuit 314 has a clock output and a reset output which serve as inputs to the flip-flop 315. By further reference to FIG. 16 F, it can be seen that the flip-flop 315 also receives a memory data input over the memory data line MD and provides the quantity 3 = 0 output, QTY 3 = 0, which serves as an input to the size search sequencer 282.

The memory data input to the flip-flop 315 serves as a set input. Clocking functions in the gating circuit 314 will occur only during the most significant three characters of data sector-2 which are the three characters existing in data field-3 of data sector-2. Accordingly, if there are any bits representing characters other than the "zero" character in data field-3 of data sector-2, then the flip-flop 315 will be set. However, if the flip-flop 315 is in the reset state at the end of data sector-2, the part number associated with this data sector-2 will be saved inasmuch as it qualifies as a candidate for printing of quantity-3 transactions. The flip-flop 315 will be held in the reset state if the print sequential 0 quantity-3 = 0 position has not been selected through the selector switch 251 on the printer control console A, and accordingly, the output of the flip-flop 315 will serve no function in the size search sequencer 282 in this condition.

The print add or subtract sequencer 296 is more fully illustrated in FIG. 16G. The print add or subtract sequencer 296 internally includes a BCD to 10-line decoder, a four bit binary counter and eight input multiplexer (not shown). The multiplexer is essentially addressed with the same count as the decoder included in the sequencer 296. Three binary bits are used to define eight input states. The multiplexer includes eight inputs and one output. Accordingly, whatever signal on the input addressed by the counter appears, also appears at the output of the multiplexer. The decoder, in like manner, has eight outputs as determined by the counter state. Accordingly, if the zero input line to the multiplexer M was energized, a signal will appear at the output of the multiplexer M, since the counter will be reset. When the multiplexer input line "zero" turns true, the counter counts to state 1. If the BCD to 10-line decoder in the sequencer 296 is at state zero, then the zero line output is energized. Furthermore, no input will be selected, except by the counter so that if the zero input is energized, the counter will count to one. If the "one" input to the multiplexer is energized, the counter will count to two. The print add or subtract sequncer 296 will also include latches and other attendant circuitry (not shown) in order to render the aforementioned major components operative. However, the basic design of the print add or subtract sequencer 296 is within the purview of the artisan with a simple knowledge of the input-output relationships defined herein.

By further reference to FIG. 16G, it can be seen that the print add or subtract sequencer 296 receives a sector clock input, over the sector clock line SC, and add input over the add line ADD, and a subtract input over the subtract line SUB from the central electronics unit H. In addition, the print add or subtract sequencer 296 receives a print add or subtract command over the PAOS line, a print complete input from format sequencer 285 and a character-3 input from the character counter and decoder 291.

The print add or subtract sequencer 296 generates a latched add output designated as "LADD" and a latched subtract output, designated as "LSUB," and which serve as inputs to the add or subtract gating circuit 297. In addition, the print add or subtract sequencer 296 generates the console inhibit signal which is directed to the multiplexer M. Furthermore, the print or subtract sequncer 296 generates a start print command which is introduced in the format sequencer 285, as previously described, a memory data to register C over the ASD to C line, and a console data to register C signal transmitted over the CD to C line. As indicated previously, the memory data to register C output serves as an input to the OR gate 305, and the add/subtract data to register C output and the console data to register C output serve as inputs to the input switch 271.

When print transactions is selected through the selector switch 250 and the execute switch 251 is actuated, the add or subtract flip-flop 263 is set. Register-A 273, B-register 274 and C-register 275 will then be cascaded for transfer of information in the manner as previously described. Memory data is introduced into the C-register 275 by the print add or subtract sequncer 296. The information contained in C-register 275 will be introduced into B-register 274 and the information which was previously contained in B-register 274 will be introduced into A-register 273. As indicated previously, the print add or subtract sequencer 296 contains a pair of latches, one of which indicates the add operation, and the other of which indicates the subtract operation.

After the add or subtract latch is set in the print add or subtract sequencer 296, add or subtract data will then be loaded into C-register 275. Inasmuch as the various registers 273-275 have been cascaded, the part number information will be loaded into B-register 274 and thence to A-register 273. At character count three, which is introduced into the print add or subtract sequencer 296, console data is loaded into C-register 275, and the memory data will be shifted into B-register 274. Thereafter, the print add or subtract sequencer 296 will issue the console inhibit signal to prevent any writing on the drum 180 and a print cycle will be initiated. In this connection, it should be noted that the print add or subtract sequencer 296 has a start print signal directed to the format sequencer 285. After the printing operation has been completed, the console inhibit signal from the print add or subtract sequencer 296 is removed and the add and subtract latches contained in the sequencer 296 are reset so that a new print add or subtract cycle can be initiated.

It should be noted that it is desired to save the quantity being added or subtracted, so that the add/subtract data is retained in the C-register 275 instead of the memory data. When the character counter counts three, no further add/subtract data will be loaded into C-register 275 since only three characters constitute data field-1 of data sector-2. Accordingly, console data is loaded into C-register 275. The console inhibit signal which is generated by the print add or subtract sequencer 296 prevents any other console operations with respect to the printer drive circuit P.

The printer drive circuit P also includes a print power control circuit 316 which is more fully illustrated in FIG. 16E and which contains a modulo-2 counter with an internal latch (not shown) and recewves a track counter stage 8 carry input, designated as "TCR," from the output of the track counter 304. The modulo-2 counter 317 also receives an enable input from an AND gate 318, the latter receiving a print add or subtract input over the PAOS line from the add or subtract flip-flop 263 and a print command input over the PCOM line from the format sequencer 285. The modulo-2 counter 316 has an output which is ored with a print sequential signal PSEC in an OR gate 319. The oring of the counter output with the print sequential signal generates an AC-on power signal transmitted over a power switching line, designated as "AC-on" and which is connected to a zero corssing switch 320. The latter of which actually forms part of the print power circuit 316. The zero crossing switch 320 also receives an AC voltage input in the manner as illustrated in FIG. 16H and provides an AC voltage output to the printer K, also in the manner as illustrated in FIG. 16H.

Many of the users of the system of the present invention generally hold the system in the print add or subtract mode, or so-called "print transactions mode" since print sequencing is generally only performed a small percentage of the time with respect to the printing of transactions. In the printing transactions mode, the motor which operates the printer K is not continually operating so that when a print transactions mode is initiated, the motor in the printer K will be energized. However, it must be recognized that the motor, which is conventional in its construction, must achieve proper operating speed in order to perform properly. Accordingly, the print power control circuit 316 provides a selected time delay with respect to the format sequencer 285 in order to enable the motor in the printer K to achieve the proper operating speed. It should also be observed that when the selector 259 is shifted to any of the print sequential positions, the motor will be operating constantly.

OPERATION OF THE PRINTER DRIVE CIRCUIT

At the outset, it should be noted that the printing logic, which includes the printer drive circuit, the printer interface circuit J, and the logic in the printer K operates independently of all of the other components forming part of the electronic data processing system. The printer drive circuit P and the printer interface circuit J do not require any track addressing information and essentially takes the data from either the console unit G or the central electronics unit H in the same form as it is loaded into these two respective units. After all of the necessary information has been entered into the printer drive circuit P through the print control console A, the printing operation does not access, or tie up the various console units G which may be operatively connected to the central electronics unit H. Furthermore, the printing logic does not otherwise affect the normal operation of the system in any way in absence of any printing operation. In other words, the various console units G may access the central electronics unit H through the multiplexer M as though no printing logic were interfaced to these components.

The information contained in the memory section N of the central electronics unit H may be printed in a variety of modes. In like manner, various transactions which take place through the console unit G may also be printed. As indicated previously, various sequential operations may be performed through the system of the present invention. For example, if it is desired to print all of the part numbers and the data associated with these part numbers between a minimum and a maximum number of address, the print sequential mode is employed. In this case, the selector switch 250 is switched to the enter start position. The start number representing a minimum part number is then introduced through the various keys on the keyboard 112 and the execute switch 251 is thereafter actuated. The selector switch 250 is then switched to the enter stop position and the stop number representing a maximum part number is introduced through the various keys on the keyboard 112. The execute switch 251 is again actuated. At this point in time, the minimum and maximum part numbers have been inserted into the printer driver circuit P in the manner as previously described. If it is desired to print all of the part numbers and the data sectors associated with these part numbers, which are located between the start number and the stop number, the selector switch 250 is shifted to the "print sequential" position. As also stated above, the print sequential position may well represent a print inventory condition. After the execute switch 251 is again actuated, all of the part numbers and the data sectors between the start number and the stop number will be printed through energization of the printer K in the manner as previously described.

If it is desired to print sequential by code, the start number and the stop number are entered into the console unit G and the printer drive circuit P in the manner as previously described. The selector switch 250 is then switched to the enter code position, the desired code is introduced into through the various keys on the keyboard, and the execute switch 251 is actuated. The selector switch 250 is then sbifted to the print sequential by code position and the execute switch 251 is thereafter actuated. As stated above, the print sequential by code position may well represent an inventory of a particular manufacturer. In this case, all of a particular manufacturer's part numbers which are located between the start number and the stop number will be printed, and only these manufacturer's part numbers will be printed. As also stated previously, the enter code position may represent the number of different types of codes such as warehouse location, or types of merchandise, etc.

In order to print the various part numbers in sequential format which have data field-1 of data sector-2 less than data field-2 of data sector-2, the operator of the apparatus will enter both the start number and the stop number in the manner previously described. The selector switch 250 will be shifted to print sequential quantity 1 less than quantity 2 and thereafter the execute switch 251 will be actuated. In this case, all of the part numbers and the attendant data sectors associated with these part numbers between the start number and the stop number will be printed according to the affirmative result of the quantity comparison.

It is also possible to print sequentially various data sectors which contain zero transactions. For example, if the print sequential quantity 3 = 0 represented a "print zero sales" then all part numbers which did not have any sales in a selected period would be printed. As indicated previously, data field-3 of data sector-2 represented the accumulated sales, and accordingly, if no transactions took place in this area all zeros would represent the characters of this data field-3. Therefore, the system of the present invention is capable of printing only those addresses and the associated data sectors which contain a zero sales in this last named mode of operation. In order to print this information, the operator enters the start number and the stop number in the manner as previously described. Following this, the operator will shift the selector switch 250 to print sequential quantity 3 = 0, and thereafter actuate the execute switch 251.

The operation of the various components in the printer drive circuit have been described in connection with the detailed description of the operation of the printer driver circuit. The following discussion of the operation is therefore directed to the operation of the entire printer drive circuit P and the attendant printer interface circuit J and printer K.

If it is desired to print-out various transactions which take place with respect to the data in the aforementioned storage and retrieval system, the print add or substract sequence is selected by rotating the selector switch 250 to the print add or subtract position on the print control console A and actuating the execute switch 251. In this case, the various arithmetic transactions which take place with respect to the data will be printed. For example, certain users of the system may wish to add information to, or subtract information from, certain of the data fields in the various data sectors. Accordingly, these transactions may be printed. In addition, as indicated previously, an "A" or an "S" will also be printed at the end of the second data sector in order to indicate whether the respective transaction was an add transaction or a subtract transaction.

As indicated above, the print power control circuit 316 operates in such manner as to deenergize the motor in the printer K when the selector switch 250 is positioned at the print add or subtract position. When the execute switch 251 is actuated, the add or subtract flip-flop 263 will be set and the print add or subtract sequencer 296 will be energized. Memory data is then loaded into the C-register 275 through the input switch 271 in the manner as previously described. The output of the B-register 274 is then loaded into the A-register 273. When the add switch 119 on the control panel 110 is actuated, or when the subtract switch 120 on the control panel 110 is actuated, the add/subtract data is loaded into the C-register 275 and the add or subtract latch in the print add or subtract sequencer 296 is set. When the character counter 291 reaches a count of three, the input switch 271 is energized in such manner that console data carried over the console data line CD is entered into the C-register 275. The print add or subtract sequencer 296 will then issue the console inhibit signal over the console inhibit line CI. In addition, the start print output from the print add or subtract sequencer 296 causes the format sequencer 285 to initiate a printing operation. Both the selected part number and the data sectors associated with the part number, and which data sectors have been modified by the add or subtract information, will then be printed on the print-out paper by the printer K in the manner as previously described. It should be observed that the printer drive circuit P will not issue a signal over the data ready line DR to the printer interface circuit J until the printer drive circuit P receives a carriage ready signal over the carriage ready line CR. After the carriage ready signal is received at the printer drive circuit P, the data is transmitted through the printer interface circuit J to the printer K over the six data lines DA.

After the entire three sectors have been printed, the format sequencer 285 will issue the print complete signal over the print complete line PCL. This signal causes the add or subtract sequencer 296 to remove the console inhibit signal and reset the latches in the add or subtract sequencer 296. In addition, the print complete signal is received by the print power control circuit 316 and this circuit will cause the motor in the printer K to become deenergized in the manner as previously described. The A, B, and C registers remain cascaded so that information involved in a subsequent add or subtract operation may be printed.

It should be noted that in the print add or subtract mode, the BCD to 10-line decoder 261, the various registers 273–276 and the attendant input switches 269–272 serve an integral part in the print operation. In like manner, the print add or subtract sequencer 296 and the format sequencer 285 are energized and serve an integral part in the print add or subtract operation.

The system of the present invention is capable of printing in four basic sequential modes which are (1) print sequential, (2) print sequential by code, (3) print sequential quantity one less than quantity two, and (4) print sequential quantity three equals zero. In each of the print sequential modes, the sequence requires the loading of a start number and stop number or "start address" and "stop address," and these stop and start numbers must be loaded into the printer drive circuit P prior to the initiation of the printing sequence. These numbers are loaded from the print control console A by rotating the selector switch 250 to the "enter start" position. The start number or address is entered into the printer drive circuit P by actuation of the various switches on the keyboard 112. After the start number has been entered through the keyboard 112 it will be displayed on the display tubes 111 in the manner as previously described. When the execute switch 251 is actuated, the bits representing this start number are entered into the A-register 273, through the input switch 270.

The stop number is entered by rotating the selector switch 250 to the "enter stop" position. The various keys on the keyboard 112 are actuated in order to enter the proper stop number, which is also illuminated on the display tubes 111, and which is entered into the D-register 276 in the manner as previously described. In many cases, it may be desirable to enter a code such as a manufacturer's code or the like. In this case, the selector switch 250 is rotated to the "enter code" position and the proper code is entered by means of the keyboard 112. After the code is entered by means of the keyboard 112 into the console unit G, the execute switch 251 is actuated and the code is introduced into the code register 308 of the code comparator 280.

Figure 19:
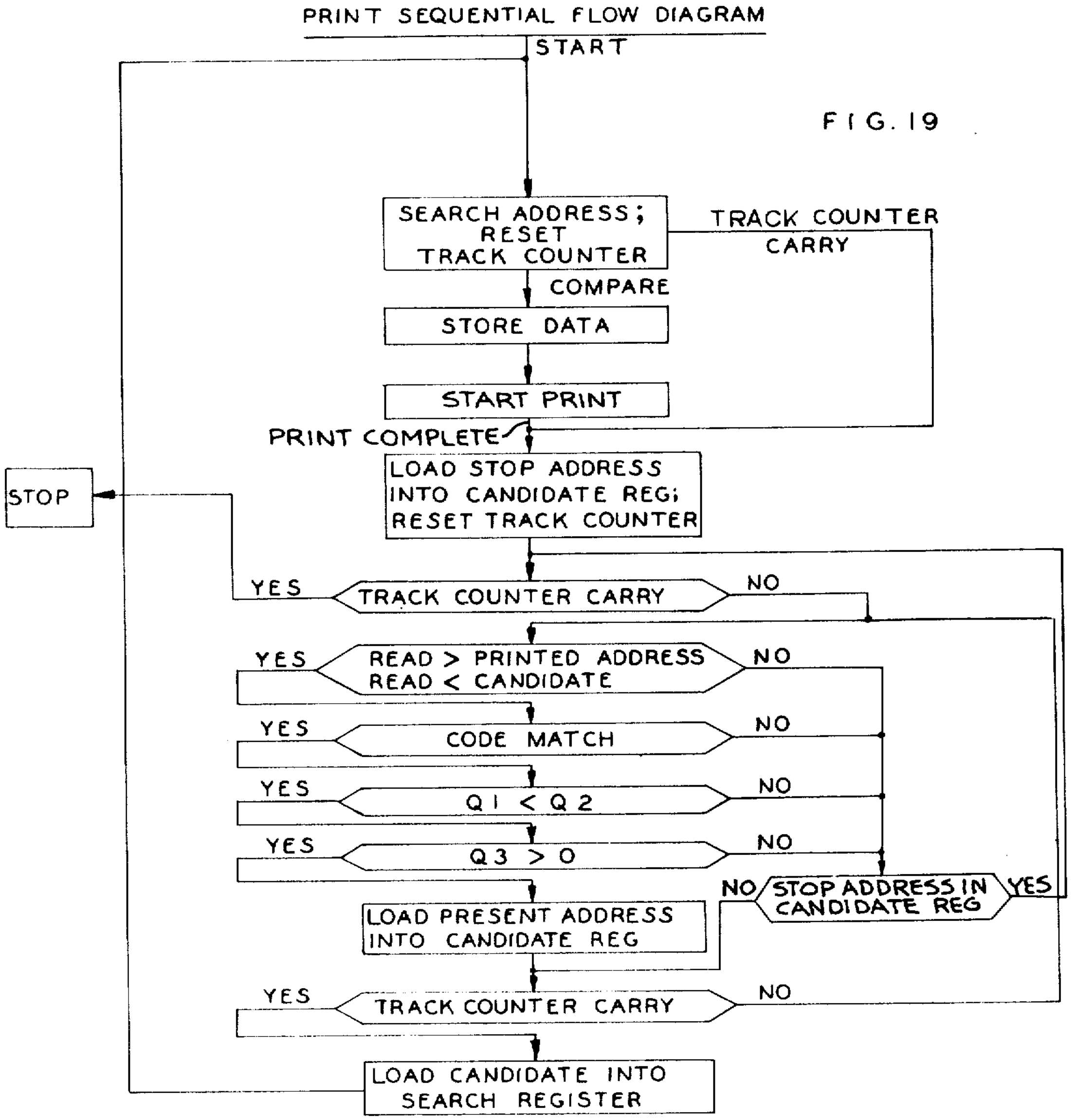
FIG. 19 is a schematic flow diagram showing the various steps which take place during a print sequential mode of operation.

The actual sequencing operation which takes place in any print sequential mode is more fully illustrated in the flow diagram of FIGS. 19. Initially, the start address is located in the A-register 273 and the stop address is located in the D-register 276. The start address actually represent the minimum address or minimum sized part number and the stop address represents the maximum address or maximum sized part number, where number sizes are determined in accordance with the character magnitude scheme defined above. A search of the memory section N will then be initiated to determine if the start number has been recorded in the memory section N. If the start address is not located in the memory section N, the size search sequencer 282 will initiate a search for the next higher address that is located in the memory section N. However, if the start address is located in the memory section N, an output from the bit comparator 277 will notify the size search sequencer 282, which will initiate the print-out of the start part number address as well as data sector-1 and data sector-2 associated with that part number address.

After the print out of this part number has been completed, the stop number is loaded into B-register 274 from the D-register 276. The part number address which was previously printed is now located in the A-register 273 and the size search sequencer 282 will initiate a search of the drum 180 for that now part number address which is larger that the address previously printed, and smaller than the stop number which is located in the B-register 274. If another part number is found in the memory section N which satisfies the size criteria of being larger than the number located in the A-register 273 and smaller than the number located in the B-register 274, that number will constitute a new candidate for printing. It should be noted that after the entire memory section has been searched, the last number which satisfied the size criteria is stored and is the new part number address which is to be printed. This part number address is transferred to the A-register 273 and a search is initiated for this part number in the memory section N. When the part number is found, the two data sectors associated with this part number are stored and a print cycle is initiated with the print format sequencer 285. It is to be noted that when the candidate address is stored in the A-register 273, the two data sectors associated therewith are stored in the B-register 274 and the C-register 275.

As used herein, a part number (or address) candidate is a part number located in the memory section N which is being examined to determine if the part number meets certain established criteria, such as, size criteria, code criteria, quantity-1 less than quantity-2 criteria, or quantity 3 = 0 criteria. A part number which meets size criteria is a number with a numerical size value, as established by the binary value ordering herein, that is larger than the start number and smaller than the present candidate which initially was the stop number. A part number which meets the code criteria is a part number which has a code in a selected data field of one of the data sectors and which matches the enter code. In the present invention, the code field has been established with two characters comprising data field-1 of data sector-1. A part number which meets the quantity-1 less than quantity-2 criteria is a number where one data field of one data sector has a smaller value than another data field of the data sector. In the present invention, the data field representing quantity-1 in data field-1 of data sector-2, containing three characters and the data field representing quantity-2 is data field-2 of data sector-2 containing three characters. A part number which meets the quantity 3 = 0 criteria is a part number with a numerical value of all zeros in one of the data fields of one of the data sectors. In the present invention, the data field which may have all zeros to meet the quantity 3 =0 criteria is data field-3 of data sector-2 and contains three characters.

Referring to FIG. 19, it can be seen that in the print sequential modes of operation, the sequence is started by searching for the address and resetting the track counter 304. If a comparison of a candidate number with numbers in the memory section N does exit, the part number and then the data sectors associated with the part number is stored and the print cycle is initiated. When the print cycle is completed, a track counter reset pulse is generated so that a new search and print operation may be started. However, it is to be noted that the stop address is then loaded into the candidate register which is the B-register 274, in this case. If a track counter carry is issued, the entire sequence is stopped. If no track counter carry signal is issued, a comparison between the data read from the memory section N and the printed address is compared with the candidate address in order to see if the candidate meets the required qualifications. If the candidate does not meet the required qualifications, and no other candidate has been found, after searching the entire memory section N, the sequence is ended when the track counter carry signal is issued. However, if another candidate is found, the track counter carry signal will indicate that the present candidate is to be printed. After determining that there is a candidate of qualifying size, the next step is that of code determination. If a code match is achieved, then the candidate is retained. If there is no code match, then a search is continued until another candidate number is found and a determination is made as to whether or not the codes match.

If the operator has selected a sequential quantity-1 less than quantity-2 print mode on the print control console A, the next step is to determine whether or not a quantity-1 less than quantity-2 condition does exist. If a candidate is found which meets the size criteria and which also meets the quantity-1 less than quantity-2 condition, then this candidate number will be retained. In like manner, if it does not meet any and all of the aforesaid conditions, it cannot constitute an acceptable new candidate number for printing. It should be observed that it is also possible to construct the printer drive circuit P in such manner that the candidate number would meet the size criteria and the code criteria as well as the quantity-1 less than quantity-2 criteria.

Referring again to FIG. 19, it can be seen that this FIG. 19 includes a quantity-3 equals zero condition. If the operator of the system selects a print sequential quantity-3 equals zero condition, the quantity-1 less than quantity-2 condition will not be examined. Consequentially, if a search is made of the memory section N and a part number meets the qualification, this part number will become the new candidate part number address if it also meets the quantity-3 = 0 condition. Thereafter, a search will be made in the memory section N for this new candidate part number address and after the address is found, a search will be made for the data sectors associated with this part number.

Any part number which constitutes a qualifying candidate will be loaded into the A-register 273 and the two data sectors associated with this part number will be loaded into the B-register 274 and the C-register 275. Further, it can be observed that if a track counter carry signal is generated after the entire memory section N has been searched and no such qualifying candidate number esists, the sequence is ended. If, on the other hand, no track counter carry signal is issued, then a new search for a qualifing candidate number is initiated.

The clocking circuit 278 performs a type of formating function which plays an integral role in each of the sequencing modes of operation and provides a sector count output which indicate to the various sequencers in the printer drive circuit P which sector is being read from the memory section N. When a write operation takes place with respect to the central electronics unit H, three additional clock pulses, or so-called "early clock pulses" are transmitted to each of the console units G and the printer drive circuit P. As indicated previously, these three extra clock pulses must be eliminated, and in addition, in the succeeding sector which contains three fewer clock pulses than normal, the entire sector of clock pulses is eliminated. The sector counter and decoder contained in the clocking circuit is essentially a binary counter of the same modulo as the number of sectors serving each address. This counter is reset by index clock signals and incremented by sector clock signals. As indicated previously, the information contained in the various registers 273–276 is shifted among the registers during a size search sequence and the read/write clock signals which are created by the clocking circuit 278 are used in the size search sequence to perform these data changes among the registers 273–276. The address sectors are differentiated from the data sectors by means of the sector counter and decoders included in the clocking circuit 278.

In the print sequential mode of operation, the addresses are printed in alpha-numeric order with the shorter addresses being printed first. In other words, part number addresses with more blank spaces to the right are printed before the part number addresses which contain more arabic or numeric characters. If the part numbers have the same length, the binary magnitude of the repsective addresses are examined and the smaller is printed first. In addition, if punctuation marks or spaces occur in the part number, the number with the left most punctuation is deemed to be smaller. Consequently, if two numbers have the same punctuation characters in the same character positions, they are assumed to be equal in length.

The various space or punctuation decoders 298–300 in the size comparator 279 determine if a blank space or punctuation mark exist in any of the character positions of the part number addresses being read from the drum 180. A blank space or punctuation is detected by the space or punctuation decoders 298–300 when a binary bit-32 and a binary bit-8 or binary bit-4 is true. The binary bit-32 is the most significant bit of the character. If a space or punctuation does exist in any part number contained in the A-register 273, the output of the space or punctuation decoder 298 is true. If a space or punctuation mark exists in any of the part number sectors in memory data, the output of the space or punctuation decoder 299 will be true. If a space or punctuation mark exist in the part number addresses contained in either the B-register 274 or the C-register 275, whichever is being stored, the output of the space or punctuation decoder 300 will be rendered true. The binary weighing of the bits representing space or punctuation mark are determined at bit-5 time.

The outputs of the space or punctuation decoders 298, 299 are directed to the comparison circuits 302, 303 in the manner as illustrated in FIG. 16D. When the magnitude of the part number (or address) in the A-register 273 is compared with the part number addresses in memory data, the binary magnitude of the respective numbers are noted unless a blank space or punctuation mark occurs in the sector contained in the A-register 273 and not in the memory data addresses, or unless a blank space or punctuation mark occurs in the memory data addresses and not in the address contained in the A-register 273. If a blank space or punctuation mark does exist in either the part number address contained in the A-register 273 and/or the memory data, the comparison circuit 302 is held in the appropriate state to indicate that the numbers differ in length and to determine the number of the most significant characters to the left of the most significant blank space or punctuation mark. A decision to store a new candidate part number is made at the end of the part number sector and the two data sectors associated therewith, or just prior to the start of a following part number sector.

When it is desired to print sequential by code, the operator enters a start number and a stop number in the manner as previously described. In addition a code is also entered. The code field consisting of two characters constitutes data field-1 (QF 1) of data sector-1. In this mode of operation, the size search sequencer 282 performs a search in the manner as previously described, but at a decision point, occurring at the end of data sector-2, the output of the code comparator 280 will be noted so that the decision to store or not to store the new part number address is now based, on not only the size of the address, but also on the code field contained in the address. Only those part number addresses in the memory section N which have the correct code characters in data field-1 of data sector-1 will be printed. The criteria of being less than the stop number and greater than the start number in size and having the same code field is examined for each address. At the end of data sector-2 the size and code comparison information is available for a decision.

As indicated previously, the code comparator 280 contains the code register 308. This register has a number of stages or flip-flops which is equal to the number of bits representing the code field. In this case, the code field consists of two characters and accordingly, the register 308 will contain 12 stages. The input switch 309 switches the code register 308 from a circular right shift condition to a serial input configuration on command from the input load circuit 267. When the selected code is keyed into the console unit G and the execute switch 251 is actuated, the last two characters contained in the console register 130 are loaded into the code register 308 of the code comparator 280. When the first two characters in data sector-1 are read from the memory, the code register is right circular shifted and the bits contained in the part number sectors in the memory section N and representing these two code characters are compared with the bits in the code register 308 by means of the gated bit comparator 307. After examining the first two characters of data sector-1, the bit comparator is disabled, thus storing the status of the code field, and identifying whether or not the code satisfies the code criteria.

If the candidate number does meet both the start number and the stop number criteria, as well as the code criterion, then this number is stored and will be printed in the manner as previously described.

When it is desired to print in the print sequential quantity-1 less than quantity-2 mode, the operator rotates the selector switch 250 to the proper print sequential quantity-1 less than quantity-2 position on the print control panel A. In this sequence a size comparison is made. Accordingly, the operator will enter the start number and the stop number in the manner as stated above. The size comparator 279 operates in the manner as previously described. In addition to the size comparison which is made, a quantity comparison will also be made in the quantity comparator 281.

The sequencer 310 enables loading of the first three characters in data field-1 of data sector-2 into the quantity register 312. The subsequent three characters contained in data field-2 of data sector-2 are then compared with the first three characters contained in the quantity register 312 through the binary magnitude comparator 313. The output of the comparator 313 will be rendered true if data field-2 is larger than data field-1 in data sector-2. In practice, data field-2 may represent a minimum quantity of inventory and data field-1 may represent an on-hand quantity so that if data field-1 is smaller than data field-2 an order of that particular part number is indicated to be necessary or desirable. In this connection, it should be observed that the data fields may contain any desired number of characters and the quantity comparison would be made on the basis of the characters contained in the respective data fields. In like manner, it should also be observed that comparison can be made among any of the data fields contained in either of the data sectors. For example, it may be desirable to compare data field-3 with respect to data field-1 of either data sector-1 or data sector-2. Furthermore, these various data fields may represent any type of information and not necessarily inventory or merchandise as stated herein.

In actual operation, the sequencer 310 loads the quantity register 312 with the first three characters, or data field-1 of data sector-2. During the time of the second three characters constituting data field-2 of data sector-2, the sequencer 310 transmits clock pulses to the binary magnitude comparator 313 and enables a circular shifting of the quantity register 312. The magnitude comparator 313 will compare the characters contained in the quantity register 312 with like characters in the same data fields and sectors in memory data and the output of the binary magnitude comparator 313 will be rendered true if quantity-1 is less than quantity-2 in binary magnitude.

Thus, it can be observed that if a part number contained on the drum 180 meets the size criteria, that is, the part number has a size greater than the start number and a size less than the stop number, and meets the quantity-1 less than quantity-2 criterion, this number will be stored as the new candidate. It should also be observed in this connection, that in the print seqeuntial modes of operation, the size comparator and the code comparator and the quantity comparator are always operating. However, if the operator of the system does not select a quantity-1 less than quantity-2 mode of operation, the operations which take place in the quantity comparator 281 will not have any effect on determining whether or not a number is to be printed. In like manner, if the operator merely wishes to print all numbers sequentially, the code comparator 280 will not have any effect in the determination of the numbers to be printed. However, the size search sequencer 282, the register circuit 268 and the format sequencer 285 are also always involved in any printing operation.

If it is desired to print any type of zero transaction, the operator of the system will shift the selector shift 250 to the print sequential quantity-3 = 0 position. In this mode of operation, a size comparison is also made. However, the quantity comparator is not employed. Accordingly, any part number or data sectors which are to be printed must meet the size criteria established above. In addition, the part numbers and data sectors must also meet the quantity-3 = 0 criterion. In this mode of operation, the gating 314 and the flip-flop 315 are employed. During the time that data field-3 of data sector-2 is being read from the part number addresses in the memory section N, that is the last three characters in data sector-2, the input to the flip-flop 315 is memory data, so that if data field-3 of data sector-2 has any true bits, the flip-flop 315 will be set. Consequently, an output to the size search sequencer 282 will be generated and the address becomes a new candidate. Accordingly, only those addresses which have all zeros in data field-3 of data sector-2 will qualify as a candidate for print-out.

The present invention has been described in terms of a printer drive circuit and a printer interface circuit with an attendant printer. However, it should be recognized that the present invention is not necessarily limited to printing of stored data and the printing of transactions, and any other type of data rendering device could be employed. It should be observed that the printer drive circuit P, for example, actually serves as a type of sorter and size orientator for purposes of sorting and comparing. The data could as convenienlty be displayed on a cathode ray tube, such as 20 line cathode ray tube, or the data could be recorded on magnetic tape, punched cards, or the like. In addition, the system of the present invention could be interfaced to other digital type equipment for operation. Thus, it can be observed that the system of the present invention has a wide variety of applications and it is not necessarily limited to the printing of data per se.

It should be understood that changes and modifications in the form, construction, arrangement and combination of parts presently described and pointed out in the claims can be changed and substituted for those herein shown without departing from the nature and principle of my invention.

Having thus described my invention, what I desire to claim and secure by letters patent is:

1. A non-programmable data selection system for use with a serially accessible storage device having sectors of data randomly stored thereon to select and enable a presentation of data meeting a size criterion, and at least one of a code criterion, a quantity criterion and a character criterion, and where the data includes a sector comprising a locator portion and having a plurality of character fields therein and a sector comprising a descriptor portion and having a plurality of character fields therein; said data ordering system comprising:

a. input means for introducing into said system a predetermined size criterion, a code criterion, and a character criterion for said data, b. size-search sequencing means operatively connected to said input means to initiate an accessing and a searching of the storage device for all data stored therein, c. size comparison means operatively connected to said size-search sequencing means to determine a size criterion of which of said data is within predetermined maximum and minimum limits, d. said size comparison means examining all such data commencing from one of said limits consecutively to the other of said limits to determine if the data meets the size criterion, e. code comparison means operatively connected to said size-search sequencing means to search said data found within said predetermined maximum and minimum limits and to determine a code criterion of which of said data contains a certain code within one of a selected character field in such data, f. quantity comparison means operatively connected to said size-search sequencing means to search the data found within said predetermined maximum and minimum limits to determine a quantity criterion based on quantities included in a selected character field in the data, g. character determination means operatively connected to said size-search sequencing means and said quantity comparison means to search the data found within said preselected maximum and minimum limits and determine a character criterion of whether a selected character field in certain of the sectors of data contain all characters of one type therein, and h. selection means operatively connected to said size-search sequencing means to select among energization of said code comparison means, quantity comparison means and character determination means to that all data presented achieves the size criterion and at least one of the quantity criterion, the code criterion and the character criterion.

2. The data selection system of claim 1 wherein said quantity comparison means operates in conjunction with said character determination means for determining if any certain selected field of any sector contains all character zeros therein, said quantity comparison means compares the size value of one certain selected field with respect to the size value of another certain selected field with respect to the size value of another certain selected field in any such sector.

3. The data selection system of claim 1 wherein said size comparison means comprises decoding means to examine the assigned values of only certain characters in certain of the sectors of data to determine if the data is within the predetermined maximum and minimum limits.

4. The data ordering system of claim 1 wherein said system comprises clocking means operatively connected to said size search sequencing means for distinguishing between sectors comprising locator portions and sectors comprising descriptor portions based on clocking signals issued by said clocking means, and that the determination of whether said data is within predetermined maximum and minimum limits by said size comparison means is made on the basis of character values in selected fields in those sectors comprising said descriptor portions.

5. The data ordering system of claim 2 wherein said system comprises clocking means operatively connected to said size search sequencing means for distinguishing between sectors comprising locator portions and sectors comprising descriptor portions based on clocking signals issued by said clocking means, and that the determination of fields containing all character zeros is made with respect to said sectors comprising descriptor portions.

6. A data selection control circuit for use with non-programmable data storage and retrieval systems and the like which contain a storage means and which systems are capable of presenting such data in any of a plurality of formats; said control circuit comprising:

a. search sequencing means accessing and examining said storage means for the data stored thereon, b. size comparison means operatively connected to said search means to determine relative sizes of said certain data in said storage means, c. said size comparison means in cooperation with said search means examining all such data within predetermined maximum and minimum limits by examining all such data commencing from one of said limits and ordering same according to values to the other of said limits, d. code means operatively connected to said search sequencing means to search said data found within said predetermined maximum and minimum limits and determine if said data contains a preselected code, e. quantity determination means operatively connected to said search sequencing means to examine portions of the data which is found within said predetermined maximum and minimum limits and determine a relative quantity in such data, f. selection means operatively connected to said search sequencing means to select for presentation all such data in any of the following formats:

1. all data within said predetermined maximum and minimum limits, 2. all data containing said preselected code, and 3. all data having certain qutntity determinations made therein and, g. format sequencing means operatively connected to search sequencing means, said size comparison means and said quantity determination means to initiate a presentation of the data in a format according to the selection made through said selection means.

7. The data selection control circuit of claim 6 wherein said circuit comprises character determination means operatively associated with said quantity determination means and operating in conjunction therewith to determine if a portion of said data contains only a certain type of character.

8. The data selection control circuit of claim 6 wherein said circuit comprises character determination means operatively associated with said quantity determination means and operating in conjunction therewith to determine if a portion of said data contains only a certain type of character and said certain type of character is a zero numeric character.

9. The data selection control .circuit of claim 8 wherein said circuit comprises decoder means operatively associated with said size comparison means to examine the data accessed from the storage means and determine the presence of certain types of characters in such data, said decoder means being operable in conjunction with said size comparison means to determine relative assigned values of characters in said data and to determine the size of sectors of the data based on the determined assigned values for said last named characters.

10. The data selection control circuit of claim 6 wherein said circuit comprises means for introducing the predetermined maximum and minimum limits, register means for holding the data from the storage means for comparison with said maximum and minimum limits, so that upon comparison by said size comparison means with the data in the register means, if said size comparison means does not determine that said data is between said predetermined minimum and maximum limits, the size comparison means will operatively inhibit the format sequencing means from initiating a presentation of the data.

11. The data selection control circuit of claim 6 wherein said circuit comprises means for introducing the predetermined code in the circuit equivalent to that in said data, register means for holding the data from said storage means for comparison of the data from the storage means by said code means with the predetermined code, and that said format sequencing means will be inhibited from initiating a presentation of the data if said code means does not determine that the predetermined code exists in said data.

12. The data selection control circuit of claim 6 wherein said circuit comprises selection means operatively connected to said size comparison means, said code means and said quantity determination means to always initiate a size comparison, but to select among a code determination and quantity determination by preventing energization of either of said code means or said quantity determination means.

13. A size comparison circuit for use in a data selection system to determine the relative numerically assigned value of sectors of data contained in a main storage means, and where said data sectors are comprised of a plurality of any one or more or arabic characters, numeric characters, non-descript characters, or characters representing spaces, each of said characters being represented by a plurality of bits and a byte of said bits representing one of a plurality of characters in a sector of data; said size comparison circuit comprising means for introducing maximum and minimum values for data sectors, a plurality of register means receiving sectors of data at least from said main storage means, a plurality of decoders operatively connected to said plurality of register members, means for introducing the bits representing the characters in an individual sector of data from said storage means into each of said decoders, said decoders determining whether the sectors of data contain characters which are non-descript characters or characters representing spaces, and a plurality of binary comparator members operatively connected to said register members and said main storage means to receive sectors of data from each, said binary comparator members comparing each one of certain sectors of data in said main storage means against the maximum and minimum values for data sectors introduced into said circuit by comparing the length of the sectors and the assigned values of characters in such sectors to thereby determine the numerically assigned value of said sectors, said binary comparator members in combination with said decoders accounting for said arabic characters, numeric characters, non-descript characters and characters representing spaces included in said sectors and the relative ordering of such characters in a sector in the determination of the relative assigned values of said sectors to thereby determine which of said sectors are within said introduced maximum and minimum values.

14. The size comparison circuit of claim 13 wherein said characters in any sector include arabic characters, and numeric characters, and the non-descript characters comprise at least spaces and punctuation marks, and that said decoders are a plurality of space and punctuation decoders which detect the presence of both spaces and punctuation marks in said sectors of data.

15. A quantity comparison circuit for use in a data selection system to determine the relative size values of character fields in a sector of data contained in a main storage means and where said sector is comprised of a plurality of character fields and each of said character fields is comprised of a plurality of character representing bits; said quantity comparison circuit comprising quantity register means, data transfer means operatively connecting said quantity register means with said main storage means so that said quantity register means receives the character representing bits in at least a first character field of said plurality of character fields in a sector of data where size value is to be determined, sequencing means operatively connecting to said register means for controlling said register means, binary magnitude comparator means connected to said register means and said sequencing means, said data transfer means also operatively connecting said binary magnitude comparison means to said main storage means to receive bits representing a second character field of said plurality of character fields in said last named sector of data contained in said main storage means, said binary magnitude comparator means under the control of said sequencing means comparing the relative assigned values of the character representing bits in the second data field against the relative assigned values of the character representing bits in the first data field contained within said quantity register, to determine the relative size of the first data field with respect to the second data field.

16. The quantity comparison circuit of claim 15 wherein said circuit comprises clocking means to generate bit-time signals and transfer and bit-time signals to said sequencing means, said sequencing means initiating the comparator means to perform the comparison operation on a selected bit-time basis.

17. The quantity comparison circuit of claim 15 wherein said circuit comprises a plurality of register members which are operatively connected to said main storage means for receiving characters contained in character fields in said sectors of data, and means connecting said quantity register means to at least one of said plurality of register members for said quantity register means to receive the characters contained in the character fields located in said last named register member.

18. The quantity comparison circuit of claim 16 wherein said circuit comprises means to generate sector-time signals and transfer said signals to said sequencing means, said sequencing means initiating the comparator means to perform the comparison operation on a proper sector of data based on said sector-time signals.

19. The method of printing data randomly stored in a data storage member and where the data comprises a plurality of locator portions and a plurality of descriptor portions, and each one of said descriptor portions is associated with a particular locator portion; said method comprising establishing a maximum locator value and a minimum locator value for the locator portions and introducing said maximum and minimum locator values through an input device into an apparatus for ultimate comparison with the data, examining the storage member for all locator portions contained therein, comparing each of said locator portions in said storage member with the maximum and minimum locator values in a size comparison means forming part of said apparatus and determining which of said locator portions meet a size criterion of having values between said maximum and minimum locator values, selecting each of said locator portions within said maximum and minimum locator values consecutively in size commencing from one of said maximum or minimum locator values through said size comparison means so that the locator portions which meet the size criterion are sequentially ordered, transferring the last named locator portions which meet the size criterion and the descriptor portions associated therewith to a printing circuit associated with said apparatus, and permitting the printing circuit to initiate a printing of each of said last named locator portions which meet the size criterion in such sequential ordering with the descriptor portions associated therewith.

20. The method of claim 19 wherein the method comprises introducing a pre-established code for comparison through said input device into said apparatus, comparing said locator portions which meet the size criterion against said pre-established code in a code comparison means to determine if such locator portions contain said pre-established code, transferring the locator portions which meet the size criterion and contain said code and the descriptor portions associated therewith to said printing circuit, and causing the printing circuit to only initiate a printing of the locator portions which meet the size criterion and contain said code and to also initiate a printing of the descriptor portions associated with said locator portions.

21. The method of claim 19 wherein the method comprises examining a selected character field in the descriptor portions associated with locator portions which meet the size criterion by character determination means included in said apparatus to determine if such last named descriptor portions meet a character criterion of having said selected character field included in said descriptor portion which contains all characters of one type, transferring the locator portions which meet the size criterion and the descriptor portions associated therewith which meet the character criterion to said printing circuit, and causing the printing circuit to initiate a printing of only the locator portions and descriptor portions associated therewith when such locator portion meets the size criterion and which descriptor portion associated therewith meets the character criterion.

22. The method of claim 21 further characterized in that the method comprises introducing a pre-established code for comparison through said input device into said apparatus, examining such locator portions which meet the size criterion, comparing such last named locator portions which meet the size criterion against said pre-established code in a code comparison circuit included in said apparatus to determine if such locator portions contain said pre-established code, examining a selected character field in the desciptor portions associated with the locator portions which meet the size criterion and the code criterion by character determination means included in said apparatus to determine if such last named descriptor portions meet a character criterion of having said selected character field included in said descriptor portion which contains all characters of one type, transferring the locator portions which meet the size and code criterion and descriptor portions associated therewith which meet the character criterion to said printing circuit, and causing the printing circuit to initiate a printing of only the locator portions which meet the size criterion and the code criterion and descriptor portions associated therewith which meet the character criterion.

23. The method of claim 19 wherein the method comprises examining descriptor portions associated with locator portions which meet the size criterion, determining by means of character determination means included within said apparatus if such last named descriptor portions meet a character criterion of having a first selected character field included in said descriptor portion which contains all characters of one type, examining a second selected character field and a third selected character field of the descriptor portions which meet the character criterion by means of quantity determination means included within said apparatus and determining which of said descriptor portions meet a quantity criterion and having a greater value in the second selected character field than the value in the third selected character field included in said descriptor portion, selecting only the locator portions which meet the size criterion and the descriptor portions which meet the character criterion and quantity criterion, transferring the locator portions which meet the size criterion and the descriptor portions associated therewith which meet the character criterion and quantity criterion to said printing circuit, and causing the printing circuit to initiate a printing of only the locator portions and descriptor portions associated therewith when all such criteria have been met.

24. The method of claim 21 wherein said characters of one typre are all numeric characters and said character determination means would then comprise a zero character determination means.

25. The method of claim 19 wherein the method comprises the utilization of character decoding means in said apparatus for determining the presence of and accounting for non-descript characters in said locator portions in the determination of whether or not such locator portions meet the size criterion.

* * * * *